US010637782B2

(12) United States Patent
Dillon et al.

(10) Patent No.: US 10,637,782 B2
(45) Date of Patent: Apr. 28, 2020

(54) SYSTEM AND METHOD FOR POLICY-BASED MULTIPATH WAN TRANSPORTS FOR IMPROVED QUALITY OF SERVICE OVER BROADBAND NETWORKS

(71) Applicant: Hughes Network Systems, LLC, Germantown, MD (US)

(72) Inventors: Douglas Dillon, Gaithersburg, MD (US); Gaurav Sabharwal, Urbana, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/430,392

(22) Filed: Feb. 10, 2017

(65) Prior Publication Data

US 2017/0155590 A1 Jun. 1, 2017

Related U.S. Application Data

(63) Continuation-in-part of application No. 13/962,883, filed on Aug. 8, 2013, now Pat. No. 9,716,659, which
(Continued)

(51) Int. Cl.
*H04L 12/851* (2013.01)
*H04L 12/24* (2006.01)
(Continued)

(52) U.S. Cl.
CPC .......... *H04L 47/24* (2013.01); *H04L 41/5025* (2013.01); *H04L 43/0811* (2013.01);
(Continued)

(58) Field of Classification Search
CPC . H04L 47/24; H04L 41/5025; H04L 43/0888; H04L 43/10; H04L 47/20; H04L 47/22
See application file for complete search history.

(56) References Cited

U.S. PATENT DOCUMENTS 6,708,218 B1 3/2004 Ellington et al.
6,775,235 B2 8/2004 Datta et al.
(Continued)

FOREIGN PATENT DOCUMENTS

EP 1772998 A2 4/2007
WO WO2015132624 A1 9/2015

OTHER PUBLICATIONS

PCT/US13/54214 International Search Report and Written Opinion, dated Oct. 16, 2013.
(Continued)

*Primary Examiner* — Eric Myers
(74) *Attorney, Agent, or Firm* — Potomac Technology Law, LLC

(57) ABSTRACT

An approach is provided whereby multiple broadband connections operate together to provide a highly available secure private networking solution. Data packets of a communications flow are received by a networking device, for transmission to a remote destination node, over a wide area data communications network. A service classification is determined for the data flow. A sequence number is generated for each data packet, where the sequence numbers indicate an order by which the data packets are received. An indication of the service classification and the sequence number is added to each data packet. For each data packet, a transport policy is determined that indicates one or more VPN tunnels through which the data packet is to be transmitted, where the determination of the VPN tunnels is based on the service classification, and wherein each VPN tunnel is carried over a respective WAN transport of the wide area data network.

21 Claims, 14 Drawing Sheets

Related U.S. Application Data is a continuation-in-part of application No. 13/428,323, filed on Mar. 23, 2012, now Pat. No. 9,240,950.

(60) Provisional application No. 62/293,764, filed on Feb. 10, 2016, provisional application No. 61/680,959, filed on Aug. 8, 2012, provisional application No. 61/466,794, filed on Mar. 23, 2011.

(51) Int. Cl.
  *H04L 12/26* (2006.01)
  *H04L 12/815* (2013.01)
  *H04L 12/813* (2013.01)
  *H04L 12/801* (2013.01)

(52) U.S. Cl.
  CPC ...... *H04L 43/0852* (2013.01); *H04L 43/0888* (2013.01); *H04L 43/10* (2013.01); *H04L 47/193* (2013.01); *H04L 47/20* (2013.01); *H04L 47/22* (2013.01)

(56) References Cited

U.S. PATENT DOCUMENTS

| | | |
|---|---|---|
| 7,174,179 B2 | 2/2007 | Krebs et al. |
| 7,305,464 B2 | 12/2007 | Phillipi et al. |
| 7,406,048 B2 | 7/2008 | Datta et al. |
| 7,493,383 B1 | 2/2009 | Mukerji |
| 7,573,821 B2 | 8/2009 | Chilukoor et al. |
| 7,616,585 B1 | 11/2009 | Kritov et al. |
| 7,656,800 B2 | 2/2010 | Morandin |
| 7,778,176 B2 | 8/2010 | Morford |
| 7,925,281 B2 | 4/2011 | Cahn |
| 7,940,685 B1 | 5/2011 | Breslau et al. |
| 7,983,239 B1 | 7/2011 | Weinstein et al. |
| 8,239,570 B2 | 8/2012 | Beeston et al. |
| 8,339,952 B1 | 12/2012 | Eiriksson |
| 8,654,638 B2 | 2/2014 | Godlewski |
| 2002/0009072 A1 | 1/2002 | Halme |
| 2002/0116501 A1 | 8/2002 | Ho et al. |
| 2005/0025090 A1 | 2/2005 | Klein et al. |
| 2006/0114875 A1 | 6/2006 | Wu et al. |
| 2007/0008884 A1 | 1/2007 | Tang |
| 2008/0049753 A1 | 2/2008 | Heinze et al. |
| 2008/0181108 A1 | 7/2008 | Hashmi et al. |
| 2009/0199290 A1 | 8/2009 | McCullough et al. |
| 2009/0216880 A1 | 8/2009 | Lepeska |
| 2009/0234953 A1 | 9/2009 | Braslavsky |
| 2010/0027545 A1 | 2/2010 | Gomes et al. |
| 2010/0118886 A1 | 5/2010 | Saavedra |
| 2010/0232294 A1 | 9/2010 | Samuels et al. |
| 2011/0078783 A1 | 3/2011 | Duan et al. |
| 2011/0231546 A1 | 9/2011 | Nathanson |
| 2012/0078994 A1 | 3/2012 | Jackowski et al. |
| 2012/0110152 A1 | 5/2012 | Wiung et al. |
| 2013/0311778 A1 | 11/2013 | Cherukuri et al. |
| 2013/0322255 A1 | 12/2013 | Dillon |

OTHER PUBLICATIONS

USPTO, "International Search Report & Written Opinion", PCT App. No. PCT/US2014/050257, dated Nov. 18, 2014.
USPTO, "International Search Report and Written Opinion", PCT/US2017/017554, dated Apr. 25, 2017.
EPO, "Extended European Search Report", EP17750913.0, dated Aug. 6, 2019.

SYSTEM AND METHOD FOR POLICY-BASED MULTIPATH WAN TRANSPORTS FOR IMPROVED QUALITY OF SERVICE OVER BROADBAND NETWORKS

RELATED APPLICATIONS

This application (1) is a Continuation-In-Part (CIP) of U.S. patent application Ser. No. 13/962,883 (filed Aug. 8, 2013), which claims priority under 35 U.S.C. § 119 based on U.S. Provisional Application Ser. No. 61/680,959 (filed Aug. 8, 2012) and is a Continuation-In-Part (CIP) of U.S. patent application Ser. No. 13/428,323 (filed Mar. 23, 2012) (now U.S. Pat. No. 9,240,950, issued Jan. 19, 2016), which claims priority under 35 U.S.C. § 119 based on U.S. Provisional Application Ser. No. 61/466,794 (filed Mar. 23, 2011), the disclosures of which are incorporated herein by reference in their entireties; and (2) claims priority under 35 U.S.C. § 119 based on U.S. Provisional Application Ser. No. 62/293,764 (filed Feb. 10, 2016).

BACKGROUND

In current company/enterprise networks, modern applications such as voice over IP (VOIP) calling, videoconferencing, media streaming and virtualized applications require low latency and other stringent quality of service (QOS) constraints. Bandwidth requirements are also increasing, especially for applications featuring high-definition (HD) video. Such varying quality of service requirements in turn drive traffic prioritization requirements to ensure that data for applications requiring a higher quality of service receive priority treatment in order to deliver a certain minimum level of performance to the data flow. For example, a required bit rate, delay, jitter, packet dropping probability and/or bit error rate may be necessary for an application to operate at an acceptable performance level. Depending on the type of network, however, delivering the necessary quality of service requirements poses significant challenges.

In high performance broadband communications networks, certain protocols or services can be offered that support the quality of service requirements of high priority, real-time traffic applications. For example, multiprotocol label switching (MPLS) is a current service offering in such high performance networks (e.g., in T1/E1, ATM Frame Relay and DSL networks), which supports quality of service requirements of such applications. MPLS directs data from one network node to the next based on short path labels, rather than long network addresses (e.g., the Internet), avoiding complex lookups in routing tables. MPLS services generally are significantly more expensive than the more typical consumer and small business Internet services, and thus can be cost prohibitive. Alternatively, constant or guaranteed minimum bit rate services are also available, and can solve quality of service requirements of real-time applications, but such services are similarly cost prohibitive. Public broadband wide-area networks (WANs), such as the Internet, on the other hand, present various advantages over such dedicated private lines, such as cost advantages (including both equipment and service cost advantages), and a wide variety and availability of standard networking devices (e.g., modems, routers, virtual private network (VPN) gateways and routers). WANs allow enterprises/companies to extend their computer networks over large distances, to connect remote branch offices to data centers and each other, and deliver the applications and services required to perform business functions. Accordingly, considering the advantages of such public WANs, there is a compelling desire by enterprises to use such public broadband WANs (Internet services) as the transport for their private networks.

A software-defined WAN (SD-WAN) can be employed, which simplifies the management and operation of a WAN by decoupling the networking hardware from its control mechanism, and thereby makes Hybrid WANs more practical. An SD-WAN is a hybrid WAN that is controlled via software, where the SD-WAN software manages the edge routers and offers more flexibility than the protocols built into standard routers. For example, an SD-WAN can allow more traffic to traverse the less-costly public broadband side of the network (the Internet) and dynamically route packets to the private side when needed. SD-WAN products are designed to address such networking problems by enhancing or even replacing traditional branch routers with virtualization appliances that can control application-level policies and offer a network overlay, whereby less expensive consumer-grade Internet links can act more like a dedicated circuit. SD-WAN products can be physical appliances or virtual appliances, and are placed in small remote and branch offices, larger offices, corporate data centers, and increasingly on cloud platforms. A centralized controller is used to set policies and prioritize traffic. The SD-WAN takes into account these policies and the availability of network bandwidth to route traffic, which helps ensure that application performance meets QOS and service level agreement (SLA) requirements.

With SD-WAN technology, different types of networks can be utilized to address QOS requirements. For example, different types of traffic can be routed over respective networks of different technologies and protocols to address the QOS requirements of each specific traffic type (e.g., critical traffic can be routed over a dedicated MPLS network, and less important traffic over a less expensive network—such as a broadband network or a wireless LTE network. Further, while SD-WAN products and services vary by vendor, many enable hybrid WAN connectivity—dynamically routing traffic over both private and public links, such as leased MPLS links and broadband, Long Term Evolution (LTE) and/or wireless. An SD-WAN architecture allows administrators to reduce or eliminate reliance on expensive leased MPLS circuits by sending lower priority, less-sensitive data over cheaper public Internet connections, reserving private links for mission-critical or latency-sensitive traffic like VOIP.

Unlike single-owner networks, the Internet is a series of exchange points interconnecting private networks, owned and managed by a number of different network service providers. The architecture and general protocols of packet switched networks (such as the Internet), however, are far less reliable than the more expensive high performance private broadband communications networks. As a series of exchange points interconnecting private networks owned and managed by a number of different network service providers, the behavior of the Internet is unpredictable. In packet-switched networks (such as the Internet), quality of service is affected by various factors, such as: (1) low throughput, whereby, due to varying load from other users sharing the same network resources (e.g., congestion), the bit rate provided to a certain data stream may be too low if all data streams get the same scheduling priority; (2) dropped packets, whereby a router may fail to deliver packets (e.g., where the packet is corrupted or the routers buffers are full); (3) bit errors, whereby a packet may be corrupted by noise or interference; (4) latency, whereby a packet is delayed in reaching its destination (e.g., based on long queues or long routes due to congestion); (5) jitter, whereby packets from one source/application reach the destination with different delays, which delays can vary unpredictably and cause jitter; and (6) out-of-order packet delivery, whereby related packets from a single source/application are routed through a network over different paths and thus experience differing levels of delay resulting in the packets arriving at the destination in a different order from which they were sent (which requires special additional protocols responsible for rearranging out-of-order packets).

Additionally, conventional Internet routers and local area network (LAN) switches operate on a best effort basis, which generally does not support quality of service. Under a best effort delivery service, the network does not provide any guarantees for timing and order of data packet delivery, or any guarantees of data packet delivery at all—and thus do not generally provide any guaranteed quality of service or priority levels. In a best effort network, generally, all users obtain best effort service, meaning that they obtain unspecified variable bit rate and delivery time, depending on the current traffic load. The lack of reliability permits various error conditions, such as data corruption, packet loss and duplication, as well as out-of-order packet delivery. Since routing is dynamic for every packet and the network maintains no state of the path of prior packets, it is possible that some packets are routed on a longer path to their destination, resulting in improper sequencing at the receiver. Such networks, therefore, are generally unreliable for real-time applications, such as VOIP.

A Hybrid WAN can be employed to connect a geographically dispersed wide area network (WAN). A Hybrid WAN connects a geographically dispersed wide area network (WAN) by sending traffic over two or more sequential connection types (e.g., a hybrid WAN may employ dedicated multiprotocol label switching (MPLS) circuits plus carrier Ethernet plus T3 links). More recently, hybrid WANs have evolved to encompass traditional leased lines in concert with public Internet connections. By using this approach, a hybrid WAN can give organizations a more versatile and cost-effective way to connect their offices while still relying on dedicated links to send mission-critical data. A Hybrid WAN may extend enterprise networks across networks of multiple carriers, and thus face they face operational challenges including network congestion (e.g., brownouts), jitter, packet loss, and service outages (blackouts). Further, complexities relating to management and troubleshooting can render it prohibitively expensive difficult to expand WAN capabilities. Further, broadband Internet access suffers more complete outages (blackouts) and periods of time of poor quality of service (brownouts) than private lines.

What is needed, therefore, is an approach for a secure private networking solution that achieves improved network availability in enterprise Hybrid WAN networks, and facilitates support of application-level quality of service traffic requirements of enterprise applications, and which is more cost effective than private networking solutions that employ dedicated circuits.

SOME EXAMPLE EMBODIMENTS

Embodiments of the present invention advantageously addresses the needs above, as well as other needs, by providing an approach whereby multiple (e.g., dual) broadband connections operate together to provide a highly available secure private networking solution that is more cost effective than private networking solutions that employ dedicated circuits, and whereby each broadband connection optionally includes support for quality of service (QOS) for data packet transmissions via a network transport optimization overlay.

In accordance with example embodiments a method is provided. The method comprises receiving a plurality of data packets of a communications data flow for transmission to a remote destination node over a wide area data communications network. The method further comprises determining a service classification for the data flow. The method further comprises generating a sequence number for each data packet of the data flow, where the sequence numbers indicate an order by which the data packets are received, and adding an indication of the service classification and the respective sequence number to each data packet to be transmitted with the packet. The method further comprises, for each data packet, determining a transport mode (TM) that indicates one or more of a plurality of VPN tunnels through which the data packet is to be transmitted, where the determination of the one or more VPN tunnels is based on the service classification, and wherein each VPN tunnel is carried over a respective wide area network (WAN) transport of the wide area data communications network. By way of example, the service classification is based on an availability classification indicating a requisite level of transport availability for the communications data flow. By way of further example, the availability classification is based on a quality of service (QOS) classification of the data flow. By way of further example, the determination of the TM is further based on transport qualification (TQ) criteria identifying at least one characteristic required for the WAN transport to be qualified to carry the data packets based on one or more of a classification of the data flow and a classification of an application from which the data flow was generated. By way of further example, the WAN transports of the wide area data communications network comprise a first WAN transport and a second WAN transport, and the TM determined for each data packet comprises one of an indication (WAN1) that the data packet is to be transmitted through the VPN tunnel carried by the first WAN transport; an indication (WAN2) that the data packet is to be transmitted through the VPN tunnel carried by the second WAN2 transport, and an indication (DUP) that the data packet is to be carried by the first WAN transport and a duplicate copy of the data packet is to be carried by the second WAN transport. By way of further example, the TM of DUP is determined when the service classification determined for the data flow indicates a high priority class of service requiring one or more of transmission in real-time, low latency transmission, a low packet loss rate and minimal jitter.

According to a further embodiment, the method further comprises determining a transport role for each WAN transport, where the transport role indicates circumstances under which the respective WAN transport is appropriate for transmission of one or more of the data packets of the data flow, and where the determination of the TM is further based on the transport role for each WAN transport.

According to a further embodiment, the method further comprises determining a transport role for each WAN transport, where the transport role for each WAN transport is determined based on an extent to which a level of data packet transmissions over the WAN transport is monitored based on one or more of data rate and data volume, and where one or more of restrictions and increased costs are imposed based on the monitored level, and where the determination of the TM is further based on the transport role for each WAN transport. By way of example, the transport role of a first of the WAN transports is determined as having a metered role, where a level of data packet transmissions over the WAN transport is monitored based on one or more of data rate and data volume, and where one or more of restrictions and increased costs are imposed based on the monitored level, the transport role of a second of the WAN transports is determined as having an unmetered role, where the level of data packet transmissions over the WAN transport is not subject to one or more of restrictions and increased costs, and the TM determined for each data packet of the data flow indicates that the data packet is to be transmitted through the VPN tunnel carried by the second WAN transport.

According to a further embodiment, the method further comprises determining an operational connectivity status of each of the WAN transports as being one of (i) a clean status, where the WAN transport is operating such that the operational connectivity is sufficient for the requisite level of transport availability for the communications data flow, (ii) a blackout status, where the WAN transport is experiencing a complete outage, and (iii) a brownout status, where the WAN transport is operating such that the operational connectivity is insufficient for the requisite level of transport availability for the communications data flow; and where the transport role of a first of the WAN transports is determined as having a metered role, where a level of data packet transmissions over the WAN transport is monitored based on one or more of data rate and data volume, and where one or more of restrictions and increased costs are imposed based on the monitored level; and where the transport role of a second of the WAN transports is determined as having an unmetered role, where the level of data packet transmissions over the WAN transport is not subject to one or more of restrictions and increased costs; and where the TM determined for each data packet of the data flow indicates that (i) when the operational connectivity status of the second WAN transport is determined as the clean status, the data packet is to be transmitted through the VPN tunnel carried by the second WAN transport, and (ii) when the operational connectivity status of the second WAN transport is determined as either the blackout status or the brownout status, the data packet is to be transmitted through the VPN tunnel carried by the first WAN transport.

According to a further embodiment, the method further comprises determining an operational connectivity status of each of the WAN transports, where the determination of the TM is further based on the operational connectivity status determined for each of the WAN transports.

In accordance with example embodiments an apparatus of a first node of a wide area data communications network is provided. The apparatus comprises a network interface configured to receive a plurality of data packets of a communications data flow for transmission from the first node to a remote node over the wide area data communications network. The apparatus further comprises a processor configured to determine a service classification for the data flow, to generate a sequence number for each data packet of the data flow, where the sequence numbers indicate an order by which the data packets are received, and to add an indication of the service classification and the respective sequence number to each data packet to be transmitted with the packet. Further, for each data packet, the processor is further configured to determine a transport mode (TM) that indicates one or more of a plurality of VPN tunnels through which the data packet is to be transmitted, where the determination of the one or more VPN tunnels is based on the service classification, and wherein each VPN tunnel is carried over a respective wide area network (WAN) transport of the wide area data communications network. By way of example, the service classification is based on an availability classification indicating a requisite level of transport availability for the communications data flow, and the availability classification is based on a quality of service (QOS) classification of the data flow. By way of further example, the determination of the TM is further based on transport qualification (TQ) criteria identifying at least one characteristic required for the WAN transport to be qualified to carry the data packets based on one or more of a classification of the data flow and a classification of an application from which the data flow was generated. By way of further example, the WAN transports of the wide area data communications network comprise a first WAN transport and a second WAN transport, and the TM determined for each data packet comprises one of an indication (WAN1) that the data packet is to be transmitted through the VPN tunnel carried by the first WAN transport; an indication (WAN2) that the data packet is to be transmitted through the VPN tunnel carried by the second WAN2 transport, and an indication (DUP) that the data packet is to be carried by the first WAN transport and a duplicate copy of the data packet is to be carried by the second WAN transport.

According to further example embodiment of the apparatus, the processor is further configured to determine a transport role for each WAN transport, where the transport role indicates circumstances under which the respective WAN transport is appropriate for transmission of one or more of the data packets of the data flow, and where the determination of the TM is further based on the transport role for each WAN transport.

According to further example embodiment of the apparatus, the processor is further configured to determine a transport role for each WAN transport, where the transport role for each WAN transport is determined based on an extent to which a level of data packet transmissions over the WAN transport is monitored based on one or more of data rate and data volume, and where one or more of restrictions and increased costs are imposed based on the monitored level, and where the determination of the TM is further based on the transport role for each WAN transport.

According to further example embodiment of the apparatus, the processor is further configured to determine an operational connectivity status of each of the WAN transports, where the determination of the TM is further based on the operational connectivity status determined for each of the WAN transports.

According to further example embodiment of the apparatus, the processor is further configured to determine an operational connectivity status of each of the WAN transports as being one of (i) a clean status, where the WAN transport is operating such that the operational connectivity is sufficient for the requisite level of transport availability for the communications data flow, (ii) a blackout status, where the WAN transport is experiencing a complete outage, and (iii) a brownout status, where the WAN transport is operating such that the operational connectivity is insufficient for the requisite level of transport availability for the communications data flow; and where the transport role of a first of the WAN transports is determined as having a metered role, where a level of data packet transmissions over the WAN transport is monitored based on one or more of data rate and data volume, and where one or more of restrictions and increased costs are imposed based on the monitored level; and where the transport role of a second of the WAN transports is determined as having an unmetered role, where the level of data packet transmissions over the WAN transport is not subject to one or more of restrictions and increased costs; and where the TM determined for each data packet of the data flow indicates that (i) when the operational connectivity status of the second WAN transport is determined as the clean status, the data packet is to be transmitted through the VPN tunnel carried by the second WAN transport, and (ii) when the operational connectivity status of the second WAN transport is determined as either the blackout status or the brownout status, the data packet is to be transmitted through the VPN tunnel carried by the first WAN transport.

In accordance with example embodiments a wide area data communications network is provided. The network comprises a first network node, a second network node, a plurality of wide area network (WAN) transports, each configured to carry packet data transmissions over the wide area network between the first network node and the second network node, and a plurality of modem devices, each configured to transmit data packets over a respective one of the WAN transports. Where the first network node comprises a first FNN network interface configured to receive a plurality of data packets of a local communications data flow for transmission from the first network node to the second network node over the wide area data communications network. Where the first network node further comprises a plurality of second FNN network interfaces, each connected to a respective one of the modem devices. Where the first network node further comprises: a processor configured to determine a service classification for the data flow, to generate a sequence number for each data packet of the data flow, where the sequence numbers indicate an order by which the data packets are received by the first network node, and to add an indication of the service classification and the respective sequence number to each data packet to be transmitted with the packet; and for each data packet, the processor is further configured to determine, based on the service classification, one or more of the WAN transports over which the data packet is to be transmitted, and to forward the packet to each of the second FNN network interfaces that is connected to a one of the modem devices for a one of the WAN transports determined for transmission of the packet. Where the second network node comprises a network interface configured to receive the data packets transmitted over the determined WAN transports. Where the second network node further comprises a processor configured to decode the received data packets, and to re-sequence the decoded data packets, based on the sequence number added to each data packet, into the data flow as received by the first network node.

Still other aspects, features, and advantages of the invention are readily apparent from the following detailed description and accompanying drawings, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
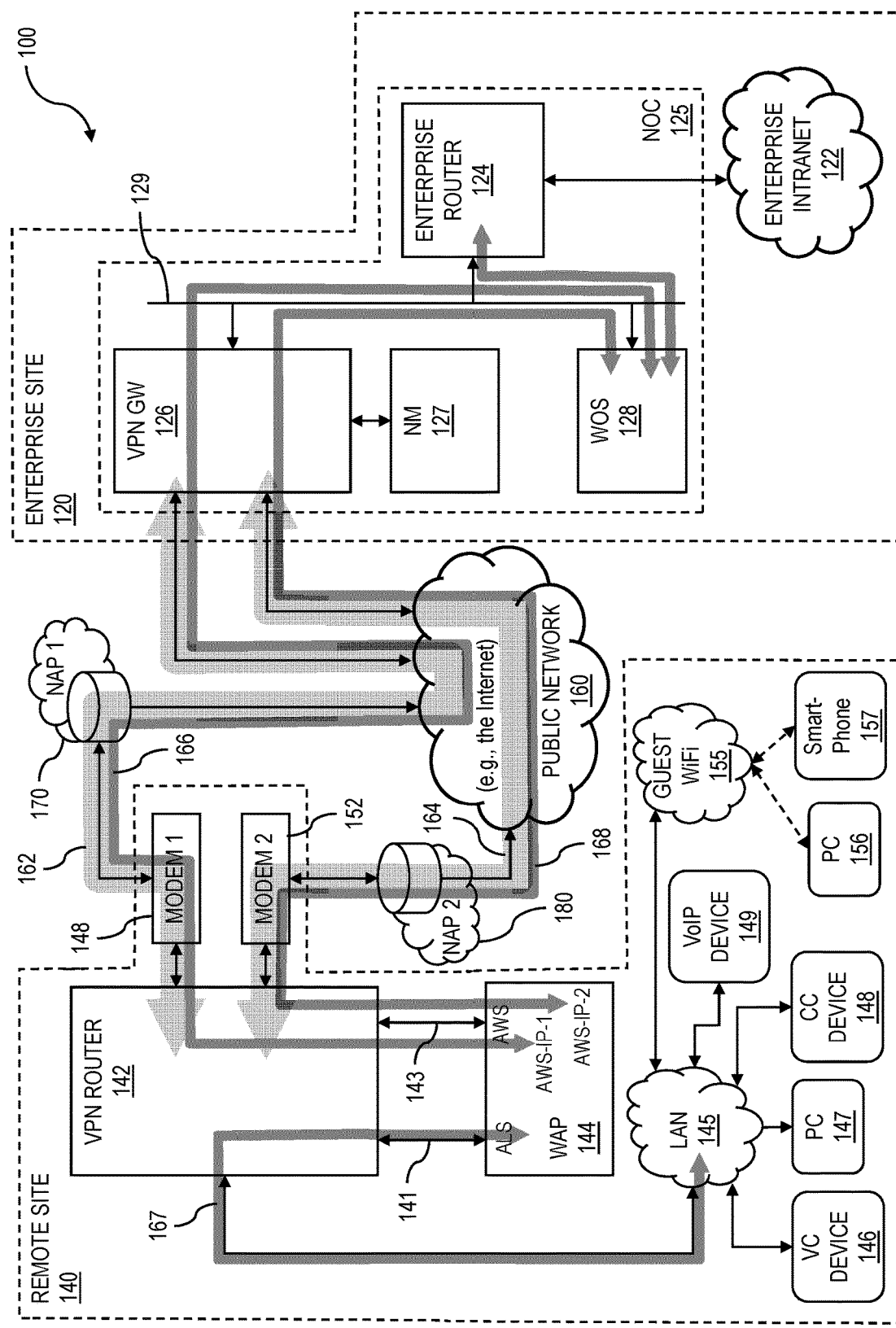
FIG. 1A illustrates a block diagram depicting an example communications network including multiple WAN transports, each carrying a VPN tunnel, in accordance with example embodiments.

Systems and methods whereby multiple (e.g., dual) broadband connections operate together to provide a highly available secure private networking solution that is more cost effective than private networking solutions that employ dedicated circuits, and whereby each broadband connection optionally includes support for quality of service (QOS) for data packet transmissions via a network transport optimization overlay, are disclosed. Such support for quality of service (QOS) for data packet transmissions is also referred to herein as targeted extra latency quality of service overlay (TELQO) functionality, which is described below and further described in U.S. patent application Ser. No. 13/962,883 (filed Aug. 8, 2013), the entirety of which is incorporated by reference herein. In the following description, for the purposes of explanation, numerous specific details are set forth in order to provide a thorough understanding of the present invention. The present invention is not intended to be limited based on the described embodiments, and various modifications will be readily apparent. It will be apparent that the invention may be practiced without the specific details of the following description and/or with equivalent arrangements. Additionally, well-known structures and devices may be shown in block diagram form in order to avoid unnecessarily obscuring the invention. Further, the specific applications discussed herein are provided only as representative examples, and the principles described herein may be applied to other embodiments and applications without departing from the general scope of the present invention.

In accordance with example embodiments, two or more broadband connections or paths (e.g., wide area network (WAN) transports) are used in combination (where each connection may include a link over a public broadband network such as the Internet) to achieve improved wide area network WAN connectivity. Such improved connectivity includes, for example, higher application availability against blackouts and brownouts, higher effective capacity (e.g., roughly the total capacity of the two broadband connections), and in some situations (e.g., for 4G/5G cellular and very small aperture terminal (VSAT) satellite applications) a lower bandwidth cost (lower cost per GB of data). Such use of two or more WAN transports in combination to provide better WAN connectivity achieves: (i) higher application availability by facilitating WAN switch-over in WAN transport blackout situations with little or no switchover time, consistent superior interactive/real-time performance and bulk throughput in WAN transport brownout situations; (ii) higher capacity (roughly total capacity); and (iii) lower cost–lower cost per GB of traffic for network paths involving 4G+VSAT connections. Further, such embodiments provide these associated advantages while being compatible with additional features of enterprise WANs, such as dynamic or active quality of service, dynamic or active compression, dynamic or active traffic classification, and packet-loss tolerance. A network brownout (also known as a soft outage) occurs when there is a significant reduction in application or service performance as a result of network problems such as congestion, packet loss, link or equipment failures or configuration errors. Brownouts differ from blackouts (also known as hard outages) which occur when a network or portion of a network fails completely. Brownouts occur when connectivity theoretically still exists but excessive latency and loss make the network effectively unusable.

According to such embodiments, policies are employed for conveniently and effectively employing multiple (e.g., dual) broadband transports over a wide area network (WAN transports), which may be of varying quality and characteristics, for transmission of data flows (e.g., IP-flows), and automatically adapting such transmission among the transports based on changing transmission conditions over the transports. Such policies may be referred to herein as acceleration multipath policies or multipath WAN transport policies (which may be abbreviated herein as AMP). The AMP functionality implements individual mechanisms for carrying different kinds of traffic across the multiple broadband transports, which mechanisms include load balancing the traffic and resequencing it at the peer end, sending packets across both transports for higher probability of successful transmission with de-duplication and resequencing to restore the original packet stream, sending just retransmission packets across both transports to ensure a very high probability of either the first transmission or first retransmission being successful thereby allowing a bulk transfer to maintain full speed operation in the presence of significant packet loss. Additionally, path brownout or suspected brownout conditions can be diagnosed, and different brownout criteria is applied to different applications (streams of packets).

The following table specifies various mechanisms/features of the employed policies and examples of associated WAN transport combinations.

| Feature | Value-Add | Cable + Metered 4G | DSL + Metered 4G | Cable + DSL * | MPLS + Cable | 4G + VSAT | DSL + VSAT |
|---|---|---|---|---|---|---|---|
| Hitless Blackout Protection | No outage for selected applications (e.g. VOIP, credit card, etc.). | | | ✓ | ✓ | | |
| Interactive & Real-Time Blackout Protection | Recovery as low as <2 sec. | ✓ | ✓ | ✓ | ✓ | ✓ | ✓ |
| Interactive & Real-Time Brownout Protection | Performance as good or better than the next best transport. | ✓ w/ higher 4G usage | ✓ w/ higher 4G usage | ✓ | ✓ | As or better than VSAT perf. | As or better than VSAT perf. |
| Bulk Xfer Blackout Protection | Resumed transfer as low as <2 sec. | ✓ | ✓ | ✓ | ✓ | ✓ | ✓ |
| Bulk Xfer Brownout Protection | Sustained throughput even with significant packet-loss. | ✓ w/ higher 4G usage | ✓ w/ higher 4G usage | ✓ | ✓ | ✓ | ✓ |
| Higher Overall Capacity | Available capacity near sum of capacity of transports. | NO | NO | ✓ | ✓ | ✓ w/ higher VSAT usage | ✓ w/ higher VSAT usage |

| Feature | Value-Add | Cable + Metered 4G | DSL + Metered 4G | Cable + DSL * | MPLS + Cable | 4G + VSAT | DSL + VSAT |
|---|---|---|---|---|---|---|---|
| Higher Individual Application Throughput | Available throughput near capacity sum of transports, subject to bandwidth sharing w/ other applications. | NO | NO | ✓ | ✓ | ✓ w/ higher VSAT usage | ✓ w/ higher VSAT usage |
| Lower Cost/GB | Lower usage cost. | | | | | ✓ | |
| Remote High Capacity | High-Capacity/more responsive than VSAT | | | | | ✓ | ✓ |

* or cable + fiber subject to CPU-based throughput limitations.

Further, the following table specifies achieved goals with respect to the foregoing examples of associated WAN transport combinations:

| WAN Transports | Achieved Goals |
|---|---|
| Cable + 4G | High-Capacity + High-Availability for Enterprise Apps |
| DSL + 4G | Low-Capacity + High-Availability for Enterprise Apps |
| Cable + DSL (or Cable + Fiber) | High Capacity + "Hitless" Availability for Enterprise Apps & VOIP |
| 4G + VSAT | Remote High Capacity w/High-Availability as a side-benefit |
| DSL + VSAT | Remote High Capacity w/High-Availability as a side-benefit |
| MPLS + Cable | High-Capacity w/Highest Availability for Enterprise Apps & VOIP |

Figure 1B:
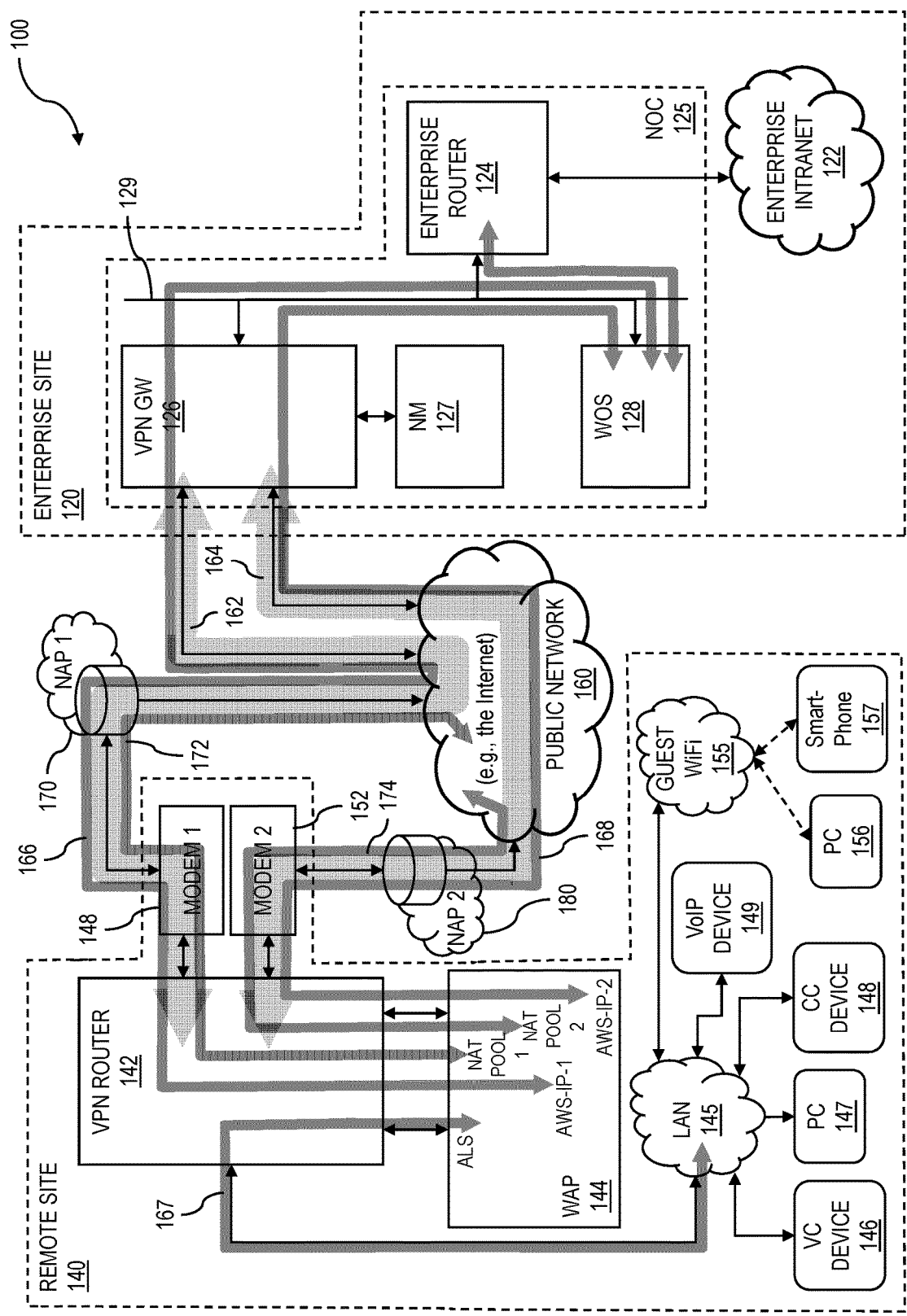
FIG. 1B illustrates a block diagram depicting the example communications network of FIG. 1, where each multi-WAN transport further carries a split-tunnel traffic, in accordance with example embodiments.

FIG. 1A illustrates a block diagram depicting an example communications network including multiple WAN transports, each carrying a respective acceleration (e.g., VPN) tunnel, and FIG. 1B illustrates a block diagram depicting the example communications network of FIG. 1, where each multi-WAN transport further carries a respective split-tunnel, in accordance with example embodiments. FIGS. 1A and 1B depict one possible embodiment for the implementation of the VPN Router 142 and the WAP 144 as separate components. As would be recognized by one of skill in the art, other embodiments for the implementation would also be possible (e.g., implementing the WAP 144 within a separate core of the VPN Router), without departing from the spirit and scope of the present invention. Similarly the same holds true for the implementation of the VPN GW 126 and the WOS 128. Further, while the embodiments of FIGS. 1A and 1B depict a single VPN GW and WOS on the LAN 129, one of skill in the art would recognize that alternative embodiments may be employed (e.g., with multiple VPN GWs and/or multiple WOSs on the LAN for redundancy purposes and/or other network scaling purposes), without departing from the spirit and scope of the present invention. With reference to FIG. 1A, the communications network 100 includes the enterprise site 120, the remote site 140 the public network 160, and the network access providers 170 (NAP 1) and 180 (NAP 2). The public network 160 can be any publicly accessible wide area network, such as the Internet. The enterprise site 120 may be an enterprise corporate headquarters or other large corporate facility, while the remote site 140 reflects a remote corporate office or other remote facility (e.g., a remote retail facility) of the enterprise. Each of the network access providers, NAP 1 and NAP 2, are third-party access providers who provide connectivity and broadband communications services for the remote site 140 over the public network 160. For example, each of the NAPs provides access to the public network 160 to the remote site 140 via a respective transport medium, such as cable, DSL, fiber, 4G, satellite (e.g., VSAT), MPLS, T1, etc., and provides broadband communications services over the public network 160.

The remote site 140 includes the modems 148 (modem 1) and 152 (modem 2), the VPN router, 142 the WAN optimization appliance (WAP) 144 (which may also referred to herein as an acceleration appliance (AA)), the local area network (LAN) 145 connected to the videoconferencing (VC) device 146, the personal computer (PC) 147, the credit card (CC) device 148 and the voice over Internet protocol (VOIP) device 149, and the guest WiFi network 155 wirelessly connected to the laptop PC 156 and the smart-phone 157. One of skill in the art, however, would recognize that the networked devices connected to the LAN and to the guest WiFi are not limited to such, but can also include, printers, scanners, copiers, or any other network-enabled electronic device. Each of the modems provides a connection from the remote site to a respective NAP via a respective transport medium (e.g., cable, DSL, fiber, 4G, satellite (e.g., VSAT), MPLS, T1, etc.) and protocol (e.g., Internet protocol or IP). For example, the modem 1 may provide a fiber connection to the NAP 1, and the NAP 1 provides Internet services to the remote site 140 over the fiber connection via the modem 1. Similarly, the modem 2 may provide an MPLS connection to the NAP 2, and the NAP 2 provides Internet services to the remote site 140 over the MPLS connection via the modem 152. The connection between the remote site modem and the respective NAP is often referred to as the "last mile" or the "last mile link." The LAN provides local connectivity for devices at the remote site to access the public network or Internet services provided to the remote site via the modems 148, 152. By way of example, such local devices may include a VOIP device 149 that provides VOIP telecom services to VOIP handsets throughout the remote site, a credit card device 148 that provides credit card authorizations for point-of-sale (POS) transactions performed at the remote site, one or more personal computers 147 for employees at the remote site, and videoconferencing device 146 for providing videoconferencing between the remote site 140 and the enterprise site 120.

The enterprise site 120 includes the Network Operations Center (NOC) 125 and the enterprise intranet 122, and the NOC 125 includes the VPN gateway (GW) 126, the network manager (NM) 127, the WAN optimization server (WOS) 128 (which may also be referred to herein as an acceleration gateway (AGW)) and the enterprise router 124. The VPN gateway and the WOS are interfaced together via the gateway subnet 129. In alternative embodiments, the NOC 125 can include further VPN gateways and acceleration gateways interfaced on the gateway subnet 129, where such further gateways may be included for gateway redundancy and other design purposes. The enterprise intranet provides connectivity for devices throughout the enterprise site and provides corporate networking services to employees via such devices. The enterprise router provides the routing functionality for the corporate networking services and devices of the enterprise site. For example, the corporate networking services provided via the enterprise intranet may comprise corporate email services, unified storage for company documents and other data to which company employees may need access, and remote access to business applications used in the course of the company's business (e.g., office applications, such as word processing, spreadsheet and database applications, and financial and accounting applications). The enterprise router also provides the routing functionality for routing data transmissions to and from the public network 160 via the VPN gateway 126. The VPN gateway, in turn, provides VPN access to the enterprise intranet, and potentially other enterprise networks (not shown). The network manager (NM), which is connected to VPN gateway via a management interface (e.g., dedicated network interface), configures and monitors the VPN gateway 126 and VPN router 142.

With further reference to FIG. 1A, data for the communication services provided between the enterprise site 120 in the remote site 140 is transmitted over the public network 160 via the VPN tunnels 162, 164. Virtual Private Network (VPN) tunnels are frequently used to connect an enterprise network to one or more remote sites. A VPN tunnel permits the establishment of an encrypted data connection (e.g., an IPSEC tunnel) between a central site and remote sites using a public network (e.g., the Internet) as an intermediary data link. A VPN allows devices within a remote site to seamlessly interact with devices in the central site or another remote site, as if they were locally situated. A VPN router is used to establish such a connection between a network at the remote site and the central site, by providing secure broadband access to the end-users over a terrestrial broadband network. The VPN tunnel connects between the VPN router at the remote site to a VPN gateway at a network operations center (NOC) of the enterprise site through a third party Network Access Provider (NAP) via a modem. The type of modem (e.g., a component-off-the-shelf (COTS) device) installed at the remote site may depend on, for example, the customer requirements, cost and service availability from various vendors in different geographical regions.

By way of example, the VPN router is responsible for establishing one VPN tunnel per broadband modem (alternatively, for head-end redundancy, the enterprise site may include multiple VPN gateways, and each VPN tunnel would be configured to connect to a different respective VPN gateway at the enterprise site). By way of further example, the VPN tunnels are configured for network address translation (NAT) traversal based on the NAT functions of the respective modems 148, 152. As depicted in FIG. 1A, a VPN connection or tunnel 162 (e.g., an Internet Protocol Security (IPSEC) tunnel) is formed between the VPN gateway 126 and the VPN router 142, via the modem 148 and NAP 170, and a VPN connection or tunnel 164 (e.g., an Internet Protocol Security (IPSEC) tunnel) is formed between the VPN gateway 126 and the VPN router 142, via the modem 152 and NAP 180. Accordingly, data transmissions from remote site VPN router to the VPN gateway are encapsulated into IPSEC packets by the VPN router 142. The IPSEC packets are sent over the public network 160 and received by VPN gateway 126, which de-encapsulates the IPSEC packets to obtain the original data transmissions. Similarly, data transmissions from the enterprise site to the remote site are also encapsulated into IPSEC packets by the VPN gateway 126. The IPSEC packets are sent over the public network 160 and received by VPN router 142, which de-encapsulates the IPSEC packets to obtain the original data transmissions.

The packets sent over the VPN tunnels can be configured as standard Internet protocol (IP) packets according to a transmission control protocol (TCP) or a user datagram protocol (UDP). Further, the network 100 may incorporate a network transport enhancement or acceleration functions. According to example embodiments, the VPN router 142 (together with the processing performed by the WAP 144) and the VPN gateway 126 (together with the processing performed by the WOS 128) establish and control such transport enhancement or acceleration functions. With further reference to FIG. 1A, for example, each of the VPN tunnels 162, 164 incorporates a respective acceleration transport 166, 168. The term "Acceleration Transport" refers to the transmission of packets, by the WAP 144, from the remote LAN 145 to the VPN GW 126 over the WANs 162, 164. Such packet transmissions (as shown in FIG. 1A) are sent over the acceleration transports 166, 168, which are provided through the IPSEC tunnels or WAN transports 162, 164 of the modems 148, 152. By way of example, such network enhancement or acceleration functions may utilize an optimized backbone protocol, referred to as the Terrestrial-Broadband Backbone Protocol (TBP), to carry TCP traffic across the broadband network via the VPN tunnels. The TBP automatically measures and adjusts to available capacity providing performance gains over native TCP across such DSL, EVDO, T1 and other networks (e.g., when operating over networks where there is congestion in the network beyond the last mile link—between each remote site modem and the respective NAP). TBP more effectively recovers from packet loss than native TCP. The enhanced performance-enhancing solution configures the TCP connections to run with a maximum segment size (MSS) that can be efficiently carried by the underlying transport and which avoids packet fragmentation. When compared with native TCP, TBP makes TCP traffic operate with more consistent, and with better performance across broadband networks with congested last, middle and/or public network (e.g., Internet) links or hops, especially in the presence of packet loss.

According to one embodiment, the WAP 144 is responsible for establishing one acceleration transport per modem, whereby associated WAN characteristics are determined and active or dynamic quality of service prioritization is provided. In order to facilitate this, a pair of LAN or network interface connections 141, 143 are implemented between the VPN router 142 and the WAP 144, whereby the WAP effectively operates as a "middle-man," processing the data traffic traveling between the VPN router LAN interfaces (e.g., to the LAN 145) and the VPN router WAN interfaces (e.g., to the VPN router interfaces for the modem 1 and to the modem 2). In other words, the WAP maintains an acceleration appliance LAN interface (ALS) for receiving packets from and sending packets to the remote LAN 145 via the VPN router 142, and the data traffic/packets from the LAN 145 travel through the VPN router to the WAP via the ALS LAN transport 167. Further, the WAP maintains an acceleration appliance WAN LAN interface (AWS) for sending packets upstream across the WAN via the VPN router 142. To facilitate this, the WAP maintains an AWS IP address configured for each acceleration transport 166, 168.

The VPN router is responsible for establishing the routing for each VPN tunnel and communicating the routing to the VPN gateway. For upstream traffic (from the remote site LAN 145 to the enterprise intranet 122), the VPN router 142 source-routes packets from the IP address AWS-IP-x to the WOS 128 thru the VPN tunnel x. For downstream traffic (from the enterprise intranet 122 to the remote LAN 145), the VPN router configures the IPSEC tunnels so that downstream packets from the WOS 128 to an AWS IP address are routed through and carried by the appropriate IPSEC tunnel and forwarded across the AWS to the WAP 144. The specific acceleration transport addressing for each data packet thus depends on the respective VPN tunnel via which the data packet is to be transmitted (where the associated routing is configured between the VPN router and the VPN gateway for the selected VPN tunnel).

Further, the concept of an acceleration tunnel is related to, but different from, that of an Acceleration Transport. An acceleration tunnel carries a subset of the data traffic of a WAP (for example) that, as a collection, shares access to WAN capacity. The traffic of a particular acceleration tunnel (as a whole) is prioritized to be carried together, and that acceleration tunnel shares WAN capacity with the other acceleration tunnels. An acceleration tunnel competes with other acceleration tunnels for access to the respective Acceleration Transports. According to one embodiment, the WAP supports the following Acceleration Tunnels: (i) IPSEC Acceleration Tunnel, which carries traffic through the IPSEC tunnels; (ii) Split-Tunnel, which carries traffic from a LAN (e.g., the remote LAN 145) directly to/from hosts on the Internet; (iii) Guest Split-Tunnel, which carries traffic to/from a guest LAN directly to/from hosts on the Internet; and (iv) Supplemental Acceleration Tunnel(s), which are optional tunnels that carry all traffic from designated LAN subnets through the IPSEC tunnels (keeping that traffic separated from the traffic of IPSEC acceleration tunnels) competing for and sharing WAN capacity with other tunnels. These tunnels are also referred to as GRE tunnels because like the GRE protocol they keep their traffic completely separated from other traffic.

With reference to FIG. 1B, according to one embodiment of a split-tunnel processing, the WAP 144 performs a Simple Network Address Translation (NAT), where each host on a LAN that generates split-tunnel data traffic is semi-permanently assigned a NAT'ed IP address from a pool of addresses referred as the NAT pool (as further described in the Internet Engineering Task Force (IETF) publication RFC 263 as a "Basic NAT"). This NAT operation is useful in that it prevents the VPN router from processing upstream packets with source IP addresses from the remote LAN coming across both its LAN interface and its AWS interface. Some VPN routers treat that situation as a security violation. It also facilitates the VPN router's routing of downstream split-tunnel packets back to the WAP. Further, the WAP may use half of the NAT pool addresses for enterprise split-tunnel and half of the addresses for guest-split tunnel. By way of example, in the upstream traffic direction (from the remote LAN 145), the split-tunnel data packets are received by the WAP, from a respective LAN host, via the ALS LAN transport 167. The WAP routes the packets based on their destination IP address, and determines that the packets are to be transmitted via split-tunnel. The WAP then performs a Simple NAT operation on the packets, replacing their source IP address and forwards the packets over the AWS to the VPN router 142. Then, based on the source IP address, the VPN router source-routes the packets for split-tunnel transmission—the VPN router performs a Network Address with Port Translation (NAPT) operation (also referred to as NAT) on the packets and sends them to the public network 160 (e.g., the Internet) via one of the split-tunnels 172, 174, respectively carried by the WANs 162, 164. By way of further example, in the downstream direction, the VPN router receives the split-tunnel data packets from the public network 160 (e.g., the Internet) via one or both of the split-tunnels 172, 174, and performs a NAPT operation on them to restore the destination IP address to the address from the NAT pool of the WAP. The VPN router then routes the packets across the AWS to the WAP, and the WAP performs the Simple NAT operation on the packets to restore the original LAN IP address and routes them to the respective LAN host via the ALS LAN transport 167.

The WAP is configured to select the particular WAN Transport over which a given upstream split-tunnel packet will be transmitted. This selection is facilitated by the support of a separate Simple NAT translator with its own NAT pool for each of the split-tunnels (and thereby also the respective broadband modem and associated connection to the public network 160 or Internet). The particular WAN Transport for split-tunnel traffic is selected based on the Multipath WAN Transport Policies (described in further detail below) and routes the packets through the respective NAT translator for that tunnel (e.g., NAT Pool 1 for the split-tunnel 172 and NAT Pool 2 for the split tunnel 174). The VPN router, based on the downstream IP address, source routes the upstream packets through the appropriate NAPT and through the appropriate WAN interface and through the appropriate modem to the public network. The converse takes place in the downstream direction.

Figure 2:
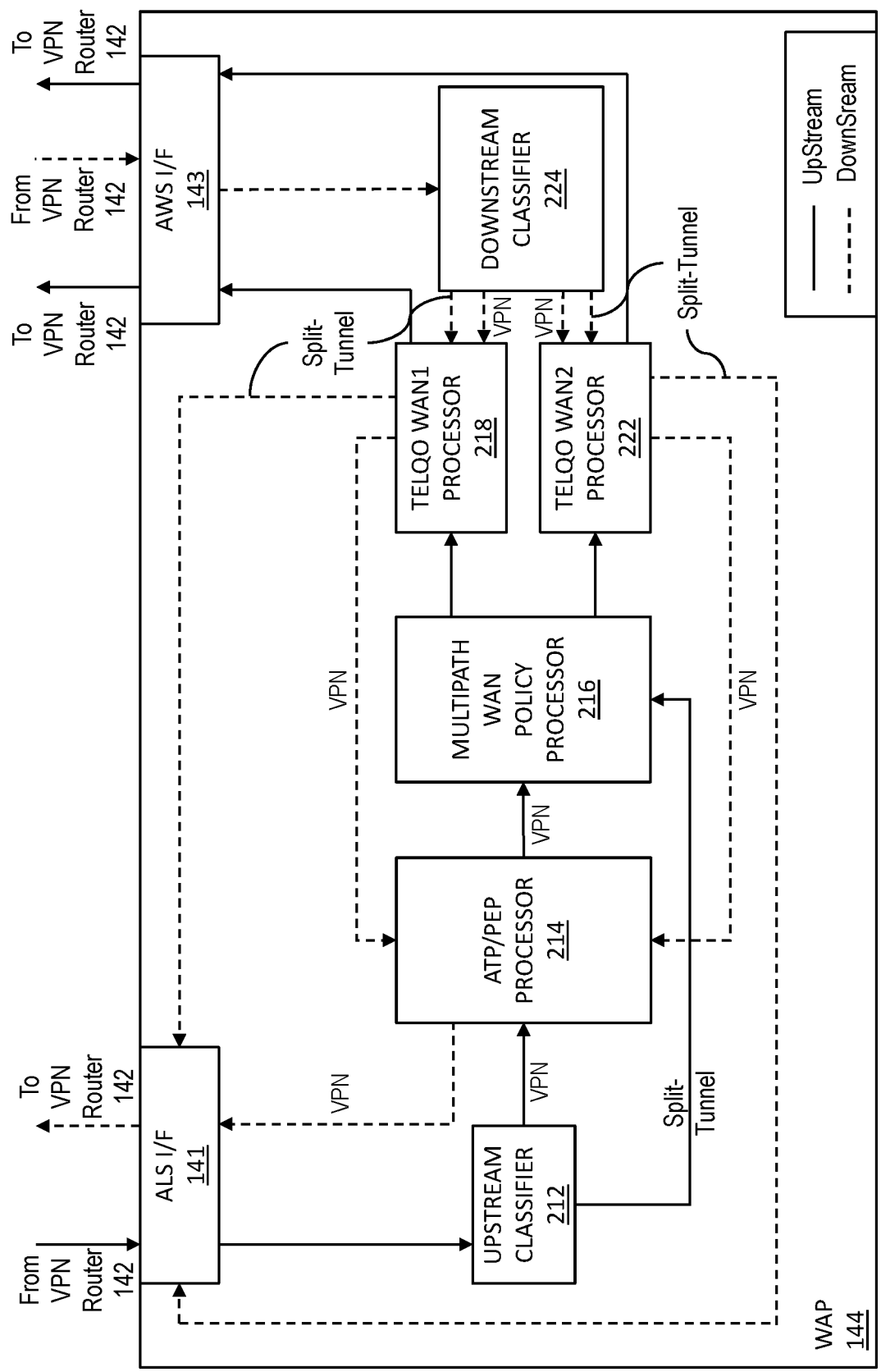
FIG. 2 illustrates a block diagram depicting an example of the WAN optimization appliance (WAP) of FIG. 1, in accordance with various example embodiments.
Figure 3:
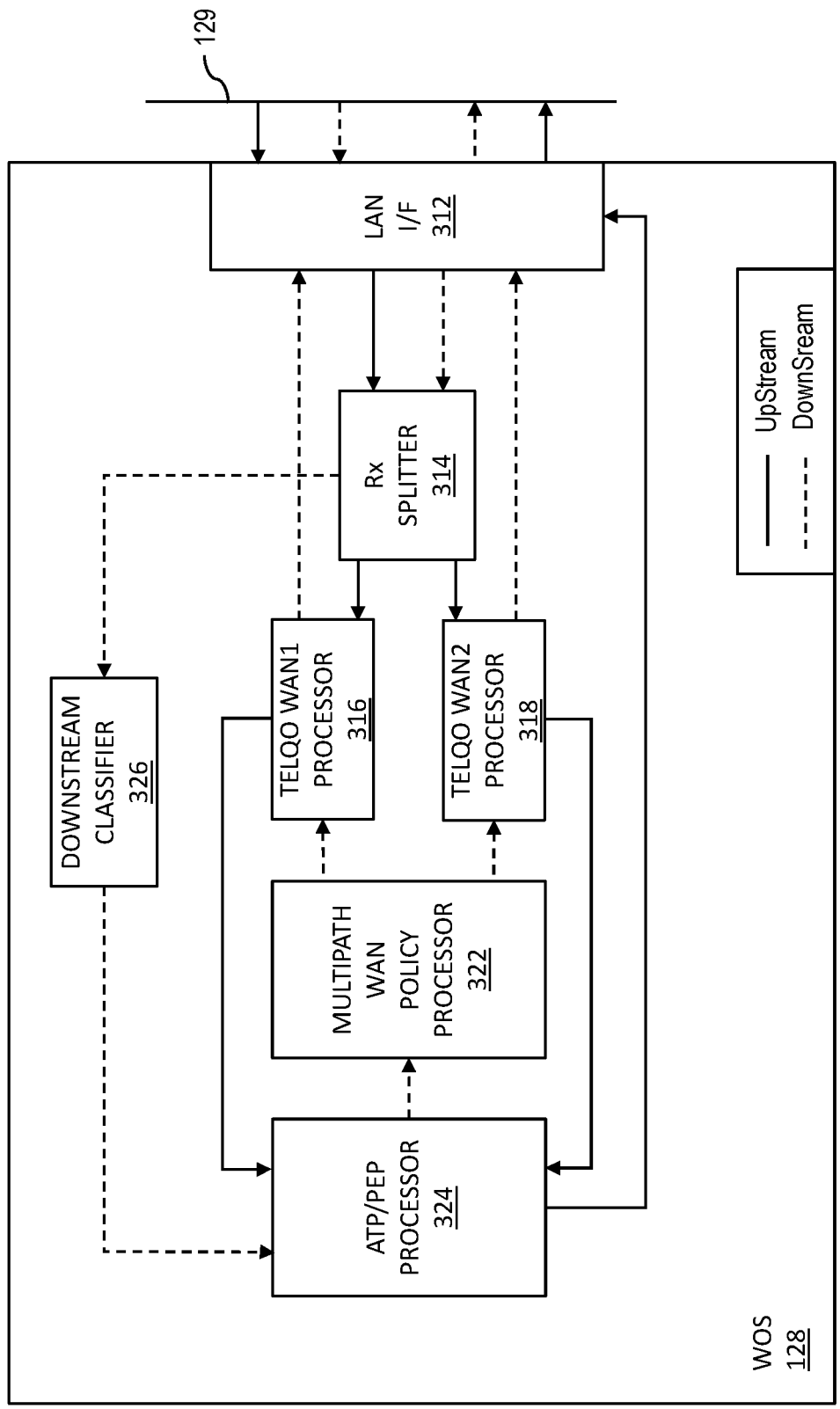
FIG. 3 illustrates a block diagram depicting an example of the WAN optimization server (WOS) of FIG. 1, in accordance with example embodiments.

FIG. 2 illustrates a block diagram depicting an example of the WAN optimization appliance (WAP) of FIG. 1, in accordance with various example embodiments, and FIG. 3 illustrates a block diagram depicting an example of the WAN optimization server (WOS) of FIG. 1, in accordance with example embodiments. With reference to FIG. 2, the WAP and its internal functional modules, which support multipath upstream and downstream data packet transmissions via IPSEC VPN tunnels (each over a respective WAN transport), are shown. As depicted in FIG. 2, the upstream packet flows are shown in the solid lines and the downstream packet flows are shown in the dashed lines. With reference to FIG. 3, the WOS and its internal functional modules, which support multipath upstream and downstream data packet transmissions via IPSEC VPN tunnels (each over a respective WAN transport), are shown. As depicted in FIG. 3, the upstream packet flows are shown in the solid lines and the downstream packet flows are shown in the dashed lines.

With reference to FIG. 2, for upstream VPN data packets (e.g., packets originating from the remote LAN 145 and destined for the enterprise intranet 122, which are to be transmitted via the VPN router 142 and modems 148, 152 at the remote site, over the IPSEC VPN tunnels 166, 168 respectively carried by the WAN transports 162, 164, and via the VPN GW 126, WOS 128 and enterprise router 124 at the enterprise site), the processing that the WAP performs on each such packet is as follows. The VPN router receives data packets from the LAN 145, and sends the packets (which are to be transmitted upstream via VPN tunnels carried by the WAN Transports) to the WAP 144 via the WAP LAN interface (ALS I/F) 141. The packets are received by the upstream classifier 212 via the ALS I/F, which classifies each packet by assigning a QOS class-of-service (or priority), and assigning other classifications that support the multipath WAN policies according to embodiments of the present invention (discussed in further detail below). The upstream classifier passes the classified packets to the ATP/PEP processor 214. The ATP/PEP processor prepares the packets for transmission across the WAN via a respective tunneling protocol. For example, the processor may perform an encapsulation process using a simple packet encapsulation referred to as the Acceleration Tunnel Protocol (ATP), encapsulating each packet in an outer packet by adding an outer header with the packet's QOS class of service and a sequence number field with a sequence number for each QOS service classification. These two additional fields facilitate resequencing received packets and eliminating duplicate received packets within the WOS. Alternatively, for TCP packets, the processor may perform an encapsulation based on a TCP Performance Enhancing Proxy protocol, which would include a protocol conversion to a PEP backbone protocol, where there is one PEP backbone protocol connection for each QOS service classification. The ATP/PEP processor then passes the resulting packets (each packet along with its respective classification information) to the Multipath WAN Policy processor 216 (also referred to as the Acceleration Multipath processor or AMP processor), which determines the particular WAN transport(s) that each such packet is to be transmitted over based on the multipath WAN transport policies. When the AMP policy indicates that a packet is to be transmitted across both WANs, the AMP processor produces a duplicate copy of the packet. Further, the WAP includes a complete instance of a QOS overlay function or WAN optimization function (referred to herein as a TELQO instance), which is discussed in further detail below. The TELQO instances are depicted in FIG. 2 as the TELQO WAN1 Processor 218 for the WAN1 162 and the TELQO WAN2 Processor 222 for the WAN2 164. As determined by the AMP policy, the AMP Policy processor passes the packets to the appropriate TELQO instances. A TELQO instance shapes and prioritizes the packets and passes them on to the AWS I/F 143 back to the VPN Router as required to prevent congesting the WAN transport so that packets are not delayed unduly by WAN congestion. The VPN Router forwards those packets through the appropriate IPSEC tunnel (one for WAN 1 and one for WAN 2) to the VPN gateway.

With further reference to FIG. 2, for upstream packets destined for the Internet via split-tunnels (e.g., packets originating from the remote LAN 145 and destined for the public network 160 (e.g., the Internet), which are to be transmitted via the VPN router 142 and modems 148, 152 at the remote site, over the split tunnels 172, 174 (carried by the WAN Transports 162, 164), respectively), the processing that the WAP performs on each such packet is as follows. The VPN router receives data packets from the LAN 145, and sends the packets (which are to be sent upstream via split-tunnels to the Internet) to the WAP 144. The packets are received via the WAP LAN interface (ALS I/F) 141, and forwarded to the upstream classifier 212, which classifies each packet by assigning a QOS class-of-service (or priority), and assigning other classifications that support the multipath WAN policies according to embodiments of the present invention (discussed in further detail below). The upstream classifier may also (optionally) perform a NAT operation on the packets. The upstream classifier then passes the classified packets directly to the Multipath WAN Policy processor 216 (bypassing the ATP/PEP processor 214). The Multipath WAN Policy processor determines which set of WANs each such packet is to be transmitted across, where split-tunnel packets are sent across one WAN or the other, or are blocked, but are not sent across both WANs. The Multipath WAN Policy processor, as determined based on the AMP policies, forward the packets to the appropriate TELQO instances. A TELQO instance shapes and prioritizes the packets and passes them on to the AWS I/F 143 back to the VPN Router as required to prevent congesting the WAN transport so that packets are not delayed unduly by WAN congestion. The VPN Router forwards those packets through the appropriate split-tunnel 172, 174 to the public network 160.

With reference to FIG. 3, again for upstream VPN data packets, the processing that the WOS performs on each packet is as follows. The VPN Gateway receives the transmitted upstream packets over the respective WANs 162, 164, decrypts and IPSEC de-encapsulates the packets and forwards the packets to the WOS 128 via the LAN 129. The WOS receives the packets via the LAN interface (LAN I/F) 312, which forward the packets to the Receive (Rx) Splitter 314. The WOS includes only the single LAN I/F 312 for receiving both upstream and downstream packets. The Rx Splitter separates the upstream packets from the downstream packets, and (regarding the upstream packets) determines the WAN transport by which each upstream packet was carried. Similar to the WAP, the WOS also includes a TELQO QOS Overlay processor instance for each WAN Transport. The TELQO instances are depicted in FIG. 3 as the TELQO WAN1 Processor 316 for the WAN1 162 and the TELQO WAN2 Processor 318 for the WAN2 164. Accordingly, the Rx Splitter then forwards the packets to the appropriate TELQO WAN packet processing instance based on the determination of the respective WAN over which the packet was received by the VPN GW. Each TELQO instance completes the QOS overlay processing of the respective packets, and forwards the processed packets to the ATP/PEP processor 324. The ATP/PEP processor re-sequences the received packets (discarding duplicate packets) for each QOS service classification back into the proper order as received by the VPN Router 142 from the remote LAN 145, and de-encapsulates the packets to restore them to the original upstream end-user packets as received by the WAP from the VPN Router. Each packet is then forwarded via the LAN I/F 312 to the enterprise router 124, for routing to the ultimate destination over the enterprise intra net 122.

With reference to FIG. 3, for downstream VPN data packets (e.g., packets originating from the enterprise intranet 122 and destined for the remote LAN 145, which are to be transmitted via the VPN GW 126, WOS 128 and enterprise router 124 at the enterprise site, over the IPSEC VPN tunnels 166, 168 respectively carried by the WAN transports 162, 164, and via the modems 148, 152, VPN router 142 and WAP 144 at the remote site), the processing that the WOS performs on each such packet is as follows. The enterprise router 124 receives data packets from the enterprise intranet 122, and sends the packets (which are to be transmitted downstream via VPN tunnels carried by the WAN Transports) to the VPN GW 126. In alternative embodiments the routing may be set up so that the enterprise router 124 sends downstream packets directly to the WOS 128 without having them go through the VPN GW 126. The VPN GW forwards the packets on to the WOS 128 via the LAN 129. The WOS receives the packets via the LAN I/F 312, and forwards the received packets to the Rx Splitter 314. Again, since the WOS includes only the single LAN I/F 312 for receiving both upstream and downstream packets, the Rx Splitter separates the upstream packets from the downstream packets, and forwards the downstream packets to the downstream classifier 326. The downstream classifier classifies each packet by assigning a QOS class of service (or priority), and assigning other classifications that support the multipath WAN policies according to embodiments of the present invention (discussed in further detail below). The downstream classifier passes the classified packets to the ATP/PEP processor 324, which prepares the packets for transmission across the WAN via the respective tunneling protocol. The ATP/PEP processor then passes the resulting packets to the Multipath WAN Policy processor 322, which determines the particular WAN transport(s) that each such packet is to be transmitted over based on the multipath WAN transport policies. When the AMP policy indicates that a packet is to be transmitted across both WANs, the AMP processor 322 produces a duplicate copy of the packet. As determined by the AMP policy, the AMP processor then passes the packets to the appropriate TELQO instances. A TELQO instance shapes and prioritizes the packets and passes them on to the LAN I/F 312 back to the VPN GW 126, as required to prevent congesting the WAN transport so that packets are not delayed unduly by WAN congestion. The VPN GW transmits the packets through the appropriate IPSEC tunnel (one for WAN 1 and one for WAN 2) to the VPN router 142.

With reference to FIG. 2, again for downstream VPN data packets, the processing that the WAP performs on each packet is as follows. The VPN Router 142 receives the transmitted downstream packets over the respective WANs 162, 164, decrypts and IPSEC de-encapsulates the packets and forwards the packets to the WAP 144 via the AWS I/F 143. The packets are then forwarded to the downstream classifier 224, which separates packets received over the IPSEC VPN from the packets received over the split-tunnels, and (regarding the downstream VPN tunnel packets) determines the particular tunnel/WAN over which each packet was received. The downstream classifier further classifies each packet by assigning a respective QOS classification. The downstream classifier then forwards the downstream packets to the appropriate TELQO instance (either TELQO WAN1 Processor 218 or TELQO WAN2 Processor 222). Each TELQO instance completes the QOS overlay processing for the respective packets, and forwards them on it to the ATP/PEP processor 214. The ATP/PEP processor re-sequences the received packets for each QOS service classification (discarding duplicate packets) back into the proper order as received by the VPN GW 126 from the enterprise intranet 122, and de-encapsulates the packets to restore them to the original downstream packets as received by the WOS from the VPN GW. Each packet is then forwarded via the ALS I/F 141 to the remote LAN 145 (via the VPN Router), for routing to the ultimate destination.

With further reference to FIG. 2, for downstream packets received from the Internet via split-tunnels (e.g., packets originating from the public network 160 (e.g., the Internet) and destined for the remote LAN 145, which are received via the VPN router 142 and modems 148, 152 at the remote site, over the split tunnels 172, 174 (carried by the WAN Transports 162, 164), respectively), the processing that the WAP performs on each such packet is as follows. The VPN router receives data packets (via the modems 148, 152), which were transmitted over the split-tunnels 172, 174 from the public network 160, and sends the packets to the WAP 144. The packets are received by the WAP via the AWS I/F 143, and forwarded to the downstream classifier 224. The downstream classifier separates packets received over the IPSEC VPN from the packets received over the split-tunnels, and (regarding the downstream split-tunnel packets) determines the particular split-tunnel/WAN over which each packet was received. According to one embodiment of split-tunnel processing, the downstream classifier performs the downstream NAT processing of split-tunnel packets to complement and complete the processing described above. The downstream classifier further classifies each packet by assigning a respective QOS classification. The downstream classifier then forwards the downstream packets to the appropriate TELQO instance (either TELQO WAN1 Processor 218 or TELQO WAN2 Processor 222). Each TELQO instance completes the QOS overlay processing for the respective packets—since split-tunnel packets are only sent over one WAN, there is no need to re-sequence the split-tunnel packets for each QOS service classification. Each packet is then forwarded via the ALS I/F 141 to the remote LAN 145 (via the VPN Router), for routing to the ultimate destination.

Acceleration Multipath WAN Transport Policies
(AMP Policies)

Figure 4:
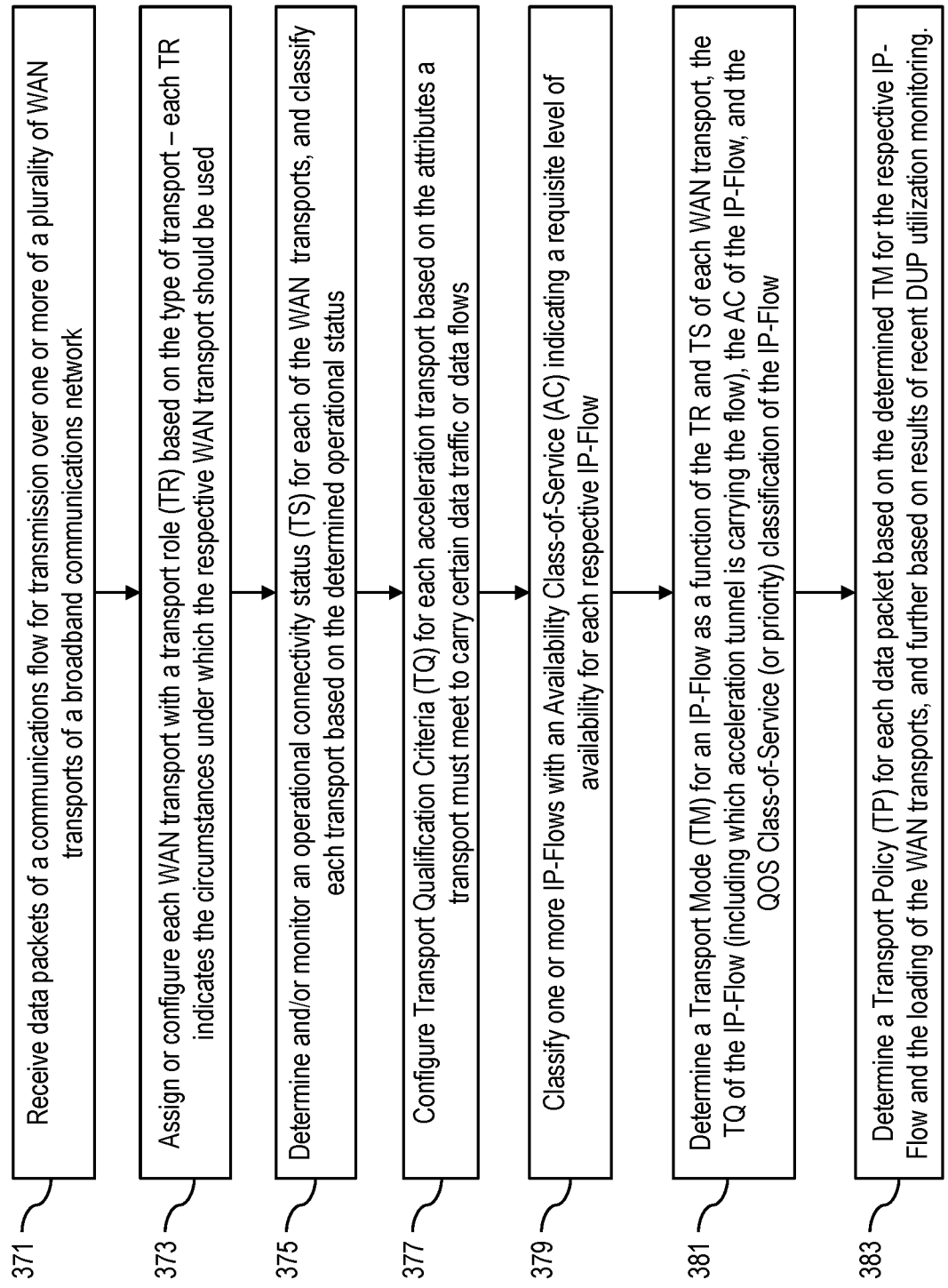
FIG. 4 illustrates a flow chart specifying an example if the multipath WAN transport policy decision process, in accordance with example embodiments.

In accordance with example embodiments, acceleration multipath policies or multipath WAN transport policies (AMP policies) comprise policies for data traffic and WAN path analysis, and determinations regarding routing of the data traffic through tunnels over multiple or multipath WAN transports. FIG. 4 illustrates a flow chart specifying an example if the multipath WAN transport policy decision process, in accordance with example embodiments. Such policies facilitate efficient/optimal transmission of various classes of data traffic via the WAN transports under various transport conditions and with minimal configuration. For purposes hereof, references to a WAN transport include any method for implementation of such a transport, including implementation via a hybrid WAN or an SD-WAN. The following description addresses embodiments including a dual-WAN transport configuration, where two WAN transports are simultaneously provided (WAN1 and WAN2), such as the embodiments depicted in FIGS. 1A, 1B.

Multipath WAN Transport Policy Aspects

According to example embodiments of such policies, aspects of the multipath WAN transport policies (AMP) are summarized in the following table:

| Aspect | Entity | Values | Definition |
|---|---|---|---|
| Transport Role (TR) | Transport | Unmetered, Metered, Overflow | Each transport is configured with a role indicating under what circumstances it should be used. |
| Transport Status (TS) | Transport | Clean, Suspect, Brownout, Blackout | The status of each transport is monitored (packet-loss, latency, capacity, etc.) and appropriately classified. |
| Transport Qualification Criteria (TQ) | Acceleration Tunnel | Latency, Packet-Loss, Capacity, Meter Status | An acceleration tunnel is configured with the attributes a transport must meet to carry data traffic of an application. |
| Transport Qualification Criteria (TQ) | Classified Application | Latency, Packet-Loss, Capacity, Meter Status | Classification override rules can be configured to control what attributes a transport must meet to carry an application's traffic. This is mostly used to control VOIP traffic. |

-continued

| Aspect | Entity | Values | Definition |
|---|---|---|---|
| Availability Class (AC) | IP-Flow | Platinum, Gold, Silver, Bronze | IP-Flows are dynamically classified with the level of availability they require. By default this classification is a function of their QOS priority. Override rules allow the AC for an individual application (based on server domain-name, IP subnet/port, etc.) or an entire QOS priority to be configured. |
| Transport Mode (TM) | IP-Flow | DUP, LB, W1DR, W2DR, WAN1, WAN2, BLK, OVERF | A function of TR, TS, TQ and AC, TM defines how the transports should carry an availability class. |
| Transport Policy (TP) | Packet | DUP, W1DR, W2DR, WAN1, WAN2, BLK | A function of TM, QOS class-of-service and congestion of that QOS class-of-service over each transport, TP defines which of the WAN transports should carry a packet. |

WAN Transport Role (TR)

In accordance with such example embodiments, each WAN transport (or SD-WAN transport) is assigned or configured with a transport role (TR) based on the type of transport. Each TR indicates the circumstances under which the respective WAN transport should be used. (Step 373, FIG. 4). According to one embodiment, each WAN transport is configured as operating with one of the following WAN Transport Roles (TRs): (i) Unmetered (e.g., without data capacity restrictions), where, in view of the lack of any data capacity restrictions, the amount of traffic carried by the transport effectively has no impact on the cost of the transport, and, depending on its characteristics, an unmetered WAN transport may be capable of carrying load-balanced traffic; (ii) Metered (e.g., having data capacity restrictions), where this role may be used with a WAN2 transport where avoiding excessive usage is a requirement—an example of this would be a 3G or 4G transport that is subject to a periodic capacity usage limit (e.g., a maximum capacity in GB per month); (iii) Overflow, where this role may be used for a VSAT WAN2 transport when the VSAT is intended to be used both for high-availability and to handle overflow traffic (e.g., when the Unmetered transport is consistently congested).

According to one such embodiment, for various transport combinations, the following table defines how transport roles may be configured:

| Configuration | WAN1 | WAN2 |
|---|---|---|
| Cable + DSL | Unmetered | Unmetered |
| Cable + Metered 4G | Unmetered | Metered |
| DSL + Metered 4G | Unmetered | Metered |
| MPLS + Cable | Unmetered | Unmetered |
| 4G + VSAT | Unmetered | Overflow |
| DSL + VSAT | Unmetered | Overflow |

WAN Transport Status (TS)

In further accordance with such example embodiments, the operational status of each WAN transport is monitored (e.g., regarding packet-loss, latency, capacity, congestion, etc.), and the transport is classified based on an operational status determined based on the monitoring. (Step 375, FIG. 4). According to one such embodiment, the Transport Status (TS) of each WAN is classified as one of: (i) CLEAN (operational), where the transport is operating with acceptable performance characteristics; (ii) SUS (suspected brownout), where the transport has recently exhibited some performance degradation (e.g., packet loss and/or latency), but not consistently enough to be classified as in a brownout; (iii) BRNOUT (brownout), where the transport is consistently exhibiting degraded performance (e.g., packet loss and/or latency). In one embodiment, when a split-tunnel is involved and WAN2 is unmetered, brownouts may be configured to be sticky (e.g., continue for a while even after returning to the CLEAN status—the degradation is no longer present and adequate performance has resumed) in order to prevent split-tunnel traffic from being adversely affected by multiple transitions in and out of a brownout status; (iv) BLKOUT (blackout) where, the transport is effectively unable to carry traffic either because it is completely unable to carry packets or because its capacity, packet loss and/or latency disqualify it for effectively carrying traffic.

By way of example, the multipath WAN transport policies may utilize the following factors to make brownout or suspected brownout decisions or determinations: (i) Packet-Loss, where packet loss is compared against a threshold or set of thresholds, and brownout or suspected brownout determinations are made when such thresholds are exceeded; (ii) Latency, where absolute latency and latency variation (e.g., jitter) are compared against a set of thresholds, and brownout or suspected brownout determinations are made when such thresholds are exceeded; (iii) Capacity, where a default lower bound is set for the capacity of a transport (optionally, with a configurable override), and when the capacity of the transport drops below the lower bound the transport is considered to be in a brownout. Other considerations or factors in making brownout or suspected brownout decisions or determinations may include Recovery Criteria. With regard to recovery criteria, once a transport is classified as being in a brownout or suspected brownout condition, criteria is set for determining when to upgrade the status of the transport from the brownout or suspected brownout condition—such criteria would take into consideration that the transport would be carrying little or virtually no traffic while in the brownout or suspected brownout condition, and thus the determination to upgrade the transport must account for whether the transport can handle higher or normal levels of traffic. According to one embodiment, synthetic traffic of various types may be generated and transmitted over the degraded transport (e.g., at periodic intervals or according to other time factors), and the performance of the transport with regard to such synthetic traffic can be measured to determine when/if the degraded condition is still present. Further, Application-Specific Criteria may be considered, where different applications would have different respective brownout criteria. As one example, application-specific criteria may be considered for VOIP and bulk download traffic, considering that VOIP traffic is very sensitive to latency variation (jitter), as compared to a bulk download, which would be tolerant of significant amounts of latency variation, but would be sensitive to capacity limitations of a transport. By way of example, the multipath WAN transport policies would be designed to support multiple sets of Brownout thresholds, and to set tunnel and classifier configuration information that indicates the particular threshold set that would be used with a particular tunnel/class-of-service combination.

Where and how the transport status monitoring takes place varies with the embodiment. In one embodiment, the WAP and WOS independently evaluate the WAN transports and assign their classification (e.g. one of: CLEAN, SUS, BROWNOUT, BLACKOUT). In an alternative embodiment, the WAP monitors the WAN transports and assigns them their classification and sends that classification via UDP transaction to the WOS. In this embodiment, the WAP is already monitoring most of the classification criteria, including latency, jitter and available capacity as part of its TELQO QOS overlay processing, and a mechanism for sharing the resulting classification can be piggybacked on the TELQO set rate transaction. In other embodiments the monitoring can be distributed between the WAP and the WOS with the sharing of intermediate results via signaling transmission. As will be recognized by one of skill in the art, other embodiments may also be employed.

Transport Qualification Criteria (TQ)

In further accordance with such example embodiments, the Transport Qualification Criteria (TQ) for a particular acceleration tunnel is configured based on the attributes a transport must meet to carry certain data traffic or data flows. (Step 377, FIG. 4). The TQ is configured so that the respective data traffic is carried only by a qualified transport. The determination as to whether a particular transport is appropriate for carrying certain types of application traffic or acceleration tunnel traffic may be based on certain qualification criteria. In other words, certain characteristics of a particular WAN transport may render the transport inappropriate for carrying certain traffic types (e.g., a transport that exhibits high latency and/or jitter would not be appropriate for carrying VOIP traffic). By way of example, an acceleration tunnel that carries data traffic of a guest WiFi network should be carried over an unmetered transport so as not to unreasonably affect the cost to the host enterprise for providing the respective guest WiFi services. By way of further example, VOIP IPSEC tunnel traffic should not be carried over a 3G transport, because a 3G transport is generally not well-suited for carrying VOIP IPSEC tunnel traffic. Accordingly, certain overriding principles may be employed, such as, (i) data flows for applications that generate heavy traffic loads are not to be carried over a metered transport, (ii) some acceleration tunnels (e.g., those carrying guest traffic) are not worth carrying over a metered transport, a (iii) 3G transport is generally not well-suited for carrying VOIP IPSEC tunnel traffic, and (iv) 4G transports generally have not been proven to consistently carry VOIP IPSEC tunnel traffic (especially when competing with other traffic that can congest the 4G transport). In other words, according to such embodiments, the TQ for an acceleration tunnel carrying guest traffic would be "unmetered only." A further qualification criteria may be the quality of service levels offered by the transport (e.g., latency, packet-loss, capacity). Additionally, a given transport (e.g., WAN1 or WAN2) can be blocked from carrying the traffic of a particular application or acceleration tunnel (which in effect hard codes the appropriate transport for carrying the respective traffic).

Further, Classification Override Rules can be employed to override default policies. According to certain embodiments, such override rules may be employed on various bases. For example, one basis may be for a Classified IP-Flow, (e.g., classified based on domain name, IP address, port number)—e.g., in that manner, VOIP SIP (and thus VOIP) traffic may be blocked from being carried over a transport that cannot support VOIP traffic in terms of latency/capacity/packet-loss where the override may trigger the use of a backup PSTN line. A further basis may be Class-Of-Service (COS)—e.g., in that manner, VOIP traffic may be blocked from being carried over a metered transport expected as being incapable of reliably carrying the VOIP with adequate quality. An Acceleration Tunnel basis may also form the basis for a classification override rule—e.g., in that manner, Guest Split-Tunnel traffic may be prevented from being carried over a metered transport.

Availability Class-of-Service (AC)

In further accordance with such example embodiments, an IP-Flow can be classified with an Availability Class-of-Service (AC) indicating a requisite level of availability for the IP-Flow. (Step 379, FIG. 4). The AC classification can be based on criteria such as the acceleration tunnel carrying the IP-Flow, the QOS classification or priority assigned to the IP-Flow (e.g. QOS classifications such as real-time, light-interactive, heavy-interactive, bulk, etc.), the port numbers and IP Addresses of the IP-Flow, and other criteria (e.g., deep packet inspection, IP-flow behavior, etc.). For example, by default, the AC may be a function of the quality of service (QOS) or priority assigned the flow. Further, override rules can allow the default AC for an individual application or for an entire QOS classification to be overridden (e.g., based on server domain name, IP port, IP address, etc.). According to one embodiment, the AC classification levels can be follows: (i) Platinum (Plat), which provides high-quality, low-latency by expending additional bandwidth for a flow of this traffic class whenever possible; (ii) Gold, which provides high-quality, low-latency by expending additional bandwidth only with reason; (iii) Silver, where the packet retransmissions of the flows should be carried with packet-loss mitigation for consistent performance in the face of substantial packet loss; (iv) Bronze, where no special high-availability measures are employed beyond use of secondary transport as a hot-standby. Further, the assignment of the different availability classifications to the different traffic types (e.g., VOIP, interactive, bulk-transfer, etc.) is based on various factors, such as the priority necessary to provide adequate or desired application performance levels, and the cost the enterprise client is willing to pay for such performance levels (e.g., the AC would be set to meet the service level agreements (SLAB) of the service agreement between the enterprise client and the service provider).

The following table provides an example set of IP-Flow AC classifications for certain traffic types:

| Application | AC | Typical QOS Priority Classification | Comments |
|---|---|---|---|
| VOIP | Plat | Real-Time (RT) | Provides high-quality, low-latency whenever possible by expending additional bandwidth. |
| Credit Card | Plat | Light-Interactive (LI) | |
| Enterprise Interactive | Gold | Heavy-Interactive Gold (HG) | Provides high-quality, low-latency expending additional bandwidth when reasonably likely to improve QOS. |
| Enterprise Web | Silver | Heavy-Interactive (HI) | Packet retransmissions for the flow should be carried with packet-loss mitigation for consistent |
| Enterprise Video | Silver | Bulk-Gold (BG) | |

-continued

| Application | AC | Typical QOS Priority Classification | Comments |
|---|---|---|---|
| Enterprise Bulk | Silver | Bulk-Silver (BS) | performance in the face of substantial packet loss. |
| Guest Web | Silver | Guest Heavy-Interactive (HI) | |
| Guest Video Or Bulk | Silver | Guest Bulk-Gold (BG) or Bulk-Silver (BS) | |

Transport Mode (TM)

In further accordance with such example embodiments, the Transport Mode (TM) for an IP-Flow is determined as a function of the Transport Role (TR) of each WAN transport, the Transport Status (TS) of each WAN transport, the Transport Qualification Criteria (TQ) of the IP-Flow (including which acceleration tunnel is carrying the flow), the Availability Class (AC) of the IP-Flow, and the QOS Class-of-Service (or priority) classification of the IP-Flow. (Step 381, FIG. 4). The resulting IP flow Transport Mode (TM) defines how the data traffic of the data flow is to be carried by the WAN transports. According to one embodiment, the TM for an IP-Flow may be one of: (i) Duplicate (DUP), where the packets of the flow are carried by each transport (in duplicate), and, for each packet, the first to arrive is used; (ii) Load Balanced (LB), where the packets of an IP-Flow are load-balanced over both transports in order to utilize the capacity of both transports, and any retransmission packets are carried by both transports; (iii) WAN1 Duplicate Retransmission (W1DR), where the WAN1 transport carries packets of a particular class-of-service, and any retransmission packets are carried by both transports (which allows sustained throughput with minimal extra response time, as a first retransmission is very likely to be received, but without heavily using the metered transport); (iv) WAN2 Duplicate Retransmission (W2DR), where the WAN2 transport carries the packets of a particular class-of-service, and any retransmission packets are carried by both transports (which allows sustained throughput with minimal extra response time, as a first retransmission is very likely to be received); (v) WAN1 Only (WAN1), where the packets of a particular class-of-service are transmitted only over the WAN1 transport; (vi) WAN2 Only (WAN2), where the packets of a particular class-of-service are transmitted only over the WAN2 transport; (vii) Blocked (BLK), where the packets of a particular IP-Flow are blocked; (viii) Overflow (OVERF), where, while the packets of a particular a class-of-service are carried by the WAN1 transport most of the time, the packets are carried by the WAN2 transport during sustained congestion of the WAN1 transport (e.g., for use when the WAN2 transport is a VSAT satellite transport medium).

As was already mentioned, the Transport Mode (TM) of an IP-Flow is determined as a function of the Transport Role (TR) of each WAN transport, the Transport Status (TS) of each WAN transport, the Transport Qualification Criteria (TQ) of the IP-Flow (based in part on which acceleration tunnel is carrying the flow) and the Availability Class (AC) of the IP-Flow. The tables that follow provide examples of how this function is configured to operate to support different combinations of WAN transports and end-user traffic, where the resulting Transport Mode (TM) table entry for a given WAN transport status combination (the combination the columns 1+2 for each row) is a function of the user traffic type (signified by the respective column heading).

The following table specifies an example embodiment of the Transport Mode function for different Transport Status combinations for WAN1 (being a Cable-Modem transport, unmetered) and WAN2 (being a DSL transport, unmetered), and where a Guest Wi-Fi service is configured to operate via split-tunnel and only over unmetered transports:

| Transport Status (TS) | | | | Transport Mode (TM) | | | | | |
|---|---|---|---|---|---|---|---|---|---|
| WAN1 (Cable, Unmet'd) | WAN2 (DSL, Unmet'd) | VOIP (PLAT) | Credit Card (PLAT) | Enterprise Interactive (GOLD) | Enterprise Web (SILVER) | Training Video (SILVER) | Enterprise Bulk (SILVER) | Guest Wi-Fi Interactive (Unmet'd only) | Guest Wi-Fi Bulk/Video (Unmet'd only) |
| CLEAN | CLEAN | DUP | DUP | WAN1 | WAN1 | WAN1 | WAN1 | WAN1 | WAN1 |
| SUS | CLEAN | DUP | DUP | WAN2 | WAN1 | WAN1 | WAN1 | WAN1 | WAN1 |
| BRNOUT | CLEAN | DUP | DUP | WAN2 | WAN2 | WAN2 | WAN2 | WAN2 | WAN2 |
| BLKOUT | CLEAN | WAN2 | WAN2 | WAN2 | WAN2 | WAN2 | WAN2 | WAN2 | WAN2 |
| CLEAN | SUS | DUP | DUP | WAN1 | WAN1 | WAN1 | WAN1 | WAN1 | WAN1 |
| SUS | SUS | DUP | DUP | WAN1 | WAN1 | WAN1 | WAN1 | WAN1 | WAN1 |
| BRNOUT | SUS | DUP | DUP | WAN2 | WAN2 | WAN2 | WAN2 | WAN2 | WAN2 |
| BLKOUT | SUS | WAN2 | WAN2 | WAN2 | WAN2 | WAN2 | WAN2 | WAN2 | WAN2 |
| CLEAN | BRNOUT | DUP | DUP | WAN1 | WAN1 | WAN1 | WAN1 | WAN1 | WAN1 |
| SUS | BRNOUT | DUP | DUP | WAN1 | WAN1 | WAN1 | WAN1 | WAN1 | WAN1 |
| BRNOUT | BRNOUT | DUP | DUP | WAN1 | WAN1 | WAN1 | WAN1 | WAN1 | WAN1 |
| BLKOUT | BRNOUT | WAN2 | WAN2 | WAN2 | WAN2 | WAN2 | WAN2 | WAN2 | WAN2 |
| CLEAN | BLKOUT | WAN1 | WAN1 | WAN1 | WAN1 | WAN1 | WAN1 | WAN1 | WAN1 |
| SUS | BLKOUT | WAN1 | WAN1 | WAN1 | WAN1 | WAN1 | WAN1 | WAN1 | WAN1 |
| BRNOUT | BLKOUT | WAN1 | WAN1 | WAN1 | WAN1 | WAN1 | WAN1 | WAN1 | WAN1 |
| BLKOUT | BLKOUT | BLK | BLK | BLK | BLK | BLK | BLK | BLK | BLK |

The following table specifies an example embodiment of the Transport Mode function for different Transport Status combinations for WAN1 (being a Cable-Modem transport, unmetered) and WAN2 (being a DSL transport, unmetered), and where a Guest Wi-Fi service is configured to operate over IPSEC sharing bandwidth with non-Guest services, but only over unmetered transports:

| Transport Status (TS) | | Transport Mode (TM) | | | | | | | |
|---|---|---|---|---|---|---|---|---|---|
| WAN1 (Cable, Unmet'd) | WAN2 (DSL, Unmet'd) | VOIP (PLAT) | Credit Card (PLAT) | Enterprise Interactive (GOLD) | Enterprise Web (SILVER) | Training Video (SILVER) | Enterprise Bulk (SILVER) | Guest Wi-Fi Interactive | Guest Wi-Fi Bulk/Video |
| CLEAN | CLEAN | DUP | DUP | LB | LB | LB | LB | LB | LB |
| SUS | CLEAN | DUP | DUP | W2DR | LB | LB | LB | LB | LB |
| BRNOUT | CLEAN | DUP | DUP | W2DR | LB | LB | LB | WAN1 | WAN1 |
| BLKOUT | CLEAN | WAN2 | WAN2 | WAN2 | WAN2 | WAN2 | WAN2 | BLK | BLK |
| CLEAN | SUS | DUP | DUP | W1DR | LB | LB | LB | LB | LB |
| SUS | SUS | DUP | DUP | LB | LB | LB | LB | LB | LB |
| BRNOUT | SUS | DUP | DUP | W2DR | LB | LB | LB | WAN1 | WAN1 |
| BLKOUT | SUS | WAN2 | WAN2 | WAN2 | WAN2 | WAN2 | WAN2 | BLK | BLK |
| CLEAN | BRNOUT | DUP | DUP | W1DR | W1DR | W1DR | W1DR | WAN1 | WAN1 |
| SUS | BRNOUT | DUP | DUP | W1DR | LB | LB | LB | WAN1 | WAN1 |
| BRNOUT | BRNOUT | DUP | DUP | LB | LB | LB | LB | WAN1 | WAN1 |
| BLKOUT | BRNOUT | WAN2 | WAN2 | WAN2 | WAN2 | WAN2 | WAN2 | BLK | BLK |
| CLEAN | BLKOUT | WAN1 | WAN1 | WAN1 | WAN1 | WAN1 | WAN1 | WAN1 | WAN1 |
| SUS | BLKOUT | WAN1 | WAN1 | WAN1 | WAN1 | WAN1 | WAN1 | WAN1 | WAN1 |
| BRNOUT | BLKOUT | WAN1 | WAN1 | WAN1 | WAN1 | WAN1 | WAN1 | WAN1 | WAN1 |
| BLKOUT | BLKOUT | BLK | BLK | BLK | BLK | BLK | BLK | BLK | BLK |

The following table specifies a further example embodiment of the Transport Mode function for different Transport Status combinations for WAN1 (being a Cable-Modem transport, unmetered) and WAN2 (being a 4G transport, metered), and where Guest WiFi traffic is to be carried only by an unmetered WAN:

| Transport Status (TS) | | Transport Mode (TM) | | | | | | | |
|---|---|---|---|---|---|---|---|---|---|
| WAN1 (Cable, Unmet'd) | WAN2 (4G, Met'd) | VOIP (PLAT) | Credit Card (PLAT) | Enterprise Interactive (GOLD) | Enterprise Web (SILVER) | Training Video (SILVER) | Enterprise Bulk (SILVER) | Guest Wi-Fi Interactive (Unmet'd only) | Guest Wi-Fi Bulk/Video (Unmet'd only) |
| CLEAN | CLEAN | WAN1 | W1DR | W1DR | W1DR | W1DR | W1DR | WAN1 | WAN1 |
| SUS | CLEAN | DUP | DUP | W2DR | W1DR | W1DR | W1DR | WAN1 | WAN1 |
| BRNOUT | CLEAN | DUP | DUP | W2DR | W2DR | W2DR | W2DR | WAN1 | WAN1 |
| BLKOUT | CLEAN | WAN2 | WAN2 | WAN2 | WAN2 | WAN2 | WAN2 | BLK | BLK |
| CLEAN | SUS | WAN1 | W1DR | W1DR | W1DR | W1DR | W1DR | WAN1 | WAN1 |
| SUS | SUS | DUP | DUP | W1DR | W1DR | W1DR | W1DR | WAN1 | WAN1 |
| BRNOUT | SUS | DUP | DUP | W2DR | W2DR | W2DR | W2DR | WAN1 | WAN1 |
| BLKOUT | SUS | WAN2 | WAN2 | WAN2 | WAN2 | WAN2 | WAN2 | BLK | BLK |
| CLEAN | BRNOUT | WAN1 | W1DR | W1DR | W1DR | W1DR | W1DR | WAN1 | WAN1 |
| SUS | BRNOUT | DUP | DUP | W1DR | W1DR | W1DR | W1DR | WAN1 | WAN1 |
| BRNOUT | BRNOUT | DUP | DUP | W1DR | W1DR | W1DR | W1DR | WAN1 | WAN1 |
| BLKOUT | BRNOUT | WAN2 | WAN2 | WAN2 | WAN2 | WAN2 | WAN2 | BLK | BLK |
| CLEAN | BLKOUT | WAN1 | WAN1 | WAN1 | WAN1 | WAN1 | WAN1 | WAN1 | WAN1 |
| SUS | BLKOUT | WAN1 | WAN1 | WAN1 | WAN1 | WAN1 | WAN1 | WAN1 | WAN1 |
| BRNOUT | BLKOUT | WAN1 | WAN1 | WAN1 | WAN1 | WAN1 | WAN1 | WAN1 | WAN1 |
| BLKOUT | BLKOUT | BLK | BLK | BLK | BLK | BLK | BLK | BLK | BLK |

The following table specifies a further example embodiment of the Transport Mode function for different Transport Status combinations for WAN1 (being a Cable-Modem transport, unmetered) and WAN2 (being a 4G transport, metered), and where Guest WiFi traffic and VOIP traffic is to be carried only by an unmetered WAN:

| Transport Status (TS) | | Transport Mode (TM) | | | | | | | |
|---|---|---|---|---|---|---|---|---|---|
| WAN1 (Cable, Unmet'd) | WAN2 (4G, Met'd) | VOIP (PLAT, Met'd only) | Credit Card (PLAT) | Enterprise Interactive (GOLD) | Enterprise Web (SILVER) | Training Video (SILVER) | Enterprise Bulk (SILVER) | Guest Wi-Fi Interactive (Met'd only) | Guest Wi-Fi Bulk/Video (Met'd only) |
| CLEAN | CLEAN | WAN1 | W1DR | W1DR | W1DR | W1DR | W1DR | WAN1 | WAN1 |
| SUS | CLEAN | WAN1 | DUP | W2DR | W1DR | W1DR | W1DR | WAN1 | WAN1 |
| BRNOUT | CLEAN | WAN1 | DUP | W2DR | W2DR | W2DR | W2DR | WAN1 | WAN1 |
| BLKOUT | CLEAN | BLK | WAN2 | WAN2 | WAN2 | WAN2 | WAN2 | BLK | BLK |
| CLEAN | SUS | WAN1 | W1DR | W1DR | W1DR | W1DR | W1DR | WAN1 | WAN1 |
| SUS | SUS | WAN1 | DUP | W1DR | W1DR | W1DR | W1DR | WAN1 | WAN1 |
| BRNOUT | SUS | WAN1 | DUP | W2DR | W2DR | W2DR | W2DR | WAN1 | WAN1 |
| BLKOUT | SUS | BLK | WAN2 | WAN2 | WAN2 | WAN2 | WAN2 | BLK | BLK |
| CLEAN | BRNOUT | WAN1 | W1DR | W1DR | W1DR | W1DR | W1DR | WAN1 | WAN1 |
| SUS | BRNOUT | WAN1 | DUP | W1DR | W1DR | W1DR | W1DR | WAN1 | WAN1 |

-continued

| Transport Status (TS) | | Transport Mode (TM) | | | | | | | |
|---|---|---|---|---|---|---|---|---|---|
| WAN1 (Cable, Unmet'd) | WAN2 (4G, Met'd) | VOIP (PLAT, Met'd only) | Credit Card (PLAT) | Enterprise Interactive (GOLD) | Enterprise Web (SILVER) | Training Video (SILVER) | Enterprise Bulk (SILVER) | Guest Wi-Fi Interactive (Met'd only) | Guest Wi-Fi Bulk/Video (Met'd only) |
| BRNOUT | BRNOUT | WAN1 | DUP | W1DR | W1DR | W1DR | W1DR | WAN1 | WAN1 |
| BLKOUT | BRNOUT | BLK | WAN2 | WAN2 | WAN2 | WAN2 | WAN2 | BLK | BLK |
| CLEAN | BLKOUT | WAN1 | WAN1 | WAN1 | WAN1 | WAN1 | WAN1 | WAN1 | WAN1 |
| SUS | BLKOUT | WAN1 | WAN1 | WAN1 | WAN1 | WAN1 | WAN1 | WAN1 | WAN1 |
| BRNOUT | BLKOUT | WAN1 | WAN1 | WAN1 | WAN1 | WAN1 | WAN1 | WAN1 | WAN1 |
| BLKOUT | BLKOUT | BLK | BLK | BLK | BLK | BLK | BLK | BLK | BLK |

The following table specifies a further example embodiment of the Transport Mode function for different Transport Status combinations for WAN1 (being a 4G transport, metered) and WAN2 (being a VSAT transport), and where bulk traffic is to be preferably carried by VSAT since it has a lower cost per GB and since Bulk traffic is not impacted by VSAT latency:

| Transport Status (TS) | | Transport Mode (TM) | | | | | | | |
|---|---|---|---|---|---|---|---|---|---|
| WAN1 (4G, Met'd) | WAN2 (VSAT) | VOIP (PLAT) | Credit Card (PLAT) | Enterprise Interactive (GOLD) | Enterprise Web (SILVER) | Training Bulk/Video (SILVER) | Enterprise Bulk (SILVER) | Guest Wi-Fi Interactive (SA Blocked) | Guest Wi-Fi Bulk/Video (SA Blocked) |
| CLEAN | CLEAN | WAN1 | W1DR | W1DR | W1DR | WAN2 | WAN2 | BLK | BLK |
| SUS | CLEAN | WAN1 | W1DR | W1DR | W1DR | WAN2 | WAN2 | BLK | BLK |
| BRNOUT | CLEAN | WAN1 | W1DR | W1DR | W1DR | WAN2 | WAN2 | BLK | BLK |
| BLKOUT | CLEAN | WAN2 | WAN2 | WAN2 | WAN2 | WAN2 | WAN2 | BLK | BLK |
| CLEAN | SUS | WAN1 | W1DR | W1DR | W1DR | WAN2 | WAN2 | BLK | BLK |
| SUS | SUS | WAN1 | W1DR | W1DR | W1DR | WAN2 | WAN2 | BLK | BLK |
| BRNOUT | SUS | WAN1 | W1DR | W1DR | W1DR | WAN2 | WAN2 | BLK | BLK |
| BLKOUT | SUS | WAN2 | WAN2 | WAN2 | WAN2 | WAN2 | WAN2 | BLK | BLK |
| CLEAN | BRNOUT | WAN1 | W1DR | W1DR | W1DR | WAN1 | WAN1 | BLK | BLK |
| SUS | BRNOUT | WAN1 | W1DR | W1DR | W1DR | WAN1 | WAN1 | BLK | BLK |
| BRNOUT | BRNOUT | WAN1 | W1DR | W1DR | W1DR | WAN2 | WAN2 | BLK | BLK |
| BLKOUT | BRNOUT | WAN2 | WAN2 | WAN2 | WAN2 | WAN2 | WAN2 | BLK | BLK |
| CLEAN | BLKOUT | WAN1 | WAN1 | WAN1 | WAN1 | WAN1 | WAN1 | BLK | BLK |
| SUS | BLKOUT | WAN1 | WAN1 | WAN1 | WAN1 | WAN1 | WAN1 | BLK | BLK |
| BRNOUT | BLKOUT | WAN1 | WAN1 | WAN1 | WAN1 | WAN1 | WAN1 | BLK | BLK |
| BLKOUT | BLKOUT | BLK | BLK | BLK | BLK | BLK | BLK | BLK | BLK |

The following table specifies an example embodiment of the Transport Mode function for different Transport Status combinations for WAN1 (being a Cable-Modem transport, unmetered) and WAN2 (being a DSL transport, unmetered), and where Guest Wi-Fi traffic is blocked:

| Transport Status (TS) | | Transport Mode (TM) | | | | | | | |
|---|---|---|---|---|---|---|---|---|---|
| WAN1 (Cable, Unmet'd) | WAN2 (DSL, Unmet'd) | VOIP (PLAT) | Credit Card (PLAT) | Enterprise Interactive (SILVER) | Enterprise Web (SILVER) | Training Video (SILVER) | Enterprise Bulk (SILVER) | Guest Wi-Fi Interactive (WAN1 Only) | Guest Wi-Fi Bulk/Video (WAN1 Only) |
| CLEAN | CLEAN | DUP | DUP | WAN1 | WAN1 | WAN1 | WAN1 | BLK | BLK |
| SUS | CLEAN | DUP | DUP | WAN1 | WAN1 | WAN1 | WAN1 | BLK | BLK |
| BRNOUT | CLEAN | DUP | DUP | WAN2 | WAN2 | WAN2 | WAN2 | BLK | BLK |
| BLKOUT | CLEAN | WAN2 | WAN2 | WAN2 | WAN2 | WAN2 | WAN2 | BLK | BLK |
| CLEAN | SUS | DUP | DUP | WAN1 | WAN1 | WAN1 | WAN1 | BLK | BLK |
| SUS | SUS | DUP | DUP | WAN1 | WAN1 | WAN1 | WAN1 | BLK | BLK |
| BRNOUT | SUS | DUP | DUP | WAN2 | WAN2 | WAN2 | WAN2 | BLK | BLK |
| BLKOUT | SUS | WAN2 | WAN2 | WAN2 | WAN2 | WAN2 | WAN2 | BLK | BLK |
| CLEAN | BRNOUT | DUP | DUP | WAN1 | WAN1 | WAN1 | WAN1 | BLK | BLK |
| SUS | BRNOUT | DUP | DUP | WAN1 | WAN1 | WAN1 | WAN1 | BLK | BLK |
| BRNOUT | BRNOUT | DUP | DUP | WAN1 | WAN1 | WAN1 | WAN1 | BLK | BLK |
| BLKOUT | BRNOUT | WAN2 | WAN2 | WAN2 | WAN2 | WAN2 | WAN2 | BLK | BLK |

-continued

| Transport Status (TS) | | Transport Mode (TM) | | | | | | | |
|---|---|---|---|---|---|---|---|---|---|
| WAN1 (Cable, Unmet'd) | WAN2 (DSL, Unmet'd) | VOIP (PLAT) | Credit Card (PLAT) | Enterprise Interactive (SILVER) | Enterprise Web (SILVER) | Training Video (SILVER) | Enterprise Bulk (SILVER) | Guest Wi-Fi Interactive (WAN1 Only) | Guest Wi-Fi Bulk/Video (WAN1 Only) |
| CLEAN | BLKOUT | WAN1 | WAN1 | WAN1 | WAN1 | WAN1 | WAN1 | BLK | BLK |
| SUS | BLKOUT | WAN1 | WAN1 | WAN1 | WAN1 | WAN1 | WAN1 | BLK | BLK |
| BRNOUT | BLKOUT | WAN1 | WAN1 | WAN1 | WAN1 | WAN1 | WAN1 | BLK | BLK |
| BLKOUT | BLKOUT | BLK | BLK | BLK | BLK | BLK | BLK | BLK | BLK |

The following table specifies an example embodiment of the Transport Mode function for different Transport Status combinations for WAN1 (being a Cable-Modem or DSL transport, unmetered) and the WAN2 (being a 4G transport, metered), and where Enterprise Interactive Traffic is given a Silver Availability Classification rather than Gold:

| Transport Status (TS) | | Transport Mode (TM) | | | | | | | |
|---|---|---|---|---|---|---|---|---|---|
| WAN1 (Cable or DSL, Unmet'd) | WAN2 (Met'd 4G) | VOIP (PLAT) | Credit Card (PLAT) | Enterprise Interactive (SILVER) | Enterprise Web (SILVER) | Training Video (SILVER) | Enterprise Bulk (SILVER) | Guest Wi-Fi Interactive (WAN1 Only) | Guest Wi-Fi Bulk/Video (WAN1 Only) |
| CLEAN | CLEAN | WAN1 | WAN1 | WAN1 | WAN1 | WAN1 | WAN1 | BLK | BLK |
| SUS | CLEAN | DUP | DUP | WAN1 | WAN1 | WAN1 | WAN1 | BLK | BLK |
| BRNOUT | CLEAN | DUP | DUP | WAN2 | WAN2 | WAN2 | WAN2 | BLK | BLK |
| BLKOUT | CLEAN | WAN2 | WAN2 | WAN2 | WAN2 | WAN2 | WAN2 | BLK | BLK |
| CLEAN | SUS | WAN1 | WAN1 | WAN1 | WAN1 | WAN1 | WAN1 | BLK | BLK |
| SUS | SUS | DUP | DUP | WAN1 | WAN1 | WAN1 | WAN1 | BLK | BLK |
| BRNOUT | SUS | DUP | DUP | WAN2 | WAN2 | WAN2 | WAN2 | BLK | BLK |
| BLKOUT | SUS | WAN2 | WAN2 | WAN2 | WAN2 | WAN2 | WAN2 | BLK | BLK |
| CLEAN | BRNOUT | WAN1 | WAN1 | WAN1 | WAN1 | WAN1 | WAN1 | BLK | BLK |
| SUS | BRNOUT | WAN1 | WAN1 | WAN1 | WAN1 | WAN1 | WAN1 | BLK | BLK |
| BRNOUT | BRNOUT | DUP | DUP | WAN1 | WAN1 | WAN1 | WAN1 | BLK | BLK |
| BLKOUT | BRNOUT | WAN2 | WAN2 | WAN2 | WAN2 | WAN2 | WAN2 | BLK | BLK |
| CLEAN | BLKOUT | WAN1 | WAN1 | WAN1 | WAN1 | WAN1 | WAN1 | BLK | BLK |
| SUS | BLKOUT | WAN1 | WAN1 | WAN1 | WAN1 | WAN1 | WAN1 | BLK | BLK |
| BRNOUT | BLKOUT | WAN1 | WAN1 | WAN1 | WAN1 | WAN1 | WAN1 | BLK | BLK |
| BLKOUT | BLKOUT | BLK | BLK | BLK | BLK | BLK | BLK | BLK | BLK |

The following table specifies an example embodiment of the Transport Mode function for different Transport Status combinations for WAN1 (being a Cable-Modem transport, unmetered) and the WAN2 (being a DSL transport, unmetered) and where Guest Wi-Fi is configured for WAN 1 only transmission as it should not be allowed to crowd out Enterprise traffic when the lower speed DSL line is being relied upon:

| Transport Status (TS) | | Transport Mode (TM) | | | | | | | |
|---|---|---|---|---|---|---|---|---|---|
| WAN1 (Cable, Unmet'd) | WAN2 (DSL, Unmet'd) | VOIP (PLAT) | Credit Card (PLAT) | Enterprise Interactive (GOLD) | Enterprise Web (SILVER) | Training Video (SILVER) | Enterprise Bulk (SILVER) | Guest Wi-Fi Interactive | Guest Wi-Fi Bulk/Video |
| CLEAN | CLEAN | DUP | DUP | LB | LB | LB | LB | WAN1 | WAN1 |
| SUS | CLEAN | DUP | DUP | W2DR | LB | LB | LB | WAN1 | WAN1 |
| BRNOUT | CLEAN | DUP | DUP | W2DR | LB | LB | LB | WAN1 | WAN1 |
| BLKOUT | CLEAN | WAN2 | WAN2 | WAN2 | WAN2 | WAN2 | WAN2 | BLK | BLK |
| CLEAN | SUS | DUP | DUP | W1DR | LB | LB | LB | WAN1 | WAN1 |
| SUS | SUS | DUP | DUP | LB | LB | LB | LB | WAN1 | WAN1 |
| BRNOUT | SUS | DUP | DUP | W2DR | LB | LB | LB | WAN1 | WAN1 |
| BLKOUT | SUS | WAN2 | WAN2 | WAN2 | WAN2 | WAN2 | WAN2 | BLK | BLK |
| CLEAN | BRNOUT | DUP | DUP | W1DR | W1DR | W1DR | W1DR | WAN1 | WAN1 |
| SUS | BRNOUT | DUP | DUP | W1DR | LB | LB | LB | WAN1 | WAN1 |
| BRNOUT | BRNOUT | DUP | DUP | LB | LB | LB | LB | WAN1 | WAN1 |
| BLKOUT | BRNOUT | WAN2 | WAN2 | WAN2 | WAN2 | WAN2 | WAN2 | BLK | BLK |
| CLEAN | BLKOUT | WAN1 | WAN1 | WAN1 | WAN1 | WAN1 | WAN1 | WAN1 | WAN1 |
| SUS | BLKOUT | WAN1 | WAN1 | WAN1 | WAN1 | WAN1 | WAN1 | WAN1 | WAN1 |
| BRNOUT | BLKOUT | WAN1 | WAN1 | WAN1 | WAN1 | WAN1 | WAN1 | WAN1 | WAN1 |
| BLKOUT | BLKOUT | BLK | BLK | BLK | BLK | BLK | BLK | BLK | BLK |

The following table specifies an example embodiment of the Transport Mode function for different Transport Status combinations for WAN1 (being a DSL transport, unmetered) and WAN2 (being a VSAT transport):

| Transport Status (TS) | | Transport Mode (TM) | | | | | | | |
|---|---|---|---|---|---|---|---|---|---|
| WAN1 (DSL, Unmet'd) | WAN2 (VSAT) | VOIP (PLAT) | Credit Card (PLAT) | Enterprise Interactive (GOLD) | Enterprise Web (SILVER) | Training Video (SILVER) | Enterprise Bulk (SILVER) | Guest Wi-Fi Interactive (Blocked) | Guest Wi-Fi Bulk/Video (Blocked) |
| CLEAN | CLEAN | W1DR | W1DR | W1DR | W1DR | OVERF | OVERF | BLK | BLK |
| SUS | CLEAN | W1DR | W1DR | W1DR | W1DR | OVERF | OVERF | BLK | BLK |
| BRNOUT | CLEAN | W1DR | W1DR | W1DR | W1DR | OVERF | OVERF | BLK | BLK |
| BLKOUT | CLEAN | WAN2 | WAN2 | WAN2 | WAN2 | WAN2 | WAN2 | BLK | BLK |
| CLEAN | SUS | W1DR | W1DR | W1DR | W1DR | OVERF | OVERF | BLK | BLK |
| SUS | SUS | W1DR | W1DR | W1DR | W1DR | OVERF | OVERF | BLK | BLK |
| BRNOUT | SUS | W1DR | W1DR | W1DR | W1DR | OVERF | OVERF | BLK | BLK |
| BLKOUT | SUS | WAN2 | WAN2 | WAN2 | WAN2 | WAN2 | WAN2 | BLK | BLK |
| CLEAN | BRNOUT | W1DR | W1DR | W1DR | W1DR | OVERF | OVERF | BLK | BLK |
| SUS | BRNOUT | W1DR | W1DR | W1DR | W1DR | OVERF | OVERF | BLK | BLK |
| BRNOUT | BRNOUT | W1DR | W1DR | W1DR | W1DR | OVERF | OVERF | BLK | BLK |
| BLKOUT | BRNOUT | WAN2 | WAN2 | WAN2 | WAN2 | WAN2 | WAN2 | BLK | BLK |
| CLEAN | BLKOUT | WAN1 | WAN1 | WAN1 | WAN1 | WAN1 | WAN1 | BLK | BLK |
| SUS | BLKOUT | WAN1 | WAN1 | WAN1 | WAN1 | WAN1 | WAN1 | BLK | BLK |
| BRNOUT | BLKOUT | WAN1 | WAN1 | WAN1 | WAN1 | WAN1 | WAN1 | BLK | BLK |
| BLKOUT | BLKOUT | BLK | BLK | BLK | BLK | BLK | BLK | BLK | BLK |

Transport Mode (TM) & Transport Policy Decision Making

In further accordance with such policy aspects, a Transport Policy (TP) for each acceleration tunnel, availability class (AC) and transport qualification criteria (TQ) combination is determined and published. By way of example, the TP for a combination is determined based on the Transport Mode for the combination (based on TR, TS, TQ and the AC), the packet backlog (how long the next packet can be expected to wait prior to being received at the far end of the WAN), the WAN1 congestion status (whether the WAN1 transport has recently been consistently congested), and DUP utilization (the recent fraction of each WAN transport used for duplicate transmissions.

With regard to duplicate packet utilization, duplicate packet transmission (which increases utilization) is intended to be used in situations where the resulting utilization does not grossly impact other applications. In accordance with the multipath transport policies, the recent utilization of candidate duplicate packet transmissions is monitored relative to the lowest speed WAN transport (where duplicate candidate traffic is traffic that would have been carried in duplicate, apart from certain limitations). Candidate duplicate packet transmissions include DUP real-time UDP (e.g., VOIP), DUP other (e.g., credit card transactions) and DUP retransmissions. Duplicate traffic transmissions are then selectively suspended as the candidate traffic crosses a configurable threshold of the lowest speed WAN transport. The following table specifies such limits placed on different combinations of candidate duplicate traffic.

| Traffic Combination Above Thresh Utilization | Blocked Duplicate Transmissions | Explanation |
|---|---|---|
| DUP Real-Time UDP | DUP Real-Time UDP | If the duplicate retransmission of VOIP dominates a WAN transport, then even it should be suppressed. |

-continued

| Traffic Combination Above Thresh Utilization | Blocked Duplicate Transmissions | Explanation |
|---|---|---|
| DUP Real-Time UDP + DUP Other | DUP Other | Duplicate retransmission of VOIP is higher priority and should be maintained at the expense of DUP Other. |
| DUP Real-Time UDP + DUP Other + Duplicate Retransmissions | Duplicate Retransmissions | DUP other is higher priority than Duplicate Retransmissions and should be maintained at the expense of Duplicate Retransmissions. |

Transport Policy (TP)—Packet Transmission

In further accordance with such example embodiments, the packets that are ready to be transmitted over one or both WANs have been classified as far as their: Availability Class (AC) and their Transport Qualification (TQ). Based on the AC and TQ for each packet (together with the information regarding the transport policy decision making) the transport mode for the packet is determined. The final step, to determine which WANs a packet is sent across, is the Transport Policy determination, which is performed based on the Transport Policy Determination Tables 1 and 2 in the section below (Transport Policy (TP) Determination). The Transport Policy Determination Table 2 includes the results of the DUP utilization monitoring, which is an optional mechanism that can be used to better define how the TP is determined from the Transport Mode.

Transport Policy (TP) Determination

In further accordance with such example embodiments, the following table specifies the method of determining the Transport Policy (TP) of a given packet based on the Transport Mode (TM) and the loading of the WAN transports:

Transport Policy Determination Table 1.

| TM | TP | Conditions |
|---|---|---|
| DUP | DUP | All the time. |
| LB | W1DR | When the next packet is likely to be received via the WAN1 transport first based on transport delay and recent priority queue delay. |
| LB | W2DR | When the next packet is likely to be received via the WAN2 transport first based on transport delay and recent priority queue delay. |
| W1DR | W1DR | All the time. |
| W2DR | W2DR | All the time. |
| WAN1 | WAN1 | All the time. |
| WAN1 | WAN2 | All the time. |
| BLK | BLK | All BLK packets. |
| OVERF | W1DR | When the WAN1 transport has not recently been consistently congested. |
| OVERF | W2DR | When the WAN1 transport has recently been consistently congested. |

In further accordance with such example embodiments, the following table specifies the method of determining the Transport Policy (TP) of a given packet based on the Transport Mode (TM) and the loading of the WAN transports, further incorporating the results of DUP Utilization monitoring:

Transport Policy Determination Table 2.

| TM | TP | Conditions |
|---|---|---|
| DUP | DUP | DUP utilization permits this class of DUP packet. |
| DUP | WAN1 | DUP utilization does not permit this class of DUP packet; AND when the TM for AC Silver is LB, WAN1 or W1DR. |
| DUP | WAN2 | DUP utilization does not permit this class of DUP packet; AND when the TM for AC Silver is WAN2 or W2DR. |
| LB | WAN1 | When the packet is not a retransmission, and the next packet is likely to be received via the WAN1 transport first based on transport delay and recent priority queue delay; OR the packet is a retransmission, DUP utilization does not permit duplicate retransmissions, and the next packet is likely to be received via the WAN1 first based on transport delay and recent priority queue delay. |
| LB | WAN2 | When the packet is not a retransmission, and the next packet is likely to be received via the WAN2 transport first based on transport delay and recent priority queue delay; OR the packet is a retransmission, DUP utilization does not permit duplicate retransmissions, and the next packet is likely to be received via the WAN2 first based on transport delay and recent priority queue delay. |
| LB | DUP | When the packet is a retransmission packet, and DUP utilization permits duplicate retransmissions. |
| W1DR | DUP | When the packet is a retransmission packet, and DUP utilization permits duplicate retransmissions. |
| W1DR | WAN1 | When the packet is a not a retransmission packet, or DUP utilization does not permit duplicate retransmissions. |
| W2DR | WANB | When the packet is a not a retransmission packet, or DUP utilization does not permit duplicate retransmissions. |
| WAN1 | WAN1 | All the time. |
| WAN1 | WAN2 | All the time. |
| BLK | BLK | All BLK packets. |
| OVERF | W1DR | When the WAN1 transport has not recently been consistently congested. |
| OVERF | W2DR | When the WAN1 transport has recently been consistently congested. |

Summarizing this Transport Policy (TP) determination, this determination is the last step that is involved with determining over which WAN transport(s) a specific packet is transmitted. The Transport Policy step begins with the assigned Transport Mode of the packet, and incorporates the rapidly changing loading of the WAN transports and the results of the DUP utilization monitoring mechanism. The above Transport Policy Determination Table 1 provides the method of determining the Transport Policy of a given packet based on just the Transport Mode (TM) and the loading of the WAN transports, and the Transport Policy Determination Table 2 further incorporates the results of DUP Utilization monitoring. The resulting Transport Policies are one of DUP, W1DR, W2DR, WAN1, WAN2 and BLK. (Step 383, FIG. 4). After the Transport Policy step has assigned a Transport Policy to a packet, the particular WAN transport(s) that the packet is to be transmitted over is determined based on whether it is a retransmission packet and the assigned Transport Policy.

As an example of the AMP policy-related processing, the processing of an upstream packet in a default configuration (dual-unmetered transport setup) may be as follows. An upstream packet is received by the VPN router 142 from the remote LAN 145, where the packet is to be transmitted via a VPN tunnel (carried by a respective WAN transport) to the VPN GW 126. The VPN router passes the packet on to the WAP 144 via the WAP ALS I/F 141, and the packet is forwarded on to the upstream classifier 212. The upstream classifier processes packets received by the WAP ALS I/F and classifies the packet by assigning an appropriate QOS Class-Of-Service (COS), Availability Classification (AC) and Transport Qualification (TQ). The upstream classifier forwards the packet to the ATP/PEP processor 214, which ATP encapsulates the packet and passes the ATP packet (with its respective QOS COS, AC and TQ) to the AMP Policy processor 216. The Transport Mode (TM) function of the AMP processor determines a Transport Mode (TM) based on the Transport Status (TS) of the WANs, and the AC and TQ for the packet. By way of example, the TM determination may be performed by a table look-up (e.g., based on a predetermined table—such as the example Transport Mode function tables listed above for different Transport Status combinations of the respective WANs and the different Availability Classes for the respective packet being processed). Based on the determined TM, the AMP processor forwards the packet to the appropriate TELQO WAN processor (in the case of a TM of DUP, the AMP policy processor creates a copy of the packet and forwards one copy of the packet via the TELQO WAN1 Processor and the other copy via the TELQO WAN2 Processor, each with the same sequence number for the respective QOS classification level). Then, at the enterprise site 120, the WOS 128 receives and processes the transmitted packet(s), separating the packet(s) from downstream traffic, and determining the particular WAN over which the packet(s) were carried. The Rx Splitter then forwards the packet(s) to the appropriate TELQO WAN Processor(s) and on to the ATP/PEP processor 324. In the event of a DUP transmission, both packets are processed by the ATP/PEP processor, which determines that the packets consist of a duplicate transmission, and which forwards the first of the two duplicate packets (and discards the second). The packet is processed by the ATP/PEP processor, and the de-encapsulated packet (the restored packet, as originally processed by the WAP) is forwarded to the WOS LAN I/F 312, for routing to the ultimate destination for the packet.

As a further example of the AMP policy-related processing, the AMP policy-related processing of an upstream VOIP packet in a default configuration (dual-unmetered transport setup) is as follows. An upstream VOIP packet is received by the VPN router 142 from the remote LAN 145, where the VOIP packet is to be transmitted via a VPN tunnel (carried by a respective WAN transport) to the VPN GW 126 (the ultimate destination being a VOIP device on the enterprise intranet 122). The VPN router passes the packet on to the WAP 144 via the WAP ALS I/F 141, and the packet is forwarded on to the upstream classifier 212. The upstream classifier processes packets received by the WAP ALS I/F and classifies the VOIP packet by assigning a Real-Time QOS Class-Of-Service, Platinum AC and a TQ of either WAN (e.g., the default Availability Classification (AC) for a Real-Time packet is Platinum and the default Transport Qualification (TQ) for an IPSEC packet is either WAN). The upstream classifier forwards the packet to the ATP/PEP processor 214, which ATP encapsulates the packet and passes the ATP packet (with its QOS COS, AC and TQ) to the AMP Policy processor 216. The Transport Mode (TM) function of the AMP processor produces a Transport Mode of DUP. In this example, as there has not been excessive duplicate traffic, the resulting Transport Policy is DUP. Accordingly, the AMP policy processor creates a copy of the packet and forwards one copy of the packet via the TELQO WAN1 Processor 218 and the other copy via the TELQO WAN2 Processor 222, each with the same sequence for the respective Real-Time QOS classification level. The result is that a copy of the packet is sent across both the WAN transports for higher availability. Then, at the enterprise site 120, the WOS 128 receives and processes both packets, separating the packets from downstream traffic, and determining the particular WAN over which each packet was carried. The Rx Splitter then forwards each packet to the appropriate TELQO WAN Processor, and the packets are then forwarded on to the ATP/PEP processor 324. Both packets are processed by the ATP/PEP processor, which determines that the packets consist of a duplicate transmission, and which forwards the first of the two duplicate packets (and discards the second). The ATP/PEP processor then forwards one copy of the de-encapsulated VOIP packet (the restored packet, as originally processed by the WAP) to the WOS LAN I/F 312, for routing to the ultimate destination for the packet. Accordingly, in the event that one of the two packets was lost or delayed, good VOIP service would have been maintained by virtue of the duplicate transmission (only one of the packets would have been received and processed in real-time for the VOIP application.

TELQO Description

As introduced above, according to alternative embodiments, the TELQO QOS overlay functionality can be employed by the WAP 144 and WOS 128 for optimization of QOS performance over the WANs. The TELQO functionality reacts to the changing network conditions by (1) actively monitoring the modem link speeds and automatically adjusting the Throughput Limit settings in both directions; (2) actively monitoring the traffic and scaling back the bulk and interactive traffic automatically to give priority to the real-time and interactive traffic; and (3) setting and dynamically adjusting transmit rates and receive rates in the network and regulating a rate of establishing network connections, based upon determined latency parameters, to control the traffic flow. Such QOS features or functionality is referred to herein as ActiveQOS or an ActiveQOS overlay (the ActiveQOS overlay functionality is also referred to herein as targeted extra latency quality of service overlay (TELQO) functionality). TELQO functionality typically operates in private networks (e.g., enterprise IPSEC networks or virtual private networks (VPNs)). As to a peered TELQO operation, such operation generally occurs, for example, over a VPN connection or an IPSEC tunnel, and a peerless TELQO operation can be employed for a split-tunnel, that is traffic over a tunnel directed to a public network (e.g., the Internet). Typically, a peered TELQO operation is more precise than a peerless TELQO operation, and thus provides better performance in terms of fully utilizing broadband capacity.

The TELQO functionality of example embodiments provides advantages over existing quality of service (QOS) applications, including such advantages as: (1) automatic and dynamic measurement and adjustment of available capacity of a broadband connection; (2) support of peerless operation, which allows for active quality of service (QOS) management of data traffic over ordinary-grade broadband connections over conventional broadband networks (including split-tunnel connections—defined below), where traffic moves from servers on a public network (e.g., the Internet) down the broadband connection without being governed by any peer intermediary between the broadband connection and the public network; (3) support of multiple tunnels (e.g., separate streams of traffic), which share a broadband connection and provide prioritization within each stream (e.g., a single IPSEC tunnel (which is peered), and a split-tunnel (which is peerless)); and (4) provisions for an IP-Flow based classifier (generally not requiring any configuration), which automatically classifies (and reclassifies as needed) end-user traffic to provide real-time treatment (as required), and to appropriately classify other applications (e.g., as Light-Interactive, Heavy-Interactive and Bulk-Transfer).

Figure 5:
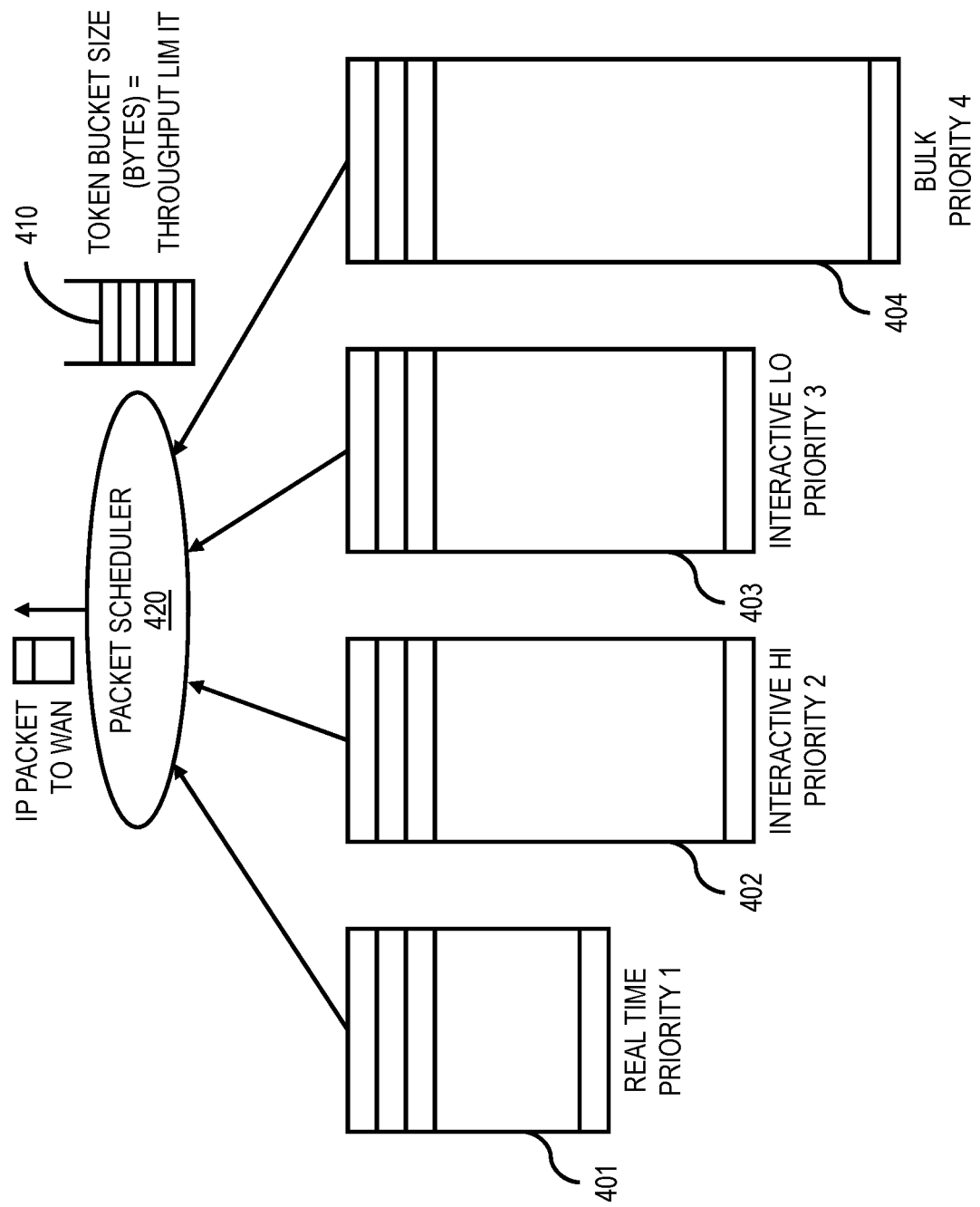
FIG. 5 illustrates an example packet scheduler operation, in accordance with example embodiments.

FIG. 5 illustrates an example packet scheduler operation, which forms a part of the QOS processing of packets (e.g., such as the processing within the WAP 144 and WOS 128, by the respective TELQO WAN1 and WAN2 processors). The packet scheduler modules both operate in a similar fashion, in that the modules perform traffic shaping of outgoing data. The packet scheduler module 420 in the WAP shapes outgoing traffic in the uplink direction from the VPN router 142 to the VPN gateway 126, and the packet scheduler module 420 in the WOS shapes outgoing traffic in the downlink direction from the VPN gateway 126 to VPN router 142. By way of example, each of the VPN router and VPN gateway implements quality of service (QOS) using, for example, four priority classes of service with one queue 401, 402, 403, and 404 for each priority class of service. Together the packet scheduler with its four queues prioritizes the outbound data packets. Queue 401 stores the highest priority packets to queue for transmission, queue 402 stores the second-highest priority packets, queue 403 stores the third-highest priority packets, and queue 404 stores the lowest priority packets. In both the WAP and WOS, the queues 401-404 are stored in memory. In one example, real-time traffic, such as voice, is mapped to the highest-priority queue 401, and interactive traffic such as POS and hypertext transfer protocol (HTTP) is mapped to the second-highest and third-highest priority queues 402 and 403, respectively, to match the relative priorities. Bulk traffic is mapped to the fourth and lowest-priority queue 404. Each of the WAP and WOS classifies IP packets based on the fields within the header of the packets (e.g., Differentiated Services Code Point (DSCP) code points in QOS configurations), source and destination addresses, and, for TCP and UDP, by its source and destination ports. A variety of matching mechanisms can be employed to perform the classification including those based combinations of fields and binary masked matching and value range matching. An IP packet, for example, can be classified based on IP flows and their packet size distribution, packet time, based on deep-packet inspection of the fields within individual packets within an IP flow, and other characteristics of the IP flow.

In the various embodiments, a network manager software program that manages both the VPN router 142 and the VPN gateway 126 allows an operator to map the traffic types to the different priority queues based on individual packet header fields. The network manager software program can allow an operator to program IP selection (e.g., address, port, DSCP, etc.) based rules to map UDP traffic (such as voice). The network manager software program can be executed on the network manager 127, but alternatively can be executed on any computer or other electronic device at the NOC 125 or at any remote site, as long as the device can access the VPN router and VPN gateway, either directly or indirectly, to issue the mapping. The network manager software program can also allow an operator to classify the traffic of a TCP connection based on TCP PEP rules. In particular, an operator can classify such traffic based on the header fields of SYN packet, with the result being to map TCP connections to backbone connections where each backbone connection operates at a different priority level. The result can be to map different TCP connections carrying different types of traffic (HTTP, FTP, etc.) to a different priority level. For example, HTTP traffic can be mapped to a lower priority backbone connection, while POS traffic can be mapped to a higher priority backbone connection.

Once the respective packet traffic classification and prioritization mappings are established, the packet scheduler modules 230 and 330, (in the VPN router and VPN gateway, respectively), process the packets from their respective WAN queues and shape the traffic as per a prioritization scheme. That is, both packet scheduler modules 230 and 330 process the outgoing IP packets in their respective WAN queues, which are filled according to the traffic classification and prioritization rules. In the certain embodiments, the scheduler modules 230, 330 implement a token bucket 410 with a maximum bucket size in bytes corresponding to the respective throughput limit. The packet scheduler modules 230, 330 then process the packets from the WAN queues in a priority order, thereby ensuring that the real-time traffic is typically processed with the least amount of queuing delay. While processing packets, the packet scheduler modules 230 and 330 include (i.e., take into account) the underlying network protocol overhead (on top of the IP packet length) in its available tokens calculations prior to de-queuing a packet from a WAN queue for transmission.

According to example embodiments, traffic shaping may be based on a relatively strict priority queuing. In various other embodiments, the packet scheduler modules 230 and 330 can alternatively utilize other priority schemes such as Weighted Fair Queuing to provide a suitable QOS policy for various situations. Once the traffic classification, prioritization, and shaping is established, what is then configured is the throughput limit (token bucket size) at each VPN peer, such as to match the last-mile link speeds and take into account the appropriate network protocol overhead in the throughput limit calculations and enforcement. Moreover, to configure optimal uplink and downlink throughput, the VPN router needs to recognize the various link characteristics information (i.e., configuration) from the modems 148, 152. The link characteristics information includes, e.g., uplink speed, downlink speed, WAN Protocol (e.g., RFC 2684 Bridged, RFC 2684 Routed, PPPoA, PPPoE, etc.), and ATM Encapsulation Mode (e.g., LLC, VC MUX, etc.), for example.

A tunnel generally comprises a collection of data traffic (e.g., data packets) that is individually allocated to bandwidth, where the traffic data packets are classified and prioritized to fit within the allocated bandwidth. A tunneling protocol comprises the encapsulation of one network protocol (e.g., a payload protocol) within or based on a different network protocol (e.g., the delivery protocol). For example, tunneling may be employed to carry a payload over an incompatible delivery-network, or to provide a secure path through an untrusted network. An example of a tunnel includes a virtual private network (VPN) tunnel, which, for example, may comprise a private network that interconnects remote networks through primarily public communications infrastructures (e.g., the Internet). A VPN tunnel provides security through tunneling protocols and security procedures (e.g., encryption). Further, a VPN tunnel may comprise a given broadband connection that carries one or more VPN connections (e.g., a VPN connection to securely connect the branch offices of an organization to a head office network through a public network, such as the Internet, or one enterprise connection to a corporate data center and one to a credit-card authorization service). A further example of a tunnel includes a collection of related-traffic directly transmitted out to a public network (e.g., a split tunnel to the Internet). For example, a split tunnel may comprise a simultaneous network connection to a public network (e.g., the Internet) and to a local area network (LAN) or wide area network (WAN), using the same physical network connection (where the LAN or WAN connection may be via a VPN connection). A given broadband connection may carry multiple split tunnels (e.g., a connection carrying guest WiFi traffic and connections to an explicitly enumerated list of business-related secure web sites). Further, a tunnel comprises one of a peered tunnel and a peerless tunnel, where (1) the peered tunnel is configured for data communications between the first node and a peer second node of the broadband network, and (2) the peerless tunnel is configured for data communications between the first node and a non-peer second node.

A peer is the node at the other end of a tunnel that includes TELQO capabilities. A peerless tunnel is a tunnel where the traffic being received across a broadband connection with TELQO capabilities is not transmitted by a peer, and thus must be indirectly controlled via receive traffic shaping (e.g., a split tunnel where broadband data traffic received from one or more hosts over a public network (e.g., the Internet) via a split tunnel). For example, all split tunnels and some VPN tunnels are peerless. A peered tunnel is a tunnel where the traffic being received across a broadband connection with TELQO capabilities is transmitted, and rate limited, by a TELQO peer. For example, according to example embodiments, peered tunnels are preferable to peerless tunnels, because the receive rate of a peered tunnel can be more precisely controlled as compared to the receive rate of a peerless tunnel.

According to further example embodiments, a VPN router (e.g., an enterprise branch-office router) may have multiple broadband connections operating in various modes, including high-availability switch-over, high-availability load-balancing and connection bonding. Further, the TELQO functionality may be applied to such broadband connections. By way of example, in the High-Availability Switch-Over mode, data traffic typically runs entirely across one broadband connection at a time, and thus the TELQO functionality can support this mode by either employing one TELQO instance (e.g., bridge or WAP) per broadband connection (where the TELQO instance would recognize when it can carry traffic, and start up and run accordingly), or by employing a single TELQO instance that dynamically adjusts to changed traffic characteristics on switchover. In the High-Availability Load-Balancing mode, traffic runs simultaneously across multiple broadband connections, and thus a TELQO instance can be employed per connection, and status and statistics from the links can be used to assist the classification and routing algorithms that distribute traffic across the broadband connections. In the Connection Bonding mode, a single IP flow may be distributed across multiple broadband connections when throughput exceeding a single broadband connection is required. Such data traffic would be classified as Bulk-Transfer traffic, and thus a TELQO instance could be employed to the connection bonding problem with either of the following architectures: (1) Bonding Inside of the TELQO instance, where the instance addresses a single bonded broadband connection and operates to keep latency in moderation, and it would be the responsibility of the bonding algorithms to distribute the TELQO provided traffic appropriately across connections; or (2) Bonding Outside of the TELQO instance, where there would be a TELQO instance for each broadband connection, and the bonding algorithm would explicitly distribute the data traffic of a high-speed bulk flow across the multiple broadband connections using feedback from the TELQO instances regarding how much capacity is available for such a bonded bulk transfer. The equivalent of High-Availability Load-Balancing can be used for less bandwidth intensive flows.

In accordance with further example embodiments, the TELQO functionality classifies traffic into specific classifications. By way of example, such classifications include: (1) Light-No-Delay, which typically is applied to transmissions relating to TELQO control signaling, controlling the operation of the TELQO functions (e.g., clock synchronization, latency measurements and setting of the transmit rate for a peer); (2) Real-Time, which typically is applied to data traffic of applications that typically require a relatively consistent low latency and jitter and have a relatively predictable and consistent top-speed (e.g., VOIP comprises a typical example of a flagship real-time application); (3) Light-Interactive, which typically is applied to data traffic that typically benefits from relatively low-latency and does not amount to a significant fraction of overall traffic when aggregated together (e.g., domain name system (DNS) lookups comprise typical examples of Light-Interactive traffic); (4) Heavy-Interactive, which typically is applied to data traffic that typically benefits from relatively low-latency, but may operate at relatively high bit rates (for discrete periods of time), which can amount to a significant fraction of the capacity of a broadband connection (e.g., web browsing, such as hypertext transfer protocol (HTTP) and secure HTTP protocol (HTTPS), comprises a typical example of a dominant form of Heavy-Interactive traffic); and (5) Bulk-Transfer, which typically is applied to data traffic that can be expected to use a considerable amount of traffic over a long period of time (e.g., bulk traffic typically cannot expect to receive low-latency transmission). Additionally, in accordance with example embodiments, a packet-forwarding classification is dynamically assigned to each traffic class. For example, packet-forwarding classifications include: (1) Governed, where the packets are queued and typically forwarded, such as when a bandwidth governor can allow their forwarding; and (2) Ungoverned, where packets are typically forwarded without a queuing delay regardless of bandwidth limits—typically, a class is assigned to the Ungoverned packet forwarding classification when the total of Ungoverned traffic can be relied upon to remain consistently significantly less than the target rate.

According to such embodiments, the bandwidth allocation module assigns the packet forwarding classification to the traffic classes, as follows: (1) the Light-No-Delay and Real-Time traffic classes are assigned to the Ungoverned packet forwarding classification; (2) when there is no significant real-time activity, the Light-Interactive traffic class is typically assigned to the Ungoverned packet classification—alternatively, when there is real-time activity, the Light-Interactive traffic class is typically assigned to the Governed packet forwarding classification. If the classifier is unreliable, however, and a relatively large fraction of available bandwidth ends up being classified as Light-Interactive (even for a relatively brief period of time) then Light-Interactive traffic class will be assigned classified (at least conditionally) to the Governed packet forwarding classification; and (3) the Heavy-Interactive and Bulk-Transfer traffic classes are typically assigned to the Governed packet forwarding classification.

According to example embodiments, the TELQO functionality: (i) dynamically monitors the loading of the WAN connections via the modems and VPN gateway, and controls the traffic rate to avoid an overflow of the connections, which results in a consistent low latency for data transmissions over the connections (including control of the traffic flow over split tunnels to/from the public network); (ii) classifies and prioritizes traffic so that latency-sensitive traffic (e.g., VOIP traffic) is provided preference over non-latency-sensitive traffic (e.g., bulk-transfer traffic) to provide a reliable transport for such latency-sensitive traffic and a relatively consistent and improved responsiveness; and (iii) allocates bandwidth so that, when offered traffic exceeds available capacity, the lower priority traffic (e.g., guest WiFi traffic) can be restricted to a configurable percentage of the broadband capacity of the one or more tunnels of the network. Further, the TELQO functionality supports typical terrestrial broadband transports (including DSL, cable modem, FIOS, T1 and 3G/4G wireless), and supports VOIP and other latency-sensitive traffic over any of these transports (provided that the transport is able to provide sufficient capacity and relatively adequate QOS).

According to such embodiments, to enhance quality of service, the WAP 144 may be configured (i) to control the transmit rates by the VPN router 142 over the WAN transports via the remote modems (e.g., the modems 148, 152), (ii) to control the rate of transmission from a TELQO peer (e.g., the VPN GW 126, as controlled by the WOS 128) to the VPN router 142 via the WAN transports (e.g., the WAN transports/IPSEC tunnels 162, 164 and the respective acceleration transports 166, 168), and (iii) to perform traffic shaping of broadband traffic received over the split-tunnels 172, 174 (e.g., broadband traffic received from the Internet). The WAP thereby minimizes, substantially reduces or substantially prevents data from piling up within the broadband connections (e.g., the WAN transports and the split-tunnel transports) of the network—e.g., so that the prioritization of traffic and the traffic shaping of received traffic can provide the desired QOS characteristics (e.g., low latency for real time and interactive traffic).

According to one embodiment, with regard to the control of transmit rates by the VPN router 142 over the WAN transports, the WAP is configured to initiate and manage TELQO Probe Transactions, whereby the one way latency of the network is measured in both directions across the WAN transports. Based on the measured latency, the WAP determines target transmit and target receive rates to control the traffic transmitted/received over the network WAN transports. More specifically, the WAP controls the transmit rate (e.g., via a Set-Rate transaction) of the received traffic transmitted over the WAN transports to the VPN router 142 (e.g., transmitted from the VPN gateway 126 via the peered IPSEC tunnels carried by the WAN transports), where the SET-Rate transaction comprises sending the target transmission rates to the WOS 128, which in turn controls the VPN gateway in accordance with the new target rates. By way of example, the target transmit and receive rates are determined by periodically monitoring one-way latency in both directions across the WAN transports via the Probe Transactions. Based on the Probe Transaction measurements, a low one-way latency measurement indicates a light-load scenario, and thus the one-way latency in the opposite direction should substantially equal the measured one-way latency. When the measured latency exceeds a targeted threshold above typical latency experienced when the traffic is light, the target rate is reduced. For example, when a measurement indicates that the extra latency exceeds a threshold, the target rate is reduced by some fixed percentage. Otherwise, when the offered traffic exceeds the target rate, the target rate is increased. This is measured, for example, by determining a number of consecutive allocation periods that ended with packets left unsent. The WAP thereby determines, sets and dynamically adjusts transmit and receive rates based upon a determination of the latency parameters, and adjusts throughput limits, for the network.

According to a further embodiment, the WAP controls the target receive rate for traffic received over the split-tunnels via traffic shaping mechanisms. By way of example, for the peerless tunnels, the WAP indirectly regulates the receive traffic via one or more traffic shaping mechanisms, including insertion of extra target latency amounts, adjustment of window sizing, control of new connection establishment and packet dropping (as discussed in further detail below). Further, the bandwidth limits governing the traffic shaping may be set based on one or more of a variety of factors, including the latency measurements based on probe transactions and limits calculated based on other network factors. For example, based on the determined network latency parameters, the WAP determines a target receive data rate to control traffic flows received over the peerless tunnels (e.g., the split-tunnels), and, based on the determined target receive data rate, regulates such traffic flows.

According to one example method for controlling received data flow from a split tunnel, the WAP regulates the rate of establishing new network connections. For example, in the case of accessing a web page of an Internet site via a peerless tunnel, each link contained on that web page will initiate a new TCP connection to the web site identified by the link, which can result in dozens of new TCP connections. In order to initiate a TCP connection, TCP uses a three-way handshake. The client or web browser first transmits a TCP SYN packet to the server to initiate the connection, and the server responds by transmitting a SYN-ACK packet back to the client. The client then transmits an ACK packet back to the server, and, at this point, the client and server have each received an acknowledgment of the connection. One component of the packets is a sequence number that is used by to reassemble the data stream. Accordingly, without the initial SYN packet being transmitted to the server, no connection will be initiated, and thus the server cannot transmit the associated web site data back to the client (over the split tunnel). In order to control the traffic flow of the data received over the split tunnel, therefore, the WAP regulates the rate at which such new network connections are initiated and established. By way of example, the WAP stores or queues the respective SYN packets in the SYN queue 515, and releases them at a determined rate to control the rate of the establishment of the respective network connections.

According to a further example method for controlling for controlling received data flow from a split tunnel, the WAP dynamically controls the TCP window sizing. With a TCP connection between a client and a server, the client sets a window size, which reflects the number of bytes the client is willing to receive at one time from the server (or the number of bytes that may remain unacknowledged at any given time. This window size is the receive window for the client, which sets a bound on the number of bytes that the server may send at one time, or the send window size of the server, and thus the window size effectively controls the channel bit rate or traffic flow. Hence, in addition or as an alternative to regulating the rate of establishing new connections, the WAP controls traffic flow of data received over the split tunnel by setting the window size accordingly.

According to a further example method for controlling for controlling received data flow from a split tunnel, the WAP may employ packet tossing or dropping. By way of example, in order to slow down the rate of data receipt, for example, over a split tunnel, the transmitting hosts can be signaled to slow down their respective transmit rates. This can be accomplished by methodically dropping TCP packets received from a given host, whereby, according to TCP procedures, upon experiencing packet loss the transmit rate is adjusted. Accordingly, when the respective transmitting host experiences packet loss based on the packets dropped by the WAP, the host will adjust the transmit rate accordingly.

Figure 6:
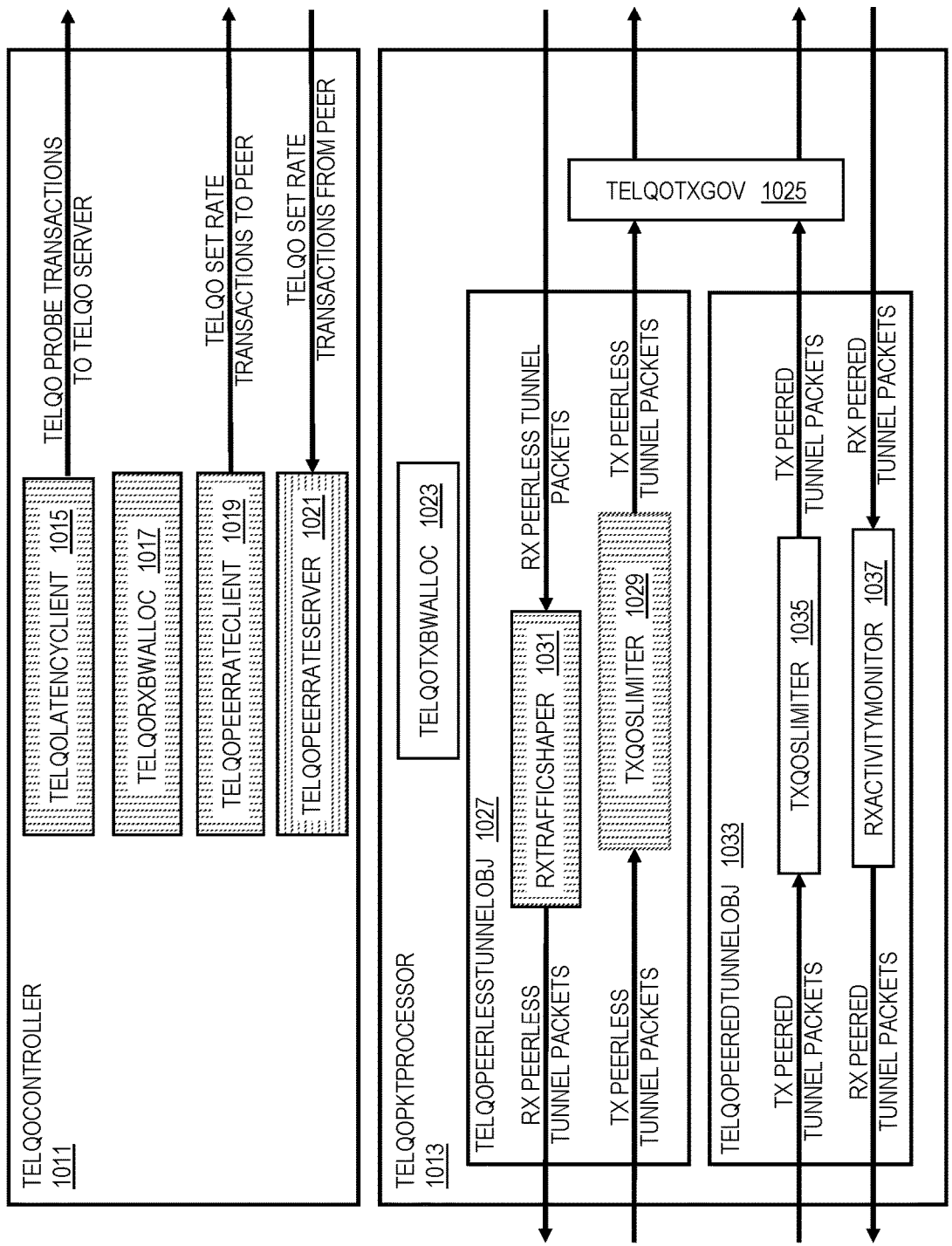
FIG. 6 illustrates an example structure for the organization of various components or modules for implementing the TELQO functionality, according to example embodiments.

FIG. 6 illustrates an example structure for the organization of various components or modules (e.g., one or more processors with software components or objects that run on the one or more processors, or one or more special purpose processors (e.g., ASICs), also with software components or objects that run on the one or more special processors, etc.) for implementing the TELQO functionality, according to example embodiments. According to certain of such embodiments, the elements shaded with the vertical lines are included in the WAP 144, the elements shaded with the horizontal lines are included in the WOS 128, and the elements without any shading are included in both the WAP and WOS. With reference to FIG. 6, at a high level, the TELQO functionality is implemented, for example, within a WAP (e.g., the WAP 144) via two components (e.g., modules or software/firmware objects, or a combination thereof)—a control module (e.g., the TelqoController 1011) and a packet processing module (e.g., the TelqoPktProcessor 1013). The TelqoController module is typically less real-time sensitive (e.g., no per-packet processing), and thus may run as an operating system user process (e.g., a LINUX user process). The TelqoPktProcessor is typically relatively real-time sensitive (e.g., including per packet processing, such as prioritization, rate governing, etc.), and thus may run either within the same process as the TelqoController, and (when appropriate—e.g., for more real-time sensitive processes) run within a kernel module (e.g., as a set of NetFilter hooks). By way of example, the TelqoController may consist of a socket application that exchanges TELQO probe packets with a WOS (e.g., the WOS 128). The TelqoController initiates network latency measurements, and determines and adjusts target transmit and receive rates. By way of further example, the TelqoPktProcessor may be composed of LINUX NetFilter type modules, which operate in real time on packets prior to transmission and after receipt via the WAN interfaces of the VPN router 142. Further, the TelqoPktProcessor may operate as a transparent raw-mode socket bridge application (e.g., between a virtual WAN Ethernet interface and the actual WAN Ethernet interface).

By way of further example, the TelqoController 1011 includes a TELQO Latency Measurement Client (TelqoLatencyClient 1015), a TELQO Receive Bandwidth Allocator (TelqoRxBwAlloc 1017), a TELQO Set-Peer-Rate-Limit Client (TelqoPeerRateClient 1019), and a TELQO Set-Peer-Rate-Limit-Server (TelqoPeerRateServer 1021). The TelqoLatencyClient interacts with a TELQO server (e.g., the WOS) to maintain clock synchronization, measure one-way network latency, and determine the target transmit rate and target receive rate and provide these rates to the bandwidth allocators. This module may be optional when in the Over-Engineered mode, wherein the target transmit rate would default to an infinite rate. The TelqoRxBwAlloc allocates receive bandwidth among the multiple tunnels. This module may also be optional when the broadband connection is Over-Engineered. There typically would be one TelqoPeerRateClient per peered tunnel, where each such module sets the transmit limit for the respective peer, such as by initiating TELQO Set-Peer-Rate-Limit transactions, on an as needed basis. This module may be optional when the peer is operating in an Over-Engineered mode. There typically would also be one TelqoPeerRateServer module per peered tunnel, where each such module obtains from the peer the transmit rate that will govern transmissions to the peer.

The TelqoPktProcessor 1013 includes a TELQO Transmit Bandwidth Allocator (TelqoTxBwAlloc 1023), a TELQO Peerless Tunnel module (TelqoPeerlessTunnelObj 1027), a TELQO Peered Tunnel module (TelqoPeeredTunnelObj 1033), and a TELQO Transmit Governor (TelqoTxGov 1025). The TelqoTxBwAlloc allocates transmit bandwidth among the multiple tunnels. It is also typically real-time intensive, operating periodically at a high frequency (such as 100 to 1000 times per second), where each such period typically requires interactions with each TxQOSLimiter module and with the TelqoTxGov. The TelqoPeerlessTunnelObj 1027 is responsible for transmit QOS prioritization and throughput limiting, and for receive traffic shaping for the traffic of a single peerless tunnel, where there typically would be one such module for each peerless tunnel. Further, the TelqoPeerlessTunnelObj 1027 will include a TxQOSLimiter 1029, which performs transmit limiting and prioritization of traffic being sent to the device to the limit provided by the TelqoTxBwAlloc, and a RxTrafficShaper 1031, which performs traffic shaping for received traffic to keep it under the limit assigned by the TelqoRxBwAlloc. The TelqoPeeredTunnelObj 1033 is responsible for transmit QOS prioritization and throughput limiting for traffic being carried by the broadband connection across a single peered tunnel (e.g., a VPN tunnel), where there typically would be one such module for each peered tunnel. Further, the TelqoPeeredTunnelObj 1033 will include a TxQOSLimiter 1035, which performs transmit limiting and prioritization of traffic being sent to the device to the limit provided by the TelqoTxBwAlloc, and a RxActivityMonitor 1037, which classifies received packets and counts packets and bytes by classification (which counts can be used by the TelqoRxBwAlloc)—this module is optional when operating in an Over-Engineered mode. The TelqoTxGov 1025—this module is typically a final check that is responsible for keeping the transmission rate under the Target Transmit Rate, and is optional and typically only required when there are multiple tunnels and the broadband connection is not Over-Engineered.

According to one example embodiment, the TELQO functionality operates to measure network latency and to set network target transmit and receive rates via Probe and Set-Rate Transactions. Probe transactions are initiated to obtain/maintain clock synchronization and to measure one-way network latency. Set-Rate Transactions are initiated to set the transmit rate limit of a TELQO peer, and to set its maximum ungoverned classification. Relatively frequent initiation of Probe Transactions enhances synchronization performance, and provides relatively frequent network latency measurements. On the other hand, initiating Probe Transactions relatively frequently adversely affects available bandwidth, and may result in the transmission of probe requests when either direction of the link is asymmetrically congested, which can drive the Os(t) off in the direction of the asymmetry. Therefore, according to example embodiments, typically results of a timing request Probe Transaction which have as relatively short round trip time are used for adjusting Os(t).

By way of example, a Probe Transaction and a Set-Rate transaction typically utilizes two UDP packets operating according to a client/server model. A TELQO Probe Transaction, for example, provides a client with a Cl(req), a Cr(req) and a Cl(resp) measurement. These measurements are used to obtain/maintain clock synchronization and to determine one-way latency in both the transmit and receive directions. Further, typically there are no retransmissions of packets within a Probe or Set-Rate Transaction, and a timeout can be used to determine the loss of a Probe Reply. A TELQO peer, upon completing initialization of a tunnel, or upon finding that its peer has changed its incarnation number, needs to relatively expeditiously obtain its transmit rate limit. Accordingly, such a TELQO peer periodically sends initiate Set-Rate Transaction requests until it receives a valid Set-Rate Request packet. The reception of an Initiate Set-Rate Transaction packet triggers a TELQO peer to initiate a Set-Rate Transaction.

Figure 7A:
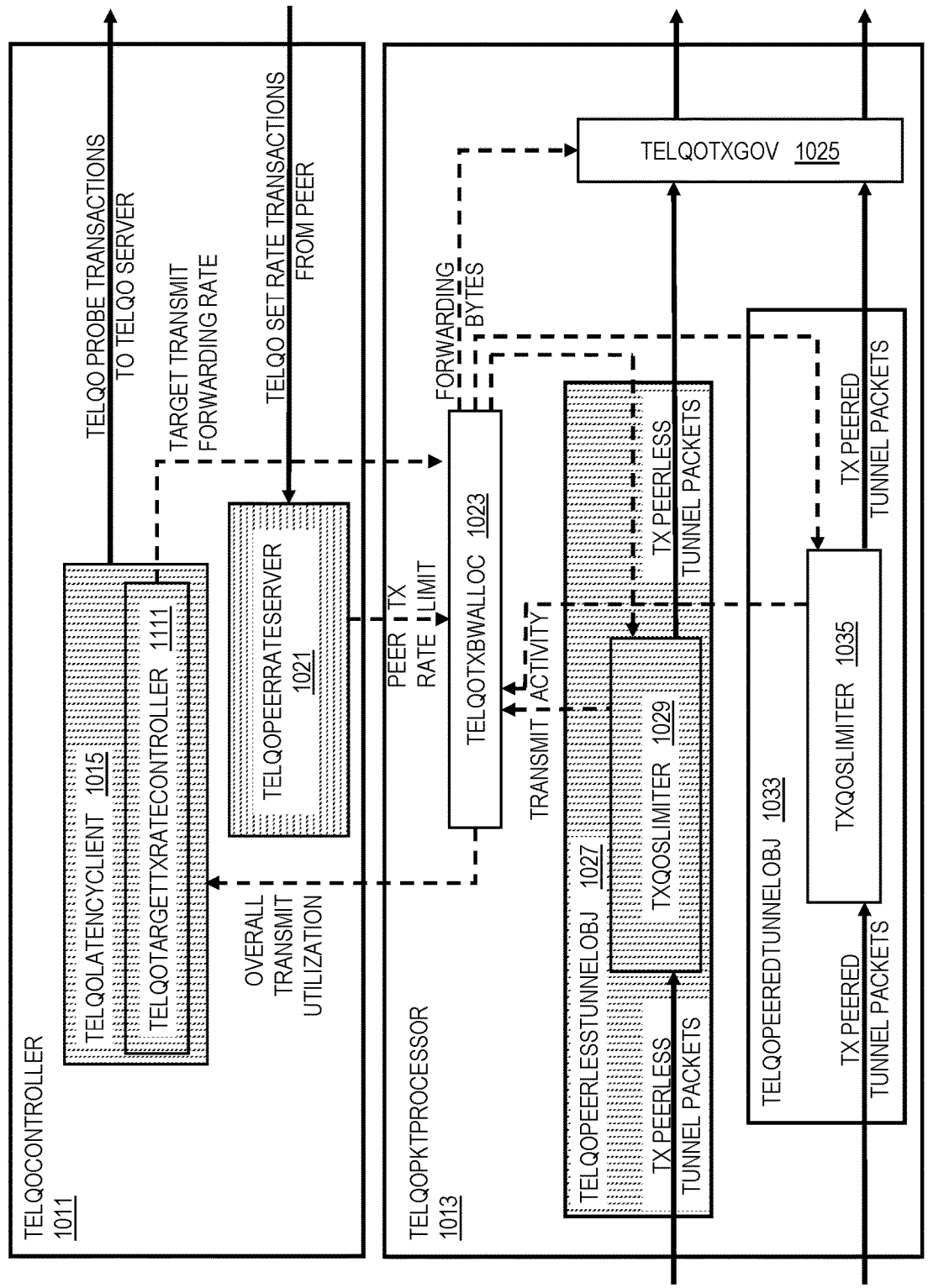
FIG. 7A illustrates a block diagram depicting a process for the generation of a target data transmit rate, based on network latency measurements, in accordance with example embodiments.
Figure 7B:
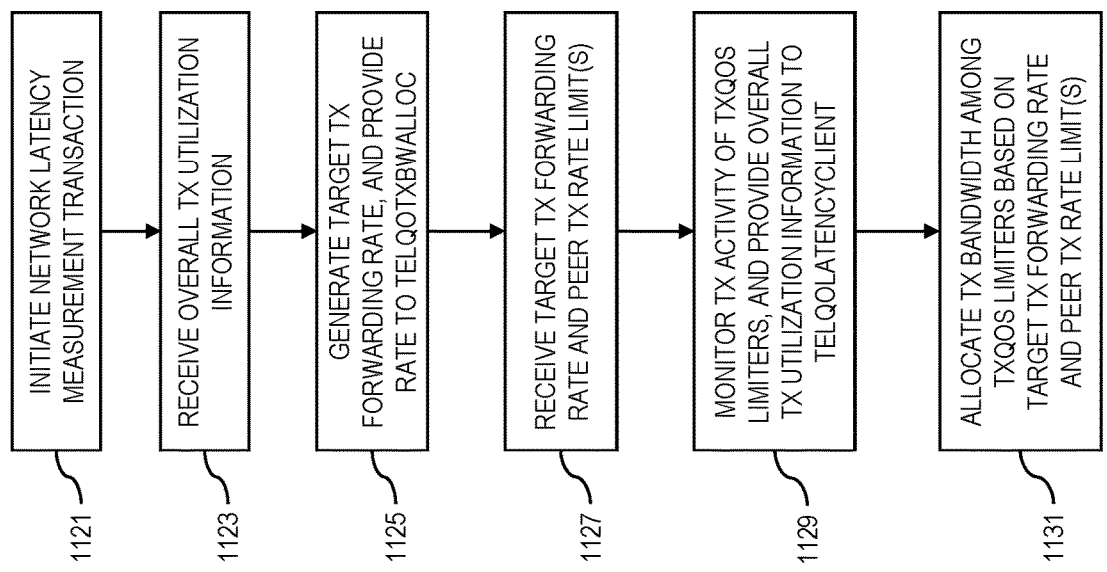
FIG. 7B illustrates a flow chart depicting a process for the generation of a target data transmit rate, based on network latency measurements, in accordance with example embodiments.
Figure 8A:
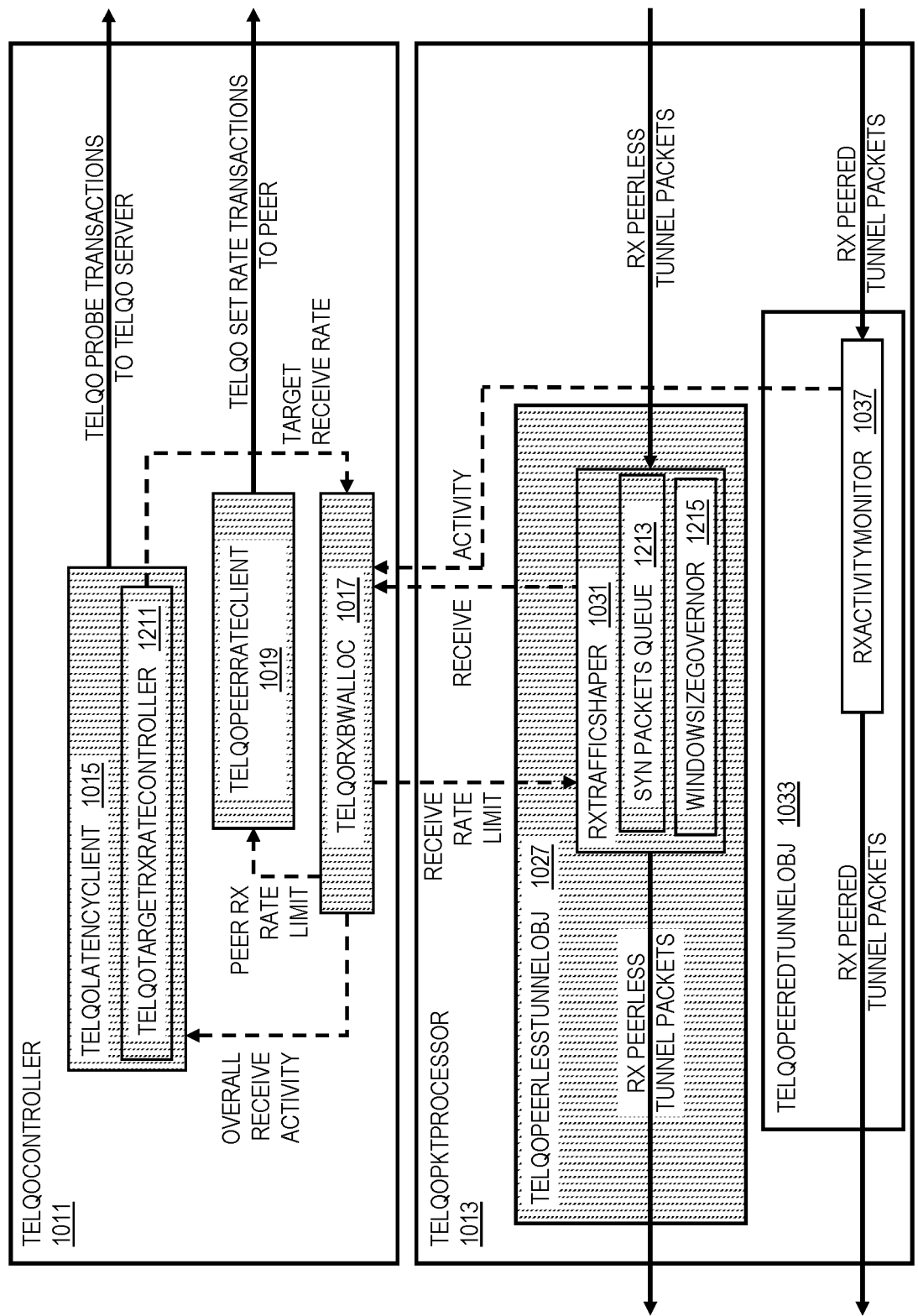
FIG. 8A illustrates a block diagram depicting a process for the generation of a target data receive rate, based on network latency measurements, in accordance with example embodiments.
Figure 8B:
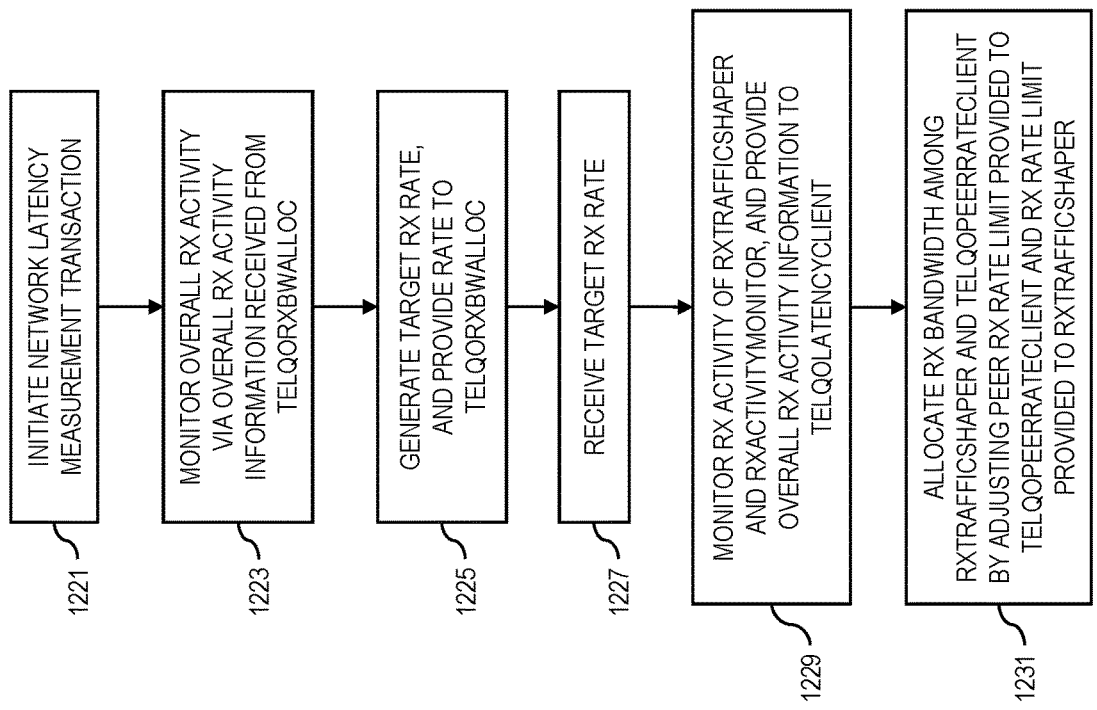
FIG. 8B illustrates a flow chart depicting a process for the generation of a target data receive rate, based on network latency measurements, in accordance with example embodiments.

FIGS. 7A and 7B illustrate a block diagram and flow chart depicting a process for the generation of a target data transmit rate, based on network latency measurements, in accordance with example embodiments. Further, FIGS. 8A and 8B illustrate a block diagram and flow chart depicting a process for the generation of a target data receive rate, based on network latency measurements, in accordance with example embodiments. With regard to FIGS. 7A and 8A, according to certain of such embodiments, the elements shaded with the vertical lines are included in the WAP 144, the elements shaded with the horizontal lines are included in the WOS 128, and the elements without any shading are included in both the WAP and WOS. As previously discussed, the TelqoLatencyClient module 1015 obtains clock synchronization with a TELQO server (e.g., the WOS 128), obtains one-way latency measurements, monitors the overall transmit and receive activity (in conjunction with the TelqoTxBwAlloc 1023) and generates the target transmit rate (also referred to as the target transmit forwarding rate) for the TelqoTxBwAlloc, monitors the overall transmit and receive activity (in conjunction with the TelqoTxBwAlloc) and generates the target receive rate for the TelqoRxBwAlloc.

According to example embodiments, with reference to FIGS. 7A and 7B, with respect to the determination and setting of a target transmit forwarding rate, the TelqoLatencyClient module initiates a latency measurement transaction with a TELQO server or WOS (S1121), for example, to measure the transmit one-way latency and establish or maintain clock synchronization. The TelqoLatencyClient module also receives overall transmit utilization information from the TelqoTxBwAlloc 1023 (S1123). The transmit utilization information guides the TelqoLatencyClient regarding the required frequency for performing latency measurements to control transmission across the broadband connection. The information also guides the TelqoLatencyClient regarding when it is appropriate to increase the Target Forwarding Rate. Based on the latency measurement and the transmit utilization information, the TelqoLatencyClient module generates a target transmit forwarding rate and provides the target rate to the TelqoTxBwAlloc (S1125).

The TelqoTxBwAlloc 1023 receives the target transmit forwarding rate from the TelqoLatencyClient, and receives a peer transmit rate limit from each TelqoPeerRateServer module 1021 (S1127). Further, the TelqoTxBwAlloc monitors the transmit activity of each of the TxQOSLimiter modules 1029, 1035 within the TelqoPeerlessTunnelObj module 1027 and TelqoPeeredTunnelObj module 1033, respectively (S1129). Based on the monitoring, the TelqoTxBwAlloc provides the overall transmit utilization information back to the TelqoLatencyClient 1015. The TelqoTxBwAlloc then allocates transmit bandwidth among the TxQOSLimiter modules by allocating forwarding bytes, with precise timing (e.g., based on the target transmit forwarding rate received from the TelqoLatencyClient, and the peer transmit rate limits received from the TelqoPeerRateServer modules), to the TxQOSLimiter 1029 and TxQOSLimiter 1035 modules, and to the TelqoTxGov 1025 (S1131).

The resulting transmit rate aggregated from the TxQOSLimiter modules should be such that the broadband connection is not overloaded, so that the prioritization of packets by the TxQOSLimiters result in acceptable latency for real-time and interactive data traffic. For example, the resulting overall transmit rate should be such that the queue of the broadband modem for packets awaiting transmission across the broadband connection remains loaded to the extent that bulk transmission data traffic uses substantially all of the capacity of the broadband connection, while the high-priority data packets are transmitted within tolerable delay limits. Further, this overall transmit rate should accommodate for changes in available network bandwidth capacity and some level of network jitter.

The TelqoLatencyClient module 1015 includes the TelqoTargetTxRateController module 1111, via which the TelqoLatencyClient controls the target transmit rate. The TelqoTargetTxRateController module comprises two main outputs, the target forwarding rate, and a command line back to the TelqoLatencyClient module to initiate a latency measurement probe transaction (not shown). The TelqoTargetTxRateController module controls the target rates to control throughput limits based on certain information at its disposal. The TelqoTargetTxRateController can obtain notifications of packet transmissions, and time-stamped transmitted packet and byte counts by priority level, from the TelqoTxBwAlloc object. The notification of packet transmission, for example, may be used to detect an idle/lightly loaded connection going active. The TelqoTargetTxRateController also receives the one-way latency measurement data.

The TelqoTargetTxRateController only requires explicit one-way latency measurements when the transmitter is not idle, as it receives an indication of the minimum one-way latency as a byproduct of clock synchronization probe transactions. With regard to the frequency of latency measurements, for example, the TelqoLatencyClient 1015 aggressively measures one-way latency when either real-time data traffic (e.g., VOIP data) is flowing, or when the overall data traffic being offered for transmission flows fast enough to nearly saturate the target transmit rate. According to one embodiment, the TelqoTxBwAlloc 1023 provides guidance to the TelqoLatencyClient regarding the required latency measurement frequency. For example, such guidance provided by the TelqoTxBwAlloc may reflect three potential different modes—Aggressive, where measurements are desired at a high frequency (e.g., on the order of once every 200 ms); Light, where measurements are desired at a relatively low frequency (e.g., on the order of once a second), when traffic is flowing but there is no real-time traffic and the offered load is nowhere near the throughput limit; and Idle, where no latency measurements are required beyond what is required for maintaining clock synchronization, when there is basically very little traffic.

According to example embodiments, the target extra latency is a function of the inherent jitter in the underlying network (e.g., default=30 ms), and the propagation delay of a large packet (e.g., considering a default max size of 1600 bytes). This is because, for a broadband connection operating at a relatively low rate, the propagation delay of even a single large lower-priority packet impacts the one-way latency of higher-priority (real-time) packets and the latency measurement packets. For example, the target extra latency would equal the Underlying Jitter (ms)+Large Packet Size (bytes)*8/Current Target Transmit Rate.

By way of example, considering a rate reduction, when a latency measurement indicates that the extra latency exceeds a threshold, the target transmit rate is reduced by a predetermined fixed percentage (e.g., default=10%) down to a minimum value (e.g., default=50 kbits/sec). Further, the period between reductions would be limited to a value greater than the current round-trip time so that a subsequent reduction is only invoked after the first reduction has had a chance to take effect. By way of further example, considering a rate increase, an increase in the target transmit rate is implemented when the offered data traffic exceeds the target transmit rate. The TelqoTxBwAlloc 1023 determines when this condition occurs by determining how many consecutive allocation periods have ended with packets left unsent. How aggressively the throughput limit is increased depends on whether real data time traffic is flowing, which controls the extent of the extra latency that can be tolerated. For example, when real-time data traffic is flowing, the throughput limit is increased gradually to avoid significant impact on the real-time data traffic. The TelqoTxBwAlloc 1023 object provides the real-time activity to the TelqoLatencyClient 1015 along with the other overall transmit utilization information so that the TelqoLatencyClient is aware as to when real-time data traffic is flowing.

For example, if the network throughput is 1 Mbit/sec, a transmit rate increase of 10% (resulting in a new rate of 1.1 Mbit/sec) for one second will result in an extra 10% of 1 Mbit/sec traffic (100,000 bits) buffered by the network. That 100,000 bits will take 0.1 seconds to be transmitted, indicating that the latency will increase by 100 ms. In other words, determining a percentage for increasing the target transmit rate or overdriving the network, for example, would be as follows: $E=(P/100)*D$, or $P=100*E/D$; where R=the network rate in bits/second, P=percentage overdrive of the network, D=duration of the overdriving of the network in seconds, and E=the extra latency in seconds at the end of the duration of overdriving. According to an example embodiment, therefore, where the desired result of a throughput increase is no more than 10 ms of extra latency, after persisting for one second, the target transmit rate increase would be 1%.

According to example embodiments, with reference to FIGS. 8A and 8B, with respect to the determination and setting of a target receive rate, the TelqoLatencyClient module 1015 initiates a latency measurement transaction with a TELQO server or WOS (S1221), for example, to measure the receive one-way latency and establish or maintain clock synchronization. The TelqoLatencyClient module also monitors overall receive activity information provided by the TelqoRxBwAlloc 1017 (S1223). Based on the latency measurement and the receive activity information, the TelqoLatencyClient module generates a target receive rate and provides the target rate to the TelqoRxBwAlloc (S1225). As with the target transmit rate, the TelqoLatencyClient module 1015 controls the target receive rate via a TelqoTargetRxRateController module 1211. The TelqoTargetRxRateController module functions substantially as does the TelqoTargetTxRateController module 1111 employed for generating the target transmit rate, but instead works with receive objects rather than transmit objects.

The TelqoRxBwAlloc 1017 receives the target receive rate from the TelqoLatencyClient (S1227). Further, the TelqoRxBwAlloc monitors tunnel receive activity via the RxTrafficShaper module 1031 and the RxActivityMonitor module 1037 (S1229). Based on the monitoring, the TelqoRxBwAlloc provides the overall receive activity information back to the TelqoLatencyClient 1015 (S1229). The TelqoTxBwAlloc then allocates receive bandwidth among the RxTrafficShaper module 1031 and the TelqoPeerRateClient module 1019 by adjusting the receive rate limit for each tunnel (e.g., based on the target receive rate received from the TelqoLatencyClient, and the receive activity information the received from the RxTrafficShaper and RxActivityMonitor modules) (S1231). The receive rates are controlled by the peer receive rate limit provided to the TelqoPeerRateClient module and the receive rate limit provided to the RxTrafficShaper module (S1231). For the peered tunnel, the rate of receive traffic is controlled via a set rate transaction between the TelqoPeerRateClient and the Telqo peer from which the receive traffic is received over the tunnel (e.g., initiated via a set rate request transmitted to the peer). For the peerless tunnel, the RxTrafficShaper module 1031 regulates the receive traffic, based on the receive rate limit provided by the TelqoRxBwAlloc 1017 via one or more traffic shaping mechanisms, including insertion of extra target latency amounts, adjustment of window sizing, control of new connection establishment and packet dropping (as discussed in further detail below). Further, the TelqoRxBwAlloc employs a moving average receive rate to produce the overall receive activity information used as guidance for latency measurements and target receive rate increases, and as indicating whether there is real-time data traffic activity over the broadband connection.

The resulting receive rate aggregated across the tunnels should be such that the broadband connection is not overloaded, so that low-latency data packets (e.g., real-time, light interactive and heavy interactive data) obtain low latency and low jitter across the broadband connection. For example, the resulting peer receive rate limit and receive rate limit be such that the queue of the modem (e.g., the broadband equivalent of a DSLAM) for packets awaiting transmission across the broadband connection to the broadband modem remains loaded to the extent that bulk transmission data traffic uses substantially all of the capacity of the broadband connection, while the high-priority data packets are transmitted within tolerable delay limits. Further, the receive rate limits should accommodate for changes in available network bandwidth capacity and some level of network jitter.

As previously discussed, with respect to a peerless tunnel, because there is no peer, there is no way to directly control the receive rate of broadband traffic over the peerless tunnel by means of the direct control of the transmit rate by which a peer transmits such traffic. According to example embodiments, therefore, the rate by which broadband data traffic is received over a peerless tunnel is indirectly controlled via a TELQO Receive Traffic Shaper (RTS) (e.g., the RxTrafficShaper module 1031). The TELQO RTS is configured to control receive throughput, provided that all significant low-priority traffic has a flow control mechanism, and that the flow control mechanism reduces flow in response to increased delay and/or packet loss (which is the case for almost all popularly used applications). There are, however, two cases which might be exceptions—one exception being web browsing, which utilizes multiple parallel TCP connections, and the second being UDP-based teleconferencing and video chat applications. The TELQO functionality is configured to deal with such applications (e.g., web browsing) by means of flow control measures that involve adjusting the receive window size and pacing connection establishment.

According to example embodiments, the TELQO RTS is IP flow aware (e.g., IP protocol, source/destination address and port), whereby the RTS appropriately adjusts delays and packet drops for each flow according to its priority. The RTS classifies each flow by priority, such as one of: (1) Light-No-Delay (e.g., TELQO probe packets); (2) Real-Time (e.g., VOIP); (3) Light-Interactive (e.g., DNS lookup); (4) Heavy-Interactive (e.g., web browsing); and (5) Bulk-Transfer. By way of example, Light-No-Delay and Real-Time packets are always passed thru without delay or intentional packet drop. The classifier may be configured, on a per-tunnel basis, to avoid Real-Time classification of flows on a per-subnet basis, which would typically be done for guest-WiFi subnets to keep their real-time traffic from interfering with more important flows. When there is no Real-Time traffic flowing, flow control is initially performed on the remaining traffic by priority queuing the traffic up to a maximum latency, as limited by the throughput limit. Random packet dropping can be employed on a packet removed from a priority queue as it is about to be forwarded, depending on how long it was queued. The random drop, for example, occurs with increasing intensity (e.g., linearly from 0 to 100%) as the throughput limited priority queue induced latency exceeds a predetermined baseline threshold and moves to the maximum latency. Further, when Real-Time data traffic is actively flowing over the broadband connection, Bulk-Transfer and Heavy-Interactive traffic may be subjected to a fixed delay, prior to being processed. This ensures that TCP packet loss induced shrinking of the transmit window has a dramatic effect on TCP throughput. PEP Terrestrial Backbone Protocol (TBP) traffic is delayed as needed, but is never dropped intentionally, as the flow control of the TBP protocol is latency based.

According to further example embodiments, the TELQO functionality controls receive window sizing to regulate the network throughput of broadband traffic received over a peerless tunnel. For example, the throughput of a TCP connection is generally a function of its window size and its round-trip time as follows: Throughput=WindowSize(in bits)/RoundTripTime. For example, when the window size is 50 kbytes and the round trip time is 10 ms, Throughput=50 kbytes*8 bitsperbyte/0.01 sec=40,000 kbits/sec. The TELQO functionality is further configured to regulate the network throughput of broadband traffic received over a peerless tunnel by controlling the rate for the establishment of new network connections (e.g., for parallel TCP connection intensive applications, such as web browsing). For example, accessing a web page with multiple links contained within that page would result in virtually instantly opening multiple connections for the various links. Once established, each connection could immediately dump a full window size of data (e.g., with window sizes of 64K typically not being uncommon), resulting in half a million bits, which (over a 500 kbits/sec connection), for example, would cause the round trip time to run up to a full second. Further, where there are multiple such connections, the result scales from there, accordingly.

By way of example, with respect to controlling window sizing, when operating in a latency sensitive mode (carefully controlling latency and jitter, such as for Real-Time data traffic), the TelqoRxTrafficShaper module 1031 actively adjusts the receive window size provided to hosts beyond the broadband connection (e.g., by the TxQOSLimiter module associated with the respective tunnel). The TelqoRxTrafficShaper module also carefully controls window size increases (as an increase in the window size for a TCP connection allows a spike of traffic—e.g., up to the increase in the window size). Further, in such latency sensitive modes, the TelqoRxTrafficShaper module carefully controls the establishment of new TCP connections (as a new TCP connection would also result in a spike of data traffic—e.g., up to the respective initial receive window size). By way of example, as previously described, new TCP connection establishment can be controlled by means of queuing SYN packets, and releasing them in a controlled manner to regulate the rate of new connection establishment. Further, as will be appreciated, a spike in data traffic would then result in an associated spike in network latency. For example, the size of the expected latency spike when a new TCP connection is established or a window size is increased may be calculated as: Increase=window size increase (bytes) *8/RxTrafficShaper receive rate limit (bps).

The TelqoRxTrafficShaper module 1031 accordingly maintains an initial window size for all new TCP connections (e.g., default=500 bytes), a SYN Packets Queue 1213 for the queue and release of SYN packets, and a WindowSizeGovernor module 1215 for controlling window size increases. For example, the WindowSizeGovernor module maintains window size increases at a rate (e.g., default=500 bytes) that limits latency impact to a predetermined level (e.g., default=25 ms) every second. If the receive rate limit is 1.5 Mbit/sec and the target spike is 25 ms in a second, then window size increases of 37,500 bits are permitted per second, which equates to approximately 9 increases (or new connections) per second. Further, TelqoRxTrafficShaper module also allocates window size rate increases to queued SYN packets first and to existing TCP connections second.

In accordance with example embodiments, with respect to the allocation of bandwidth where there are multiple tunnels over the broadband connection, the TELQO controller allocates bandwidth for both transmission and reception over the respective broadband connection associated with that controller. The bandwidth allocation, for example, is performed by the TelqoTxBwAlloc 1023 for transmission bandwidth, and by the TelqoRxBwAlloc 1017 for the reception bandwidth. The objectives for the bandwidth allocation policy, according to example embodiments, are as follows: (1) Real-Time and Light-Interactive Traffic are afforded relatively high QOS service (e.g., low-latency transmission), especially after the network has had a chance to adjust to the initiation of a real-time data traffic flow; and (2) when offered traffic exceeds broadband connection capacity, the capacity is either fully or nearly fully utilized, every tunnel with data traffic to send is allocated at least some bandwidth, and preferred tunnels receive a larger fraction of available bandwidth (after Real-Time and Light-Interactive traffic has been carried) than less preferred tunnels, according to per-tunnel priority and weighting parameters.

While the objectives for bandwidth allocation are identical for both transmit and receive, the example processes employed differ. For example, with respect to bandwidth allocation for transmit data traffic, the TelqoController 1011 and TelqoPktProcessor 1013 directly control the target transmit rates and the transmit packet forwarding, whereas received data traffic is either paced by TELQO peers on the far side of peered tunnels, which can only be adjusted by a transaction across the network, or received data traffic is being indirectly paced by the Receive Traffic Shaper (RxTrafficShaper 1031). By way of example, transmit bandwidth allocation operates directly on transmit rates at a very fine granularity (e.g., approximately 1 to 10 ms, allocating individual bytes for transmission), based on direct knowledge of the offered data traffic loads. On the other hand, receive bandwidth allocation operates based on relatively imprecise and delayed knowledge of the offered data traffic loads, and thus operates by adjusting rate limits and analyzing results. For peered tunnels, the peer receive rate limit is set via Set-Rate transactions performed by the TelqoPeerRateClient 1019 over the network. For peerless tunnels, the receive rate limit provided to the RxTrafficShaper module 1031 is adjusted, whereby the RxTrafficShaper performs the associated traffic shaping functions (as previously described), and then some time is required for the flow control of the individual data packet flows to take effect and reduce the aggregate receive data rate.

According to example embodiments, a tunnel may be configured based on certain parameters. By way of example, a Tunnel ID uniquely identifies a tunnel over a given broadband connection (e.g., an alphanumeric string of up to 20 characters). A Peer Sender ID (e.g., a 32-bit unsigned integer of default=0) uniquely identifies the far end peer of the tunnel, where certain values can be reserved for peerless tunnels (e.g., 0-255). The Peer Sender ID would be expected for set-rate transaction packets sent by the near-end peer, and echoed by the associated set-rate transaction reply packets returned by the far-end peer, and the Peer Sender ID should be unique as among all tunnels over a given broadband connection (e.g., the node management IP address of the far-end peer). Similarly, a My Sender ID (e.g., a 32-bit unsigned integer of default=0) uniquely identifies the near-end peer of the tunnel, where certain values can be reserved for peerless tunnels (e.g., 0-255). The My Sender ID would be expected in set-rate transaction packets sent to the near-end peer, and should be unique among all tunnels carried by the near-end peer (e.g., the management IP address of the near-end peer). Preferably, there should be a limit of one peered tunnel between a pair of TELQO-capable nodes, and both the Peer Sender ID and My Sender ID would generally be required for peered tunnels across non-over-engineered connections (e.g., where the tunnel will be initiating TELQO Set-Rate transactions). A Peer IP provides the IP address for the far-end peer of the tunnel with respect to the destination for the first packet of a set-rate transaction, where, for a peerless tunnel, the Peer IP may be set at a reserved value (e.g., 255.255.255.255, which could be the default value). The Peer IP would generally be required for all peered tunnels. A Peer Port (e.g., default=0 for a peerless tunnel) provides the destination port for a Set-Rate transaction request for the tunnel. The Peer Port would generally be required for peered tunnels over non-over-engineered connections. A Number-Users parameter provides an estimated number of users/applications with data traffic over the tunnel. The Number-Users is used to adjust the number of flows that can be supported by the classifiers of the tunnel (thereby adjusting the amount of memory consumed by the tunnel). A transmit (Tx) Minimum Share parameter provides the minimum share (e.g., percentage share) of Governed bandwidth (the total available bandwidth not including bandwidth used by Ungoverned traffic) that the tunnel should receive when needed and when the broadband connection is fully utilized. A Tx Tunnel Priority (e.g., with 1 reflecting the highest priority and 10 the lowest priority) identifies a strict priority of the tunnel relative to other tunnels, with respect to access to bandwidth beyond the minimum share bandwidth. Multiple tunnels may share the same priority level. A Tx Weight (e.g., an integer between 1 and 1000), for the allocation of bandwidth beyond the Minimum Share for the group of tunnels at the same priority level, reflects the amount of bandwidth the tunnel should receive relative to other tunnels of the same priority. An Rx Minimum Share parameter provides the minimum share (e.g., percentage share) of Governed bandwidth (the total available bandwidth not including bandwidth used by Ungoverned traffic), that the tunnel should receive when needed and when the broadband connection is fully utilized. Similarly, an Rx Tunnel Priority (e.g., with 1 reflecting the highest priority and 10 the lowest priority) identifies a strict priority of a tunnel relative to other tunnels as far as access to after-minimum share bandwidth is concerned. An Rx Weight (e.g., an integer between 1 and 1000), for the allocation of bandwidth beyond the Minimum Share for the group of tunnels at the same priority level, reflects the amount of bandwidth that the tunnel should receive relative to other tunnels of the same priority. With respect to the Tx Weight and the Rx Weight, for example, given a pair of tunnels at the same priority level, with large backlogs of data traffic waiting to be transmitted, a tunnel with a weight of 200 will receive twice as much bandwidth (beyond its minimum share) as a tunnel with a weight of 100.

By way of further example, in the event that overhead calculations are handled by the TELQO functionality (as opposed to being handled prior to the introduction of the data packets into the TELQO system), the tunnel configuration can include two additional parameters. A PacketOverheadBytes parameter (e.g., an integer between 0 and 300) provides the number of bytes of overhead (e.g., link level headers, IPSEC headers, other tunneling headers, etc.) to be included, for calculating how much capacity (in bits) the transmission or reception of a packet costs against rate limits. Further, an IsATM'ed parameter (e.g., an integer either 0 or 1), when non-zero, signifies that a packet should be assumed to be carried by an ATM circuit. The packet size is rounded up to an ATM cell boundary (e.g., a 48-byte boundary) and a penalty of 5 bytes per cell would be charged when calculating how much capacity (in bits) the transmission or reception of a packet costs against rate limits. The default can be set to 1, whereby, in the event of the initiation of a stream of small packets, they will be charged with the worst-case overhead and thereby prevent the broadband connection from becoming congested.

With respect to transmit bandwidth allocation, according to example embodiments, as introduced above, the transmit bandwidth allocator (TelqoTxBwAlloc 1023) directly controls the rate of transmission, and maintains the transmit rate at or under target transmit rate (e.g., provided Ungoverned Traffic remains well under that target transmit rate). While each tunnel includes a forwarding governor that controls the transmission of Governed packets, Ungoverned packets are transmitted without delay. By way of example, the transmit bandwidth allocator periodically monitors Ungoverned packet transmissions, determines the remaining number of forwarding bytes that can be allocated, and allocates the remaining forwarding bytes to the tunnels. The forwarding governor of a tunnel (TelqoTxGov 1025) forwards the front packet from its priority queue as soon as it has accumulated enough forwarding bytes to match the size of that front packet with overhead. The transmit bandwidth allocator handles two different kinds of tunnels: (1) Tx Peered Tunnel—where transmission across such a tunnel is bound by both the target transmit rate for the broadband connection as a whole, and by the transmit peer rate limit (which exists to protect the broadband connection of the peer against overloading); and (2) Tx Peerless Tunnel—where there is no transmit peer rate limit (e.g., can be implemented as a virtually infinite peer rate limit). The activity of a tunnel impacts its bandwidth allocation in that only an active tunnel is allocated bandwidth, where an active tunnel is one with Governed packets waiting to be transmitted. The TelqoTxBwAlloc 1023 is relatively tightly coupled with the TelqoTxGov 1025 and the TxQOSLimiter modules 1029, 1035, and when they reside within the TelqoPktProcessor module 1013, the TelqoTxBwAlloc should reside within the same kernel module.

Figure 9:
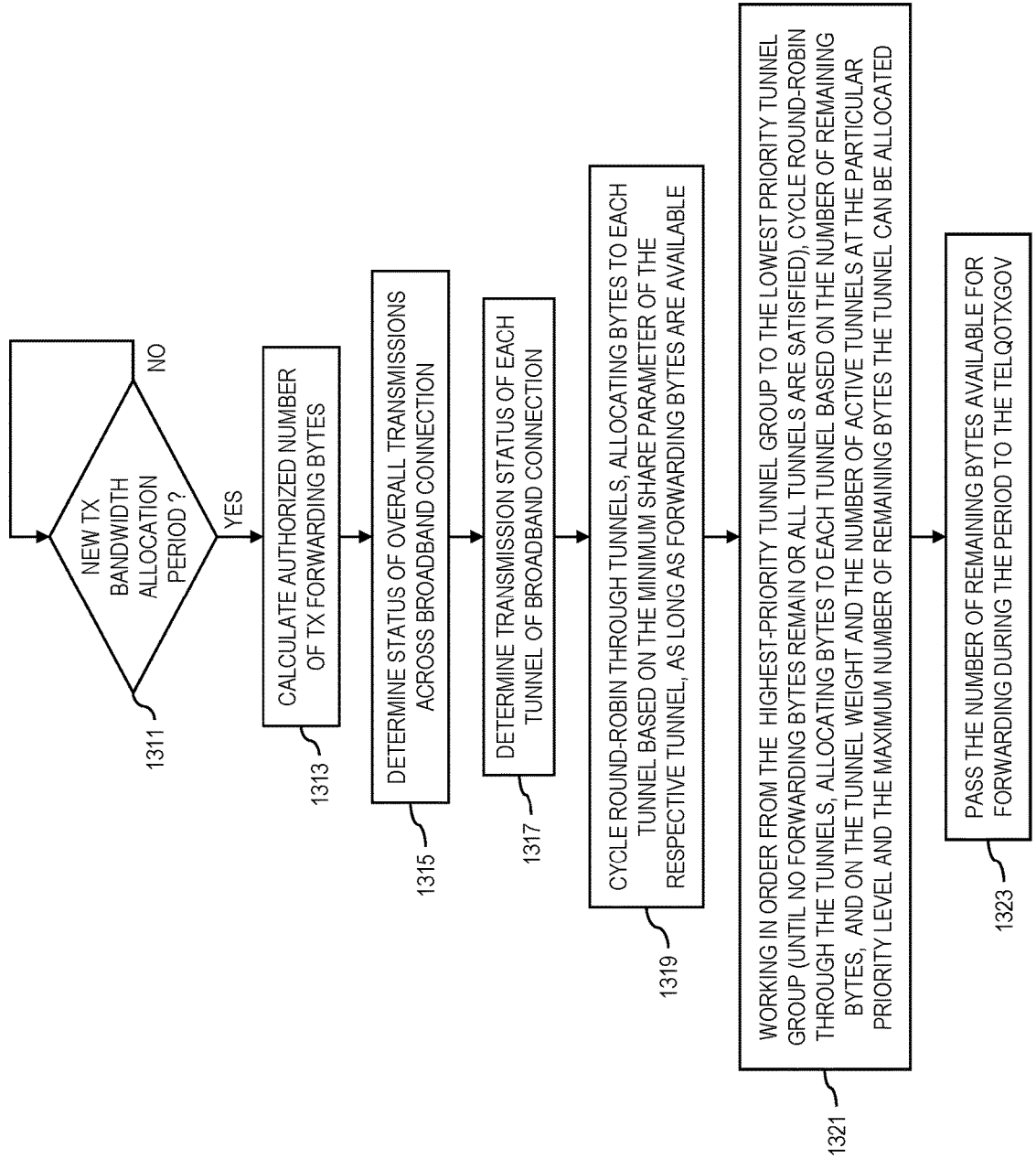
FIG. 9 illustrates a flow chart depicting a transmit bandwidth allocation process, in accordance with example embodiments.

FIG. 9 illustrates a flow chart depicting the transmit bandwidth allocation process, in accordance with example embodiments. The transmit bandwidth allocation process occurs on a periodic basis (e.g., every 10 ms) (S1311), whereby, each period, the TelqoTxBwAlloc 1023 performs the following steps:

(1) (S1313) calculates the number of bytes it is authorized to forward (the number of forwarding bytes) based on the current target transmit forwarding rate and the period duration, where all allocations are made from this number of forwarding bytes—According to certain embodiments, unused forwarding bytes from the previous period are not carried forward;

(2) (S1315) updates its knowledge of the overall status of transmissions across its broadband connection, including (a) the number of ungoverned bytes overall that were already transmitted during the period, and (b) the number of remaining bytes available for forwarding this period;

(3) (S1317) updates its knowledge of the status of each tunnel, including (a) the number of ungoverned bytes forwarded during the period, (b) the number of bytes the tunnel is permitted to forward during the period (e.g., based on its transmit peer rate limit, where, according to certain embodiments, an unlimited number of bytes are permitted when no Peer Rate Limit has been set), (c) the number of Governed bytes that the tunnel is permitted to forward during the period (e.g., based on its minimum share parameter), (d) the number of bytes that remain queued, waiting to be forwarded, and (e) the maximum number of bytes the tunnel can be allocated this period (e.g., based on items 3a, 3b and 3d), where, for example, the tunnel should not be able to forward more bytes than 3d, or more bytes than 3b-3a;

(4) (S1319) cycles round-robin through the tunnels (starting where it left off the previous period), allocating bytes to each tunnel based on the minimum share parameter of the respective tunnel, as long as forwarding bytes are available;

(5) (S1321) starting with the highest-priority group of tunnels and proceeding thru lower priority groups of tunnels until all of the forwarding bytes are used up or all of the tunnels are satisfied, cycles round-robin through the tunnels (starting with the previous tunnel that was not fully satisfied during the previous period, or, if all tunnels were satisfied, starting with the tunnel after the previously satisfied tunnel), allocating bytes to each tunnel based on the number of remaining bytes, and on the tunnel weight and the number of active tunnels at the particular priority level and the maximum number of remaining bytes the tunnel can be allocated (per step 3e above), and then moves onto the next priority level if there is one and there remain bytes to be allocated;

(6) (S1323) passes the saved remaining bytes value (per step 2b) to the TelqoTxGov, permitting the governor to forward as many packets as authorized by that number of bytes; and (7) if there are no unallocated forwarding bytes left at the end of step 5, or if the TelqoTxGov is non-empty at the end of step 6, with respect to the TelqoTargetTxRateController 1111, the target transmit forwarding rate is considered as being saturated during the period.

According to example embodiments, the TelqoTxGov 1025 comprises a first-in-first-out (FIFO) queue of Governed packets provided by the TxQOSLimiter modules 1029, 1035. Ungoverned packets bypass the TelqoTxGov. As will be appreciated, based on the foregoing transmit bandwidth allocation process, multiple tunnels are capable of transmitting or forwarding large packets in a manner whereby, while a spike in the instantaneous transmit rate occurs, the longer term transmission rate remains or under the target transmit forwarding rate. The TelqoTxGov 1025, however, operates as a pacing queue, and thereby protects against such instantaneous transmit rate spikes. Once a period, once the TelqoTxBwAlloc has completed its bandwidth allocations for the period, the TelqoTxBwAlloc provides to the TelqoTxGov the number of bytes it may transmit (e.g., the number of forwarding bytes for the period minus the number of Ungoverned bytes already forwarded during the period). Further, the TelqoTxGov maintains a counter (an available bytes counter) reflecting the remaining number of bytes it may forward left over from the previous period (e.g., generally this will be between zero and the size of the first packet, but it may be negative if there recently has been a spike of Ungoverned transmissions). The TelqoTxGov adds the number of forwarding bytes for the period received from the TelqoTxBwAlloc to the available bytes counter, and begins forwarding frames. Each time the TelqoTxGov forwards a frame it reduces its available bytes counter by the size of that frame. The TelqoTxGov continues forwarding frames until either no frames remain (when this occurs it zeroes its available bytes counter), or the available bytes counter is less than the size (including overhead) of the front frame.

The following examples provide general overviews of the transmit bandwidth allocations for certain example tunnel scenarios: (1) single tunnel—the tunnel will be allocated the full target transmit rate whenever the offered data traffic for the tunnel meets or exceeds the rate; (2) multiple tunnels (where the cumulative offered load does not exceed the target transmit rate)—each tunnel will be allocated as much bandwidth as it can use; (3) multiple tunnels (where the cumulative offered load exceeds the target transmit rate)—each active tunnel with a large backlog of data traffic will receive at least its minimum share of the overall capacity left (not including what was already used up by Ungoverned traffic); (4) multiple tunnels (where the cumulative offered load exceeds the target transmit rate, and every active tunnel can use as much bandwidth as it might be allocated)—the bandwidth allocated to each active tunnel (beyond its minimum share) will substantially meet the appropriate allocation, based on the priority and weight parameters for the tunnel.

According to example embodiments, as introduced above, the receive bandwidth allocator (TelqoRxBwAlloc 1017) indirectly controls/shapes the rate of data traffic reception to match the target receive rate. With an Rx peered tunnel, the TelqoRxBwAlloc sets the maximum rate at which the far-end peer transmits via the peer Rx rate limit provided to the TelqoPeerRateClient 1019 and forwarded to the far-end peer. Whether the data traffic is actually offered for transmission over the broadband connection by the far-end peer at the provided peer Rx rate limit, depends on limitations with respect to the broadband connection of the far-end peer (if it is not over-engineered), and whether the offered data traffic exceeds the limit. Additionally, based on the indirect control, at least one round-trip delay is required to perform a Set-Rate transaction and have it take effect. With an Rx peerless tunnel, while the TelqoRxBwAlloc may precisely control the forwarding of data traffic out of the RxTrafficShaper 1031, this only indirectly affects the rate at which traffic is received across the broadband connection and enters the RxTrafficShaper (e.g., based on window sizing, control of new connections establishment, packet dropping and injection of intentional delay, as discussed above). Again, based on the indirect control, at least one minimum round-trip delay is required for an adjustment to the RxTrafficShaper to take effect. Further, the status of a tunnel directly impacts bandwidth allocation (e.g., the status of a tunnel as "Governed Active" or "Long Term Active"). For example, a tunnel is deemed Governed Active where it has passed any Heavy-Interactive or Bulk-Transfer data traffic within the last predetermined number of N periods (e.g., N=3), and is deemed Long Term Active where it has passed any traffic in the last N seconds (e.g., N=120 seconds). With respect to expected bandwidth consumption, a Long Term Inactive tunnel may be treated as a zero expected consumption, where it is allocated its minimum share of bandwidth, but that bandwidth is not taken from other tunnels.

Figure 10A:
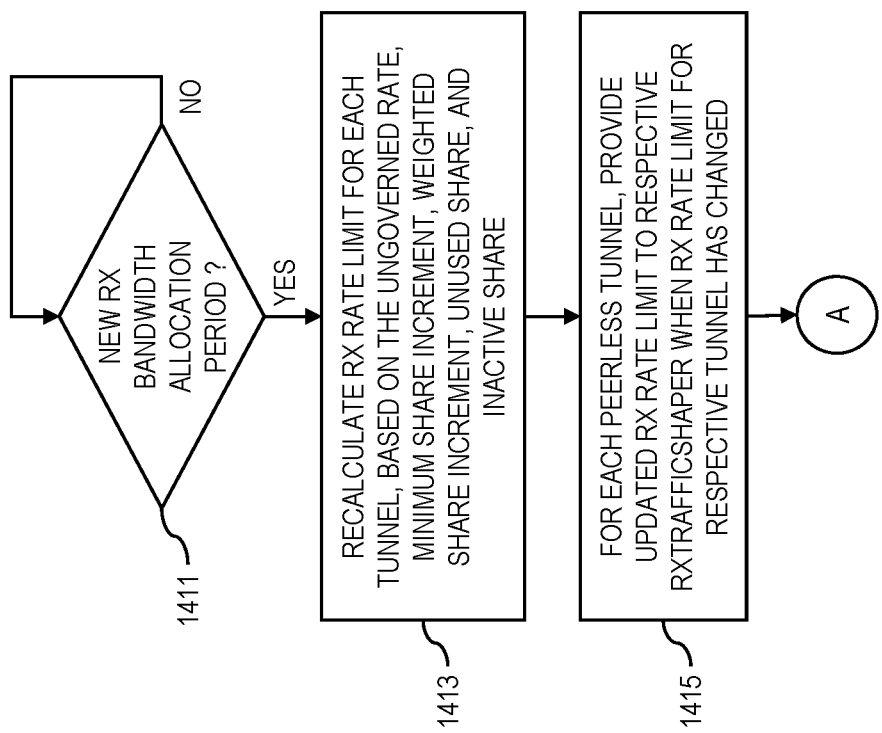
FIGS. 10A and 10B illustrate a flow chart depicting a receive bandwidth allocation process, in accordance with example embodiments.
Figure 10B:
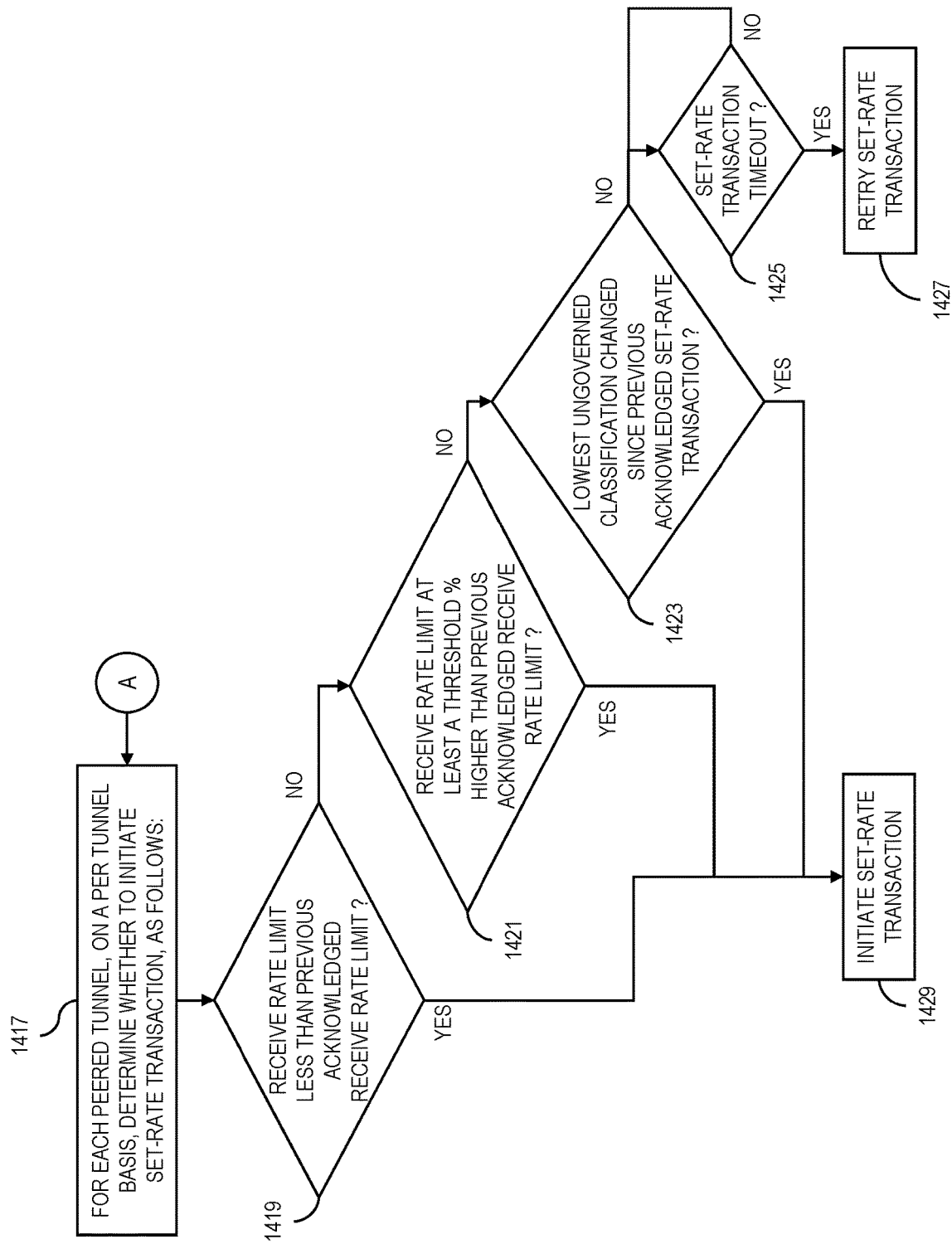

FIGS. 10A and 10B illustrate a flow chart depicting a receive bandwidth allocation process, in accordance with example embodiments. By way of example, receive bandwidth allocation takes place on a periodic basis (S1411), such as every N recent round trip times (e.g., N=3), as measured by probe transactions rounded up to a predetermined boundary (e.g., 100 ms), with the period always being at least M milliseconds (e.g., 100 milliseconds). Each period, the TelqoRxBwAlloc 1017 recalculates the receive rate limit for each tunnel (e.g., in bits per second), based on the target receive rate and the respective receive activity of the tunnel. By way of further example, the receive rate limit for a tunnel is comprised of the sum of the following components (each also specified in bits per second) (S1413):

(1) Ungoverned Rate, which comprises the maximum of the Ungoverned Rate from the tunnel over the previous N periods;

[The Total Governed Target Rate (for step 2) comprises the target receive rate (the total of the Ungoverned Rate of each tunnels.]
(2) Minimum Share Increment, which comprises: (a) the minimum share of the Total Governed Target Rate for a Long Term Inactive tunnel (but this allocation is not included in the Total Weighted target rate calculation); (b) the minimum share of the Total Governed Target Rate for Governed Inactive tunnels (but this allocation is only included in the Total Weighted Target Rate calculation (below) when the broadband connection as a whole is real-time active, and the broadband connection as a whole is real-time active when any of its tunnels are real-time active); (c) the minimum share of the Total Governed Target Rate when the tunnel is Governed Active (this allocation is included in the Total Weighted Target Rate calculation (below);
[The Total Weighted Target Rate (for step 3) comprises the difference between the Governed Target Rate and the sum of the Minimum Share Increment values from Governed Active or real-time active tunnels plus the Minimum Share Increment value from the Governed Inactive (but Long Term Active) tunnels, when the broadband connection as a whole is real-time active.]
(3) Weighted Share Increment, which comprises a calculated value that is based on the priority and weight parameters of the tunnel, the Target Weighted Share of the tunnel, and the Total Weighted Target Rate, where the Target Weighted Share of a tunnel comprises the difference between a percentage of the Governed Traffic Rate for the tunnel (the number of Governed Bits forwarded during the period divided by the period duration) and its minimum share (calculated per step 2). The Target Weighted Share should be clamped and not less than zero. The tunnel Weighted Share Increment values are calculated by performing the following on each priority group of tunnels (starting with the highest priority): (a) determine the set of tunnels at the particular priority level that have not yet been allocated their Target Weighted Share, where, when there are no such tunnels, there remains bandwidth to be allocated and there remains a lower priority group of tunnels, move on to the next lower priority group of tunnels, and when there remains no bandwidth to be allocated move on to step 4; (b) determine the Weighted Share of the remaining unallocated part of the Total Weighted Target Rate bandwidth for each such tunnel; (c) increase the Weighted Share Increment value with its Weighted Share value from 3b, but increased only up to its Target Weighted Share, for each such tunnel; and (d) go back to step 3a;
(4) Unused Share, which, when step 3 has completed and there remains unused bandwidth, the bandwidth allocator allocates that bandwidth equally to all active tunnels, and, when there are no active tunnels, the bandwidth is allocated equally to all tunnels, where, with respect to the TelqoTargetRxRateController 1211, the Target Receive Rate is considered to be saturated during this period when there is no unused bandwidth to be allocated by step 4; and (5) Inactive Share, which, when a tunnel is either inactive or Long Term Inactive and has been allocated no bandwidth, should be the Minimum Share of the Total Governed Target Rate for the tunnel, where the Inactive Share is non-zero only when the receive channel is real-time inactive, and having a non-zero Inactive Share leaves the receive channel susceptible to a momentary latency spike should an inactive or Long-Term Inactive tunnel suddenly go active with a burst of traffic.

Each period, (for each peerless tunnel) the TelqoRxBWAlloc provides an updated receive rate limit to the respective RxTrafficShaper when the receive rate limit for that traffic shaper has changed from a prior period (S1415). Further, each period, (for each peered tunnel) the TelqoRxBwAlloc determines whether to initiate a Set-Rate transaction (S1417), where a transaction is initiated if (S1429): (1) the calculated receive rate limit for the tunnel is less than the previous acknowledged Set-Rate transaction receive rate limit (which clamps rates down as soon as possible) (S1419); or (2) the calculated receive rate limit for the tunnel is at least a predetermined threshold percentage (e.g., 5%) higher than the previous acknowledged Set-Rate transaction receive rate limit (where the use of a threshold percentage should filter out excessive transactions caused by a calculated dithering value) (S1421); or (3) the lowest Ungoverned classification for a tunnel has changed since the previous acknowledged Set-Rate transaction (which typically occurs when real-time traffic activity changes) (S1423); or (4) a timeout (e.g., 3000 ms) has occurred waiting for a reply to the previous Set-Rate transaction (S1425), in which case a retry transaction should be attempted (S1427).

The following examples provide general overviews of the receive bandwidth allocations for certain example tunnel scenarios: (1) single peerless tunnel—the RxTrafficShaper for that tunnel will be set to run at the target receive rate; (2) single peered tunnel—the peer for the tunnel will have its rate set to the target receive rate; (3) multiple tunnels (where all but one are completely idle and with or without real-time activity)—the receive rate limit for the one active tunnel will have its receive rate limit set to the target receive rate, and the receive rate limit for each of the idle tunnels will be set to its minimum share of the Governed available bandwidth; (4) multiple tunnels (where only one is active with some real-time activity)—each of the inactive tunnels will have its receive rate limit set to its minimum share of the Governed available bandwidth, and the one active tunnel will have its receive rate limit set to the target receive rate minus the sum of the minimum share allocations of the idle tunnels; (5) multiple active tunnels (where each has an offered load that exceeds what it is being allocated and there is no real-time traffic)—bandwidth will be allocated among those tunnels such that each will receive a bandwidth allocation to accommodate its Ungoverned traffic or its minimum share of the Governed traffic bandwidth (whichever is larger), plus its prioritized weighted share of the remaining bandwidth; (6) multiple active tunnels (where the offered traffic exceeds the target receive rate and the offered load of an active tunnel comprises a fraction of what it could receive based on its minimum share, and priority and weight parameters)—the tunnel will be allocated an amount over its minimum share to the extent that there is a reasonable expectation that the bandwidth will be utilized.

The present invention, according to certain example embodiments, provides an approach whereby multiple (e.g., dual) broadband connections (each with overlaid support for QOS) operate together to provide a highly available secure private networking solution, which is more cost effective than private networking solutions that employ dedicated circuits. While certain example embodiments may be applied to certain network systems (e.g., VPN tunnels carried over WAN transports), applications of embodiments of the present invention are not limited to such network systems. Accordingly, the present invention, according to example embodiments, can be applied to other types of networks or communications systems, which can benefit therefrom. While example embodiments of the present invention may provide for various implementations (e.g., including hardware, firmware and/or software components), the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

Additionally, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Further, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
receiving a plurality of data packets of a data flow for transmission to a remote destination node via one or more VPN tunnels over a wide area data communications network, wherein each VPN tunnel includes a wide area network (WAN) connection of a respective transport type, and wherein the data flow is associated with an application;
determining an availability classification for the data flow which reflects a required level of availability based on a service classification of the data flow;
generating a sequence number for each data packet of the data flow, where the sequence numbers indicate an order by which the data packets are received;
adding an indication of the service classification and the respective sequence number to each data packet to be transmitted with the packet; and
for each data packet, determining a transport mode (TM) that indicates the one or more VPN tunnels through which the data packet is to be transmitted, and
wherein the determination of the TM is based on a transport role (TR), a transport status (TS) and one or more transport qualification criteria (TQ) of the WAN connection of each VPN tunnel, and on the availability classification of the data flow;
wherein the TR of the WAN connection of each VPN tunnel is based on the transport type, and the TS of the WAN connection of each VPN tunnel is based on a monitored operational status of the respective WAN connection; and
wherein the TQ of the WAN connection of each VPN tunnel are criteria that the WAN connection must meet based on the application associated with the respective data flow.

2. The method according to claim 1, wherein the transport role indicates circumstances under which the respective WAN connection is appropriate for transmission of one or more of the data packets of the data flow.

3. The method according to claim 1, wherein the transport role for each WAN connection is based on an extent to which a level of data packet transmissions over the WAN connection is monitored based on one or more of data rate and data volume, and where one or more of restrictions and increased costs are imposed based on the monitored level of data packet transmissions.

4. The method according to claim 1, wherein the transport status for each WAN connection is based on an operational connectivity status of the respective WAN connection.

5. The method according to claim 4, wherein the operational connectivity status of each WAN connection is one of (i) a clean status, where the WAN connection is operating with expected performance characteristics, (ii) a blackout status, where the WAN connection is experiencing a complete outage, and (iii) a brownout status, where the WAN connection is consistently exhibiting a degraded performance.

6. The method according to claim 1, wherein:
the WAN connections comprise a first WAN connection of a first transport type and a second WAN connection of a second transport type; and
the TM determined for each data packet comprises one of an indication (WAN1) that the data packet is to be transmitted through the VPN tunnel that includes the first WAN connection, an indication (WAN2) that the data packet is to be transmitted through the VPN tunnel that includes the second connection, and an indication (DUP) that the data packet is to be transmitted through the VPN tunnel that includes the first WAN connection and a duplicate copy of the data packet is to be transmitted through the VPN tunnel that includes the second WAN connection.

7. The method according to claim 6, wherein the TM of DUP is when the service classification of the data flow indicates a high priority class of service requiring one or more of transmission in real-time, low latency transmission, a low packet loss rate and minimal jitter.

8. The method according to claim 6, further comprising: monitoring utilization of the DUP TM for recent data packets transmitted through a one of the VPN tunnels that includes the WAN connection of a lower speed as between the first and second WAN connections.

9. The method according to claim 8, further comprising: suspending the utilization of the DUP TM when the data packets transmitted through the VPN that includes the lower speed WAN connection crosses a configurable threshold of the lower speed WAN connection.

10. The method according to claim 8, further comprising:
for each data packet, determining a transport policy (TP) based on the TM for the data packet, a current loading of each of the WAN connections, and the monitored utilization of the DUP TM; and
wherein, instead of the TM, the TP indicates the one or more VPN tunnels through which the data packet is to be transmitted.

11. An apparatus of a first node of a wide area data communications network, the apparatus comprising:
a network interface configured to receive a plurality of data packets of a data flow for transmission from the first node to a remote node via one or more VPN tunnels over the wide area data communications network, wherein each VPN tunnel includes a wide area network (WAN) connection of a respective transport type, and wherein the data flow is associated with an application;
a processor configured to determine an availability classification for the data flow which reflects a required level of availability based on a service classification of the data flow, to generate a sequence number for each data packet of the data flow, where the sequence numbers indicate an order by which the data packets are received, and to add an indication of the service classification and the respective sequence number to each data packet to be transmitted with the packet; and
for each data packet, the processor is further configured to determine a transport mode (TM) that indicates the one or more VPN tunnels through which the data packet is to be transmitted; and
wherein the determination of the TM is based on a transport role (TR), a transport status (TS) and one or more transport qualification criteria (TQ) of the WAN connection of each VPN tunnel, and on the availability classification of the data flow,
wherein the TR of the WAN connection of each VPN tunnel is based on the transport type, and the TS of the WAN connection of each VPN tunnel is based on a monitored operational status of the respective WAN connection, and
wherein the TQ of the WAN connection of each VPN tunnel are criteria that the WAN connection must meet based on the application associated with the respective data flow.

12. The apparatus according to claim 11, wherein the transport role indicates circumstances under which the respective WAN connection is appropriate for transmission of one or more of the data packets of the data flow.

13. The apparatus according to claim 11, wherein the transport role for each WAN connection is based on an extent to which a level of data packet transmissions over the WAN connection is monitored based on one or more of data rate and data volume, and where one or more of restrictions and increased costs are imposed based on the monitored level of data packet transmissions.

14. The apparatus according to claim 11, wherein the transport status is based on an operational connectivity status of the respective WAN connection.

15. The apparatus according to claim 14, wherein the operational connectivity status of each WAN connection is one of (i) a clean status, where the WAN connection is operating with expected performance characteristics, (ii) a blackout status, where the WAN connection is experiencing a complete outage, and (iii) a brownout status, where the WAN connection is consistently exhibiting a degraded performance.

16. The apparatus according to claim 11, wherein:
the WAN connections comprise a first WAN connection of a first transport type and a second WAN connection of a second transport type; and
the TM determined for each data packet comprises one of an indication (WAN1) that the data packet is to be transmitted through the VPN tunnel that includes the first WAN connection, an indication (WAN2) that the data packet is to be transmitted through the VPN tunnel that includes the second connection, and an indication (DUP) that the data packet is to be transmitted through the VPN tunnel that includes the first WAN connection and a duplicate copy of the data packet is to be transmitted through the VPN tunnel that includes the second WAN connection.

17. The apparatus according to claim 16, wherein the TM of DUP is when the service classification of the data flow indicates a high priority class of service requiring one or more of transmission in real-time, low latency transmission, a low packet loss rate and minimal jitter.

18. The apparatus according to claim 16, wherein the processor is further configured to:
monitor utilization of the DUP TM for recent data packets transmitted through a one of the VPN tunnels that includes the WAN connection of a lower speed as between the first and second WAN connections.

19. The apparatus according to claim 18, wherein the processor is further configured to:
suspend the utilization of the DUP TM when the data packets transmitted through the VPN that includes the lower speed WAN connection crosses a configurable threshold of the lower speed WAN connection.

20. The apparatus according to claim 18, wherein the processor is further configured to:
for each data packet, determine a transport policy (TP) based on the TM for the data packet, a current loading of each of the WAN connections, and the monitored utilization of the DUP TM; and
wherein, instead of the TM, the TP indicates the one or more VPN tunnels through which the data packet is to be transmitted.

21. A wide area data communications system, comprising:
a first network node;
a second network node; and
a plurality of modem devices; and
wherein the first network node comprises a first network interface configured to receive a plurality of data packets of a local data flow for transmission from the first network node to the second network node via one or more VPN tunnels over the wide area data communications system, wherein each VPN tunnel includes a wide area network (WAN) connection of a respective transport type, and wherein the data flow is associated with an application; and wherein the first network node further comprises a plurality of second network interfaces, each connected to a respective one of the modem devices;

wherein the first network node further comprises a processor configured to determine an availability classification for the data flow which reflects a required level of availability based on a service classification of the data flow, to generate a sequence number for each data packet of the data flow, where the sequence numbers indicate an order by which the data packets are received by the first network node, and to add an indication of the service classification and the respective sequence number to each data packet to be transmitted with the packet;

wherein, for each data packet, the processor is further configured to determine a transport mode (TM) that indicates the one or more VPN tunnels through which the data packet is to be transmitted to the second network node;

wherein the determination of the TM is based on a transport role (TR), a transport status (TS) and one or more transport qualification criteria (TQ) of the WAN connection of each VPN tunnel, and on the availability classification of the data flow;

wherein the TR of the WAN connection of each VPN tunnel is based on the transport type, and the TS of the WAN connection of each VPN tunnel is based on a monitored operational status of the respective WAN connection;

wherein the TQ of the WAN connection of each VPN tunnel are criteria that the WAN connection must meet based on the application associated with the respective data flow;

wherein the second network node comprises a network interface configured to receive the data packets transmitted via the respective one or more VPN tunnels; and wherein the second network node further comprises a processor configured to decode the received data packets, and to re-sequence the decoded data packets, based on the sequence number added to each data packet, into the data flow as received by the first network node.

* * * * *